US009276746B2

(12) United States Patent
Hattori et al.

(10) Patent No.: US 9,276,746 B2
(45) Date of Patent: Mar. 1, 2016

(54) ENCRYPTION SYSTEM, ENCRYPTION PROCESSING METHOD OF ENCRYPTION SYSTEM, ENCRYPTION DEVICE, DECRYPTION DEVICE, SETUP DEVICE, KEY GENERATION DEVICE, AND KEY DELEGATION DEVICE USING A USER IDENTIFIER FOR A USER WHO BELONGS TO A K-TH HIERARCHY IN AN ORGANIZATION

(75) Inventors: Mitsuhiro Hattori, Tokyo (JP); Takato Hirano, Tokyo (JP); Takumi Mori, Tokyo (JP); Takashi Ito, Tokyo (JP); Nori Matsuda, Tokyo (JP); Tsutomu Sakagami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 299 days.

(21) Appl. No.: 13/980,176

(22) PCT Filed: Jan. 18, 2011

(86) PCT No.: PCT/JP2011/050778
§ 371 (c)(1),
(2), (4) Date: Jul. 17, 2013

(87) PCT Pub. No.: WO2012/098649
PCT Pub. Date: Jul. 26, 2012

(65) Prior Publication Data
US 2013/0287206 A1 Oct. 31, 2013

(51) Int. Cl.
*H04L 9/30* (2006.01)
*H04L 9/08* (2006.01)
(52) U.S. Cl.
CPC ............ *H04L 9/3006* (2013.01); *H04L 9/0836* (2013.01); *H04L 9/0847* (2013.01); *H04L 9/3073* (2013.01); *H04L 2209/42* (2013.01)

(58) Field of Classification Search
CPC ...................................................... H04L 9/3006
USPC ............................................................ 380/30
See application file for complete search history.

(56) References Cited

U.S. PATENT DOCUMENTS

| 2005/0259817 A1 | 11/2005 | Ramzan et al. |
| 2007/0184567 A1 | 8/2007 | Yoo et al. |
| 2009/0019751 A1 | 1/2009 | Goetting |

(Continued)

FOREIGN PATENT DOCUMENTS

| JP | 2008 500598 | 1/2008 |
| JP | 2008 500740 | 1/2008 |

(Continued)

OTHER PUBLICATIONS

U.S. Appl. No. 14/350,987, filed Apr. 10, 2014, Hattori, et al.

(Continued)

*Primary Examiner* — Jacob Lipman
(74) *Attorney, Agent, or Firm* — Oblon, McClelland, Maier & Neustadt, L.L.P.

(57) ABSTRACT

In a wildcard-applicable anonymous hierarchical identity-based encryption system, it is aimed to make the number of pairing operations a fixed number. A user identifier ID and a pattern P are used. The user identifier ID includes k number of hierarchy identifiers. The pattern P includes either of a hierarchy identifier, a wildcard value and a blank value for each hierarchy. An encryption device 400 extracts a key value H corresponding to a hierarchy of the wildcard value and a key value H corresponding to a hierarchy of a pattern value from a public key PK, calculates a cipher value $C_1$ and a cipher value $C_3$, and outputs ciphertext data CT including plaintext cipher value $C_0$, the cipher value $C_1$, and the cipher value $C_3$. A decryption device 300 extracts the hierarchy identifier of the hierarchy corresponding to the wildcard value from the user identifier ID, decrypts the plaintext cipher value $C_0$ included in the ciphertext data CT using the extracted hierarchy identifier, the cipher value $C_1$ and the cipher value $C_3$ which are included in the ciphertext data CT, and outputs plaintext data M.

12 Claims, 30 Drawing Sheets

(56) References Cited

U.S. PATENT DOCUMENTS

| | | |
|---|---|---|
| 2009/0190752 A1 | 7/2009 | Ramzan et al. |
| 2009/0193000 A1 | 7/2009 | Ramzan et al. |
| 2009/0193033 A1 | 7/2009 | Ramzan et al. |
| 2012/0045056 A1 | 2/2012 | Takashima et al. |

FOREIGN PATENT DOCUMENTS

| | | |
|---|---|---|
| JP | 2008 176040 | 7/2008 |
| JP | 2008 288837 | 11/2008 |
| JP | 2010-160235 | 7/2010 |
| JP | 2010 161523 | 7/2010 |
| JP | 2010 165275 | 7/2010 |
| JP | 2010 273317 | 12/2010 |

OTHER PUBLICATIONS

Office Action issued Dec. 17, 2013 in Japanese Patent Application No. 2012-553498 with partial English language translation.

International Search Report Issued Mar. 15, 2011 in PCT/JP11/050778 Filed Jan. 18, 2011.

Kobayashi, T., et al., "Anonymous HIBE Anonymous Hierarchical Identity-Based Encryption and it's application", SCIS 2009, pp. 1-6, (Jan. 20-23, 2009) (with partial English translation).

Boyen, X., et al., "Anonymous Hierarchical Identity-Based Encryption (Without Random Oracles)", CRYPTO 2006, Lecture Notes in Computer Science, vol. 4117, pp. 1-30, (2006).

Hattori, M., "Anonymous HIBE with Wildcards and Its Application to Secure Keyword Search for Group-Oriented Multi-User System", SCIS 2010, pp. 1-6, (Jan. 19-22, 2010).

Boneh, D., et al., "Evaluating 2-DNF Formulas on Ciphertexts", Theory of Cryptography Conference, Lecture Notes in Computer Science, vol. 3378, pp. 1-16, (Apr. 2, 2006).

Menezes, A., "Handbook of Applied Cryptography", 4.4 Prime Number Generation, CRC Press, Total 37 Pages, (1996).

Seo, J.H., "Anonymous Hierarchical Identity-Based Encryption with Constant Size Ciphertexts", Public Key Cryptography, Lecture Notes in Computer Science, vol. 5443, Total 20 Pages, (2009).

Freeman, D. M., "Converting Pairing-Based Cryptosystems from Composite-Order Groups to Prime-Order Groups", EUROCRYPT 2010, Lecture Notes in Computer Science, vol. 6110, Total 33 Pages, (2010).

Shi, E., "Delegating Capabilities in Predicate Encryption Systems", ICALP 2008, Lecture Notes in Computer Sceince, vol. 5126, Total 35 Pages, (2008).

Okamoto, T., "Hierarchical predicate Encryption for inner-products", ASIACRYPT 2009, Lecture Notes in Computer Science, vol. 5912, pp. 214-231, (2009).

Fig. 3

| No. | 1ST HIERARCHY<br>DEPARTMENT<br>(DEPARTMENT MANAGER) | 2ND HIERARCHY<br>DIVISION<br>(DIVISION CHIEF) | 3RD HIERARCHY<br>SECTION<br>(SECTION CHIEF) | 4TH HIERARCHY<br>EMPLOYEE |
|---|---|---|---|---|
| $ID_1$ | ADMINISTRATION DEPARTMENT | $\phi$ | $\phi$ | $\phi$ |
| $ID_2$ | ADMINISTRATION DEPARTMENT | PERSONNEL DIVISION | $\phi$ | $\phi$ |
| $ID_3$ | ADMINISTRATION DEPARTMENT | ACCOUNTS DIVISION | $\phi$ | $\phi$ |
| $ID_4$ | ADMINISTRATION DEPARTMENT | PERSONNEL DIVISION | TRAINING SECTION | $\phi$ |
| $ID_5$ | ADMINISTRATION DEPARTMENT | PERSONNEL DIVISION | RECRUITING SECTION | $\phi$ |
| $ID_6$ | ADMINISTRATION DEPARTMENT | PERSONNEL DIVISION | RECRUITING SECTION | YAMADA |
| $ID_7$ | ADMINISTRATION DEPARTMENT | PERSONNEL DIVISION | RECRUITING SECTION | SATOH |
| $ID_8$ | ADMINISTRATION DEPARTMENT | $\phi$ | $\phi$ | TANAKA |

Fig. 4

| No. | 1ST HIERARCHY<br>DEPARTMENT<br>(DEPARTMENT MANAGER) | 2ND HIERARCHY<br>DIVISION<br>(DIVISION CHIEF) | 3RD HIERARCHY<br>SECTION<br>(SECTION CHIEF) | 4TH HIERARCHY<br>EMPLOYEE |
|---|---|---|---|---|
| $P_1$ | ADMINISTRATION DEPARTMENT | PERSONNEL DIVISION | RECRUITING SECTION | YAMADA |
| $P_2$ | ADMINISTRATION DEPARTMENT | PERSONNEL DIVISION | RECRUITING SECTION | * |
| $P_3$ | ADMINISTRATION DEPARTMENT | ACCOUNTS DIVISION | * | * |
| $P_4$ | ADMINISTRATION DEPARTMENT | PERSONNEL DIVISION | $\phi$ | $\phi$ |
| $P_5$ | ADMINISTRATION DEPARTMENT | * | $\phi$ | $\phi$ |
| $P_6$ | * | * | $\phi$ | $\phi$ |
| $P_7$ | * | * | * | * |
| $P_8$ | ADMINISTRATION DEPARTMENT | $\phi$ | $\phi$ | TANAKA |

Fig. 22

PATTERN PW

| No. | 1ST HIERARCHY<br>DEPARTMENT<br>(DEPARTMENT<br>MANAGER) | 2ND HIERARCHY<br>DIVISION<br>(DIVISION CHIEF) | 3RD HIERARCHY<br>SECTION<br>(SECTION CHIEF) | 4TH HIERARCHY<br>EMPLOYEE | 5TH HIERARCHY<br>KEYWORD |
|---|---|---|---|---|---|
| PW$_1$ | ADMINISTRATION DEPARTMENT | PERSONNEL DIVISION | RECRUITING SECTION | YAMADA | CASE OF M COMPANY |
| PW$_2$ | ADMINISTRATION DEPARTMENT | PERSONNEL DIVISION | RECRUITING SECTION | * | EMPLOYMENT OF K UNIVERSITY |
| PW$_3$ | ADMINISTRATION DEPARTMENT | ACCOUNTS DIVISION | * | * | TRANSFER OF MR. H |
| PW$_4$ | ADMINISTRATION DEPARTMENT | PERSONNEL DIVISION | φ | φ | DISSOLUTION OF S SECTION |
| PW$_5$ | ADMINISTRATION DEPARTMENT | * | φ | φ | X PLAN OF ADMINISTRATION |
| PW$_6$ | * | * | φ | φ | CONFIDENTIAL TO MAMAGER/ DIVISION CHIEF |
| PW$_7$ | * | * | * | * | PRODUCT E PLAN |
| PW$_8$ | ADMINISTRATION DEPARTMENT | φ | φ | TANAKA | WRITTEN APOLOGY PLAN |

PATTERN P      KEYWORD KW

Fig. 26

| No. | 1ST HIERARCHY<br>DEPARTMENT<br>(DEPARTMENT<br>MANAGER) | 2ND HIERARCHY<br>DIVISION<br>(DIVISION<br>CHIEF) | 3RD HIERARCHY<br>SECTION<br>(SECTION<br>CHIEF) | 4TH HIERARCHY<br>EMPLOYEE<br>[1] |
|---|---|---|---|---|
| ... | ... | ... | ... | ... |
| $ID_2$ | ADMINISTRATION DEPARTMENT | PERSONNEL DIVISION | $\phi$ | $\phi$ |
| ... | ... | ... | ... | ... |
| $ID_5$ | ADMINISTRATION DEPARTMENT | PERSONNEL DIVISION | RECRUITING SECTION | $\phi$ |
| $ID_9$ | ADMINISTRATION DEPARTMENT | PERSONNEL DIVISION | RECRUITING SECTION | TAKAHASHI |
| ... | ... | ... | ... | ... |
| $ID_{10}$ | ADMINISTRATION DEPARTMENT | PERSONNEL DIVISION | ASSESSING SECTION | $\phi$ |
| ... | ... | ... | ... | ... |

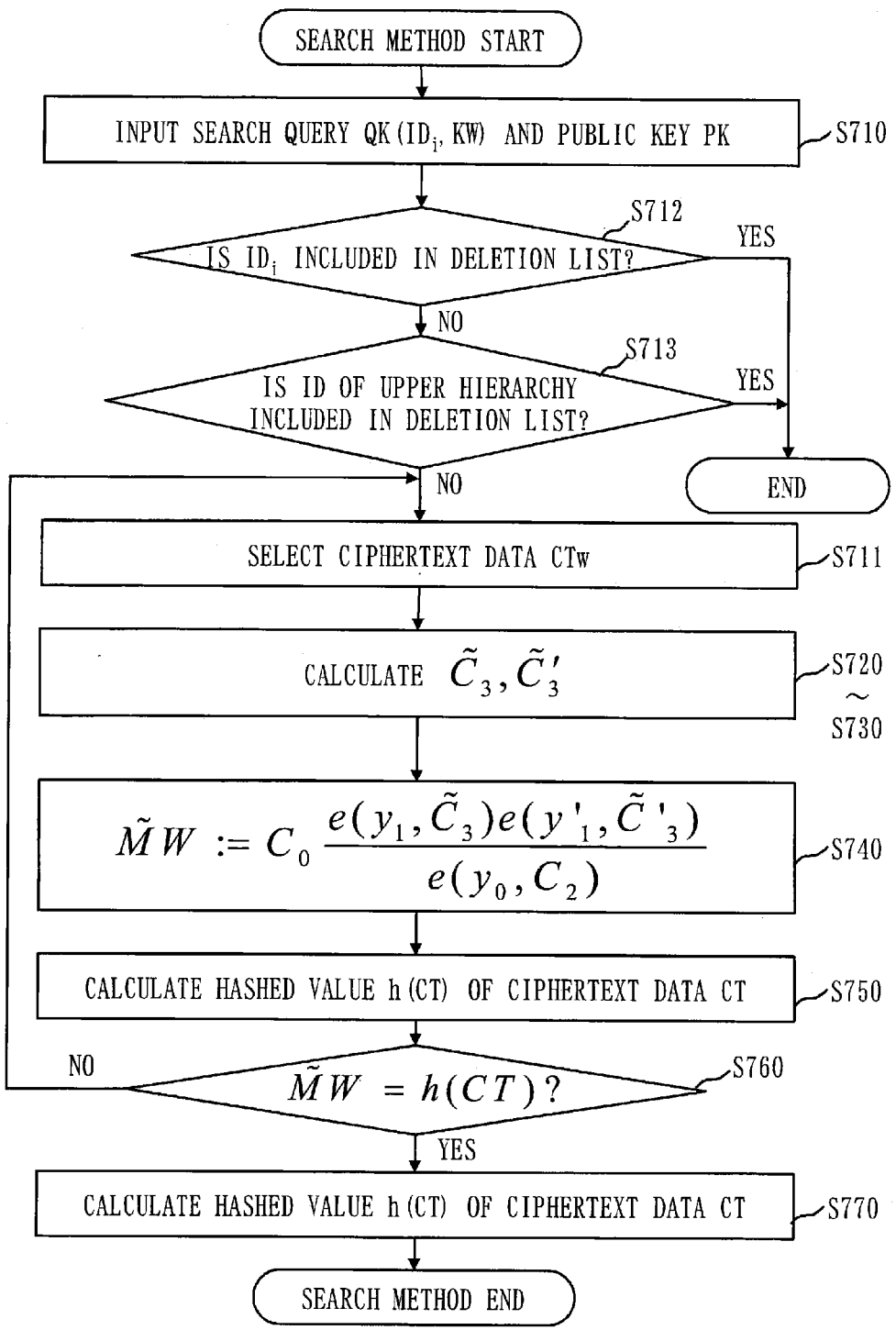

Fig. 29

| No. | 1ST HIERARCHY<br>DEPARTMENT<br>(DEPARTMENT<br>MANAGER) | 2ND HIERARCHY<br>DIVISION<br>(DIVISION<br>CHIEF) | 3RD HIERARCHY<br>SECTION<br>(SECTION<br>CHIEF) | 4TH HIERARCHY<br>EMPLOYEE [1] | 5TH HIERARCHY<br>EMPLOYEE [2] |
|---|---|---|---|---|---|
| $ID_1$ | ADMINISTRATION DEPARTMENT | $\phi$ | $\phi$ | $\phi$ | $\phi$ |
| $ID_2$ | ADMINISTRATION DEPARTMENT | PERSONNEL DIVISION | $\phi$ | $\phi$ | $\phi$ |
| $ID_3$ | ADMINISTRATION DEPARTMENT | ACCOUNTS DIVISION | $\phi$ | $\phi$ | $\phi$ |
| $ID_4$ | ADMINISTRATION DEPARTMENT | PERSONNEL DIVISION | TRAINING SECTION | $\phi$ | $\phi$ |
| $ID_5$ | ADMINISTRATION DEPARTMENT | PERSONNEL DIVISION | RECRUITING SECTION | $\phi$ | $\phi$ |
| $ID_6$ | ADMINISTRATION DEPARTMENT | PERSONNEL DIVISION | RECRUITING SECTION | YAMADA | YAMADA |
| $ID_7$ | ADMINISTRATION DEPARTMENT | PERSONNEL DIVISION | RECRUITING SECTION | SATOH | SATOH |
| $ID_8$ | ADMINISTRATION DEPARTMENT | $\phi$ | $\phi$ | TANAKA | TANAKA |

Fig. 30

| No. | 1ST HIERARCHY<br>DEPARTMENT<br>(DEPARTMENT<br>MANAGER) | 2ND HIERARCHY<br>DIVISION<br>(DIVISION<br>CHIEF) | 3RD HIERARCHY<br>SECTION<br>(SECTION<br>CHIEF) | 4TH HIERARCHY<br>EMPLOYEE<br>[1] | 5TH HIERARCHY<br>EMPLOYEE<br>[2] | 6TH HIERARCHY<br>KEYWORD |
|---|---|---|---|---|---|---|
| $P_1$ | ADMINISTRATION DEPARTMENT | PERSONNEL DIVISION | RECRUITING SECTION | * | YAMADA | CASE OF M COMPANY |
| $P_2$ | ADMINISTRATION DEPARTMENT | PERSONNEL DIVISION | RECRUITING SECTION | * | * | EMPLOYMENT OF K UNIVERSITY |
| $P_3$ | ADMINISTRATION DEPARTMENT | PERSONNEL DIVISION | * | * | * | TRANSFER OF MR. H |
| $P_4$ | ADMINISTRATION DEPARTMENT | PERSONNEL DIVISION | $\phi$ | $\phi$ | $\phi$ | DISSOLUTION OF S SECTION |
| $P_5$ | ADMINISTRATION DEPARTMENT | * | $\phi$ | $\phi$ | $\phi$ | X PLAN OF ADMINISTRATION |
| $P_6$ | * | * | $\phi$ | $\phi$ | $\phi$ | CONFIDENTIAL TO MAMAGER/ DIVISION CHIEF |
| $P_7$ | * | * | * | * | * | PRODUCT E PLAN |
| $P_8$ | ADMINISTRATION DEPARTMENT | $\phi$ | $\phi$ | * | TANAKA | WRITTEN APOLOGY PLAN |

ENCRYPTION SYSTEM, ENCRYPTION PROCESSING METHOD OF ENCRYPTION SYSTEM, ENCRYPTION DEVICE, DECRYPTION DEVICE, SETUP DEVICE, KEY GENERATION DEVICE, AND KEY DELEGATION DEVICE USING A USER IDENTIFIER FOR A USER WHO BELONGS TO A K-TH HIERARCHY IN AN ORGANIZATION

TECHNICAL FIELD

The present invention relates to, for instance, an encryption system, an encryption processing method of encryption system, an encryption device, an encryption program, a decryption device, a decryption program, a setup device, a setup program, a key generation device, a key generation program, a key delegation device, and a key delegation program.

BACKGROUND ART

As one of technique of technical field of the public key encryption, various implementing systems of a hierarchical identity-based encryption are known, each having an implementing system with various features.

Among them, some anonymous hierarchical identity-based encryption systems which provide ciphertext with anonymity are known (for instance, Patent Literature 1, Non Patent Literature 1).

The anonymity is property that does not reveal an ID which is the destination of ciphertext even if the ciphertext is seen.

The anonymity is sometimes an indispensable property, depending on how the hierarchical identity-based encryption is used.

For instance, it is assumed that ciphertext of the hierarchical identity-based encryption is sent to a specific user using a message board of the Internet or a file server.

Here, if it is inexpedient to reveal the destination (for instance, in case of correspondence between companies before merger and it is inexpedient to reveal the correspondence itself), the system without anonymity cannot be employed for the correspondence.

This is because the destination may be leaked if the ciphertext is analyzed.

Therefore, the anonymity is indispensable in such a case.

Further, it is known that the hierarchical identity-based encryption can be applied to secret search. The secret search is a technique to carry out a keyword search for encrypted data, which is also referred to as searchable encryption.

The anonymity is indispensable also in this case. This is because, since an ID of the identity-based encryption corresponds to the keyword of the secret search, and having no anonymity (that is, the ID may be leaked) corresponds to the leakage of the keyword.

As discussed above, some methods are known as anonymous hierarchical identity-based encryption which provide the ciphertext with the anonymity (for instance, Patent Literature 1, Non Patent Literature 1).

However, in these methods, if ciphertext having identical contents are generated for plural destination IDs, it is required to generate the number of IDs of ciphertext, thereby increasing the number of ciphertext.

Then, "Wildcard-applicable hierarchical identity-based encryption system" (Non Patent Literature 2) is known as a developed system which enables to send message to all the users belonging to the same hierarchy using one ciphertext.

Further, it is known that "Group-oriented public key secret search system" can be implemented by applying "Wildcard-applicable hierarchical identity-based encryption system" to the field of the secret search with public key (Non Patent Literature 2).

In "Group-oriented public key secret search system", one ciphertext can be shared within a group, and each user of the group can generate a search query for the ciphertext using his own secret key.

CITATION LIST

Patent Literature

Patent Literature 1: JP 2010-161523A1

Non Patent Literature

Non Patent Literature 1: Xavier Boyen and Brent Waters, "Anonymous hierarchical identity-based encryption (without random oracles)," Crypto 2006, Lecture Notes in Computer Science, vol. 4117, pp. 290-307, 2006.
Non Patent Literature 2: Mitsuhiro Hattori, Takumi Mori, Takashi Ito, Nori Matsuda, Takeshi Yoneda, and Kazuo Ohta, "Anonymous HIBE with wildcards and its application to secure keyword search for group-oriented multi-user system," SCIS 2010, 2010.
Non Patent Literature 3: Dan Boneh, Eu-Jin Goh, and Kobbi Nissim, "Evaluating 2-DNF formulas on ciphertexts," Theory of Cryptography Conference, Lecture Notes in Computer Science, vol. 3378, pp. 325-341, 2005.
Non Patent Literature 4: Alfred J. Menezes, Paul C. van Oorschot, and Scott A. Vanstone, "Handbook of applied cryptography," 4.4 Prime number generation, CRC Press, pp. 145-154, 1996.
Non Patent Literature 5: Jae Hong Seo, Tetsutaro Kobayashi, Miyako Ohkubo, and Koutarou Suzuki, "Anonymous hierarchical identity-based encryption with constant size ciphertexts," Public Key Cryptography, Lecture Notes in Computer Science, vol. 5443, pp. 215-234, 2009.
Non Patent Literature 6: David Mandell Freeman, "Converting pairing-based cryptosystems from composite-order groups to prime-order groups," Eurocrypt 2010, Lecture Notes in Computer Science, vol. 6110, pp. 44-61, 2010.
Non Patent Literature 7: Elaine Shi and Brent Waters, "Delegating capabilities in predicate encryption systems," ICALP 2008, Lecture Notes in Computer Science, vol. 5126, pp. 560-578, 2008.
Non Patent Literature 8: Tatsuaki Okamoto and Katsuyuki Takashima, "Hierarchical predicate Encryption for inner-products," Asiacrypt 2009, Lecture Notes in Computer Science, vol. 5912, pp. 214-231, 2009.

SUMMARY OF INVENTION

Technical Problem

As for "Wildcard-applicable anonymous hierarchical identity-based encryption system" described in Non Patent Literature 2, since the number of pairing calculations which require the longest time in the decrypting calculation is proportional to the height of hierarchy, it is difficult to use the system in an organization having a large hierarchal structure such as large corporations or public agencies.

The number of pairing calculations is proportional to the height of hierarchy, because the ciphertext includes the number, which is proportional to the height of hierarchy, of elements as configurational elements, and the pairing calculation should be done for each of elements.

Further, in "Wildcard-applicable anonymous hierarchical identity-based encryption system" described in Non Patent Literature 2, when a user ID (a user identifier) is specified for a target of encryption or generation of a user secret key, it is necessary to exhaustively specify all elements sequentially from the upper hierarchy.

Therefore, in a large-scaled organization having a hierarchy of departments, divisions, sections, and the like, the system cannot be applied to a user whose position is outside of the usual hierarchical structure such as a user who belongs directly to a department.

That is, the system has a problem that the adaptable hierarchical structure is limited and flexibility is low.

Further, as for "Group-oriented public key secret search system" described in Non Patent Literature 2, similarly to "Wildcard-applicable anonymous hierarchical identity-based encryption system", since the number of pairing calculations of the search calculation is proportional to the height of hierarchy, it is difficult to use the system in an organization having a large hierarchal structure such as large corporations or public agencies.

Further, although Non Patent Literature 2 discloses a method to implement "Group-oriented public key secret search system" using "Wildcard-applicable anonymous hierarchical identity-based encryption system", a more general method to implement "Group-oriented public key secret search system" is not disclosed.

Therefore, there is a problem that the number of options to be taken for configuring "Group-oriented public key secret search system" is small.

Further, although Non Patent Literature 2 discloses a method to share a ciphertext within a group and to make a member accede to the group in "Group-oriented public key secret search system", a method to make the member secede from the group is not disclosed. Further, a method to invalidate the membership is not disclosed regardless of accession or secession.

Therefore, there is a problem that it is difficult to use the system in the organization where transfer, temporary transfer, or retirement occurs.

Objectives of the present invention are, for instance, the following.

The present invention aims to provide a system in which the number of the pairing calculations of the decrypting calculation is not proportional to the number of hierarchies, but is a fixed number in the Wildcard-applicable anonymous hierarchical identity-based encryption system.

Further, the present invention aims to provide a system in which the number of the pairing calculations of the searching calculation is not proportional to the number of hierarchies, but is a fixed number in the Group-oriented public key secret search system.

Further, the present invention aims to provide a more general method to implement the Group-oriented public key secret search system.

Further, the present invention aims to provide a method to make the member secede from the group in the Group-oriented public key secret search system.

Further, the present invention aims to provide a method to invalidate the member in the Group-oriented public key secret search system.

Solution to Problem

According to the present invention, an encryption system uses a user identifier ID including a user identifier of a specific user who belongs to a k-th hierarchy (k is a specific integer being equal to or greater than 2) in an organization having a hierarchical structure as a hierarchy identifier identifying the k-th hierarchy and as well including (k−1) number of hierarchy identifiers identifying hierarchies from a first hierarchy to a (k−1)-th hierarchy.

The encryption system comprises an encryption device and a decryption device.

The encryption device inputs plaintext data M to be encrypted, encrypts the inputted plaintext data M to calculate a plaintext cipher value $C_0$, inputs a pattern P including either of the hierarchy identifier, a wildcard value which means an arbitrary user, and a blank value which means an unnecessary hierarchy as a pattern value for each hierarchy, discriminates a hierarchy of which the pattern value is the wildcard value as a wildcard hierarchy based on the inputted pattern P, inputs a public key PK including a H key value group including k number of key values H which are made related to k number of hierarchies, extracts a key value H which is made related to the wildcard hierarchy from the H key value group included in the inputted public key PK as a wildcard key value, calculates a wildcard cipher value $C_1$ used for decrypting the plaintext cipher value $C_0$ using the extracted wildcard key value, discriminates a hierarchy of which the pattern value is the hierarchy identifier as an identifying hierarchy based on the inputted pattern P, extracts a key value H which is made related to the identifying hierarchy from the H key value group included in the inputted public key PK as an identifying key value, calculates an identifying cipher value $C_3$ used for decrypting the plaintext cipher value $C_0$ using the extracted identifying key value, generates ciphertext data CT including the plaintext cipher value $C_0$, the wildcard cipher value $C_1$, and the identifying cipher value $C_3$ which have been calculated and as well including a wildcard hierarchical value W showing the wildcard hierarchy, and outputs the generated ciphertext data CT.

The decryption device inputs the ciphertext data CT and the user identifier ID, extracts the hierarchy identifier of the wildcard hierarchy from the inputted user identifier ID as a wildcard identifier based on the wildcard hierarchical value W included in the inputted ciphertext data CT, decrypts the plaintext cipher value $C_0$ included in the inputted ciphertext data CT using the extracted wildcard identifier, the wildcard cipher value $C_1$ and the identifying cipher value $C_3$ which are included in the inputted ciphertext data CT, and outputs the plaintext data M obtained by decrypting the plaintext cipher value $C_0$.

Advantageous Effects of Invention

According to the present invention, for instance, in the Wildcard-applicable anonymous hierarchical identity-based encryption system, the number of pairing calculations of the decrypting calculation is not proportional to the number of hierarchies, but is a fixed number.

BRIEF DESCRIPTION OF DRAWINGS

FIG. 3 is a diagram showing an example of a user identifier ID of the hierarchical identity-based encryption system 100 according to the first embodiment.

FIG. 4 is a diagram showing an example of a pattern P of the hierarchical identity-based encryption system 100 according to the first embodiment.

FIG. 22 is a diagram showing an example of a pattern PW of the hierarchical identity-based encryption system 100 according to the third embodiment.

FIG. 26 is a diagram showing an example of a user identifier ID according to a fourth embodiment.

FIG. 28 is a flowchart showing a search method of the search device 500 according to the fourth embodiment.

FIG. 29 is a diagram showing an example of a user identifier ID according to a fifth embodiment.

FIG. 30 is a diagram showing an example of a pattern P according to the fifth embodiment.

DESCRIPTION OF EMBODIMENTS

Embodiment 1

An implementing method of "Wildcard-applicable anonymous hierarchical identity-based encryption system" will be explained.

Figure 1:
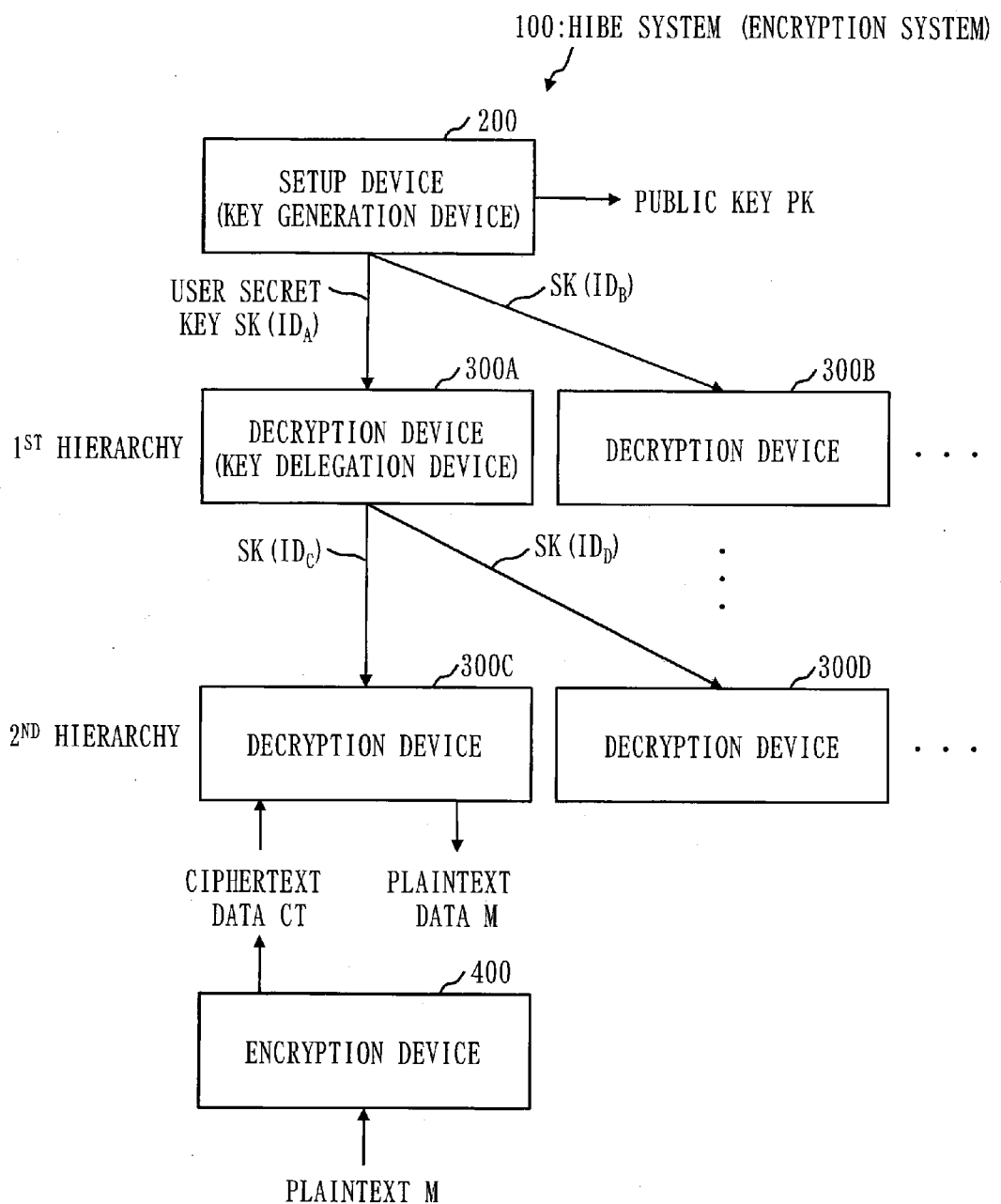
FIG. 1 is a configurational diagram of a hierarchical identity-based encryption system 100 according to a first embodiment.

FIG. 1 is a configurational diagram of a hierarchical identity-based encryption system 100 according to a first embodiment.

A configuration of a hierarchical identity-based encryption system 100 according to the first embodiment will be explained based on FIG. 1.

The hierarchical identity-based encryption system 100 (an example of an encryption system) includes a setup device 200 (an example of a key generation device), a decryption device 300 (an example of a key delegation device), and an encryption device 400.

The setup device 200, the decryption device 300, and the encryption device 400 are connected to a network to implement mutual communication.

In the hierarchical identity-based encryption system 100, a plurality of decryption devices 300 exist, and the setup device 200 and the plurality of decryption devices 300 form a tree-type hierarchical structure.

In FIG. 1, the setup device 200 forms a root (a 0-th hierarchy) of the hierarchical structure, and four decryption devices 300A to 300D form two hierarchies (first and second hierarchies).

The decryption devices 300A and 300B form the first hierarchy, the decryption devices 300C and 300D form the second hierarchy by assuming the decryption device 300A as the decryption device 300 of the upper hierarchy (parent devices).

However, the number of the decryption devices 300 can be two or three, or equal to or greater than five.

Further, the plurality of decryption devices 300 can form a hierarchical structure having equal to or greater than three hierarchies.

The setup device 200 generates a public key PK (public key data) which is commonly used by each of the decryption devices 300, and as well generates a user secret key SK for each of the decryption devices 300 of the first hierarchy.

The setup device 200 may generate the user secret key SK for not only the decryption device 300 of the first hierarchy but also the decryption device 300 of the second hierarchy or lower.

The encryption device 400 encrypts unencrypted data (referred to as "plaintext data M", hereinafter) to generate ciphertext data CT.

The decryption device 300 decrypts the ciphertext data CT generated by the encryption device 400 using a public key PK and the user secret key SK of its own device and generates plaintext data M.

Further, the decryption device 300 generates a user secret key SK for each of the decryption devices 300 (child device) of the lower hierarchy using the user secret key SK of its own device.

For instance, the decryption device 300A generates a user secret key SK ($ID_C$) for the decryption device 300C and a user secret key SK ($ID_D$) for the decryption device 300D using the user secret key SK of its own device ($ID_A$).

Figure 2:
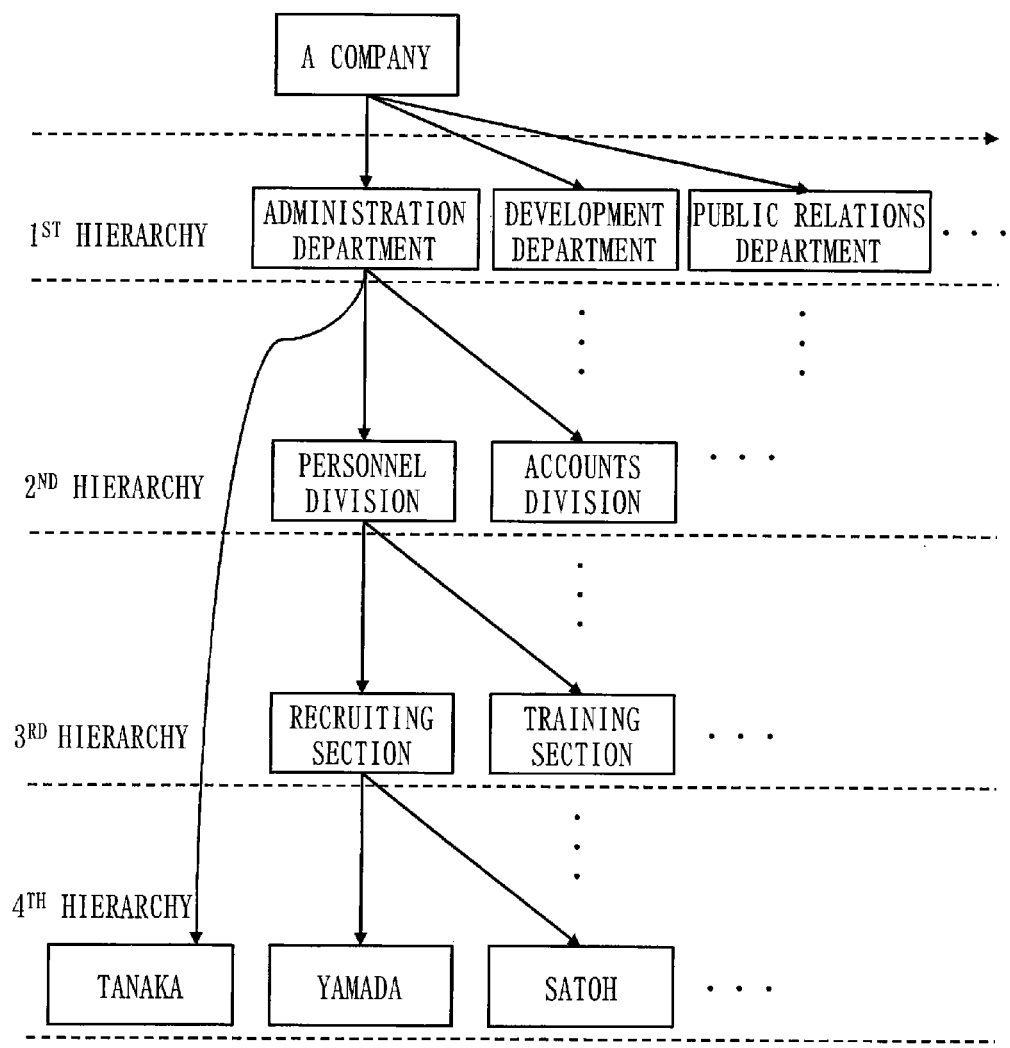
FIG. 2 is a diagram showing an example of a hierarchical structure of the hierarchical identity-based encryption system 100 according to the first embodiment.

FIG. 2 is a diagram showing an example of a hierarchical structure of the hierarchical identity-based encryption system 100 according to the first embodiment.

A hierarchical structure of Company A which applies the hierarchical identity-based encryption system 100 will be explained based on FIG. 2.

For instance, the hierarchical identity-based encryption system 100 can be applied to a company organization.

Here, it is assumed that Company A includes "department" such as Administration Department, Development Department, and Public Relations Department, "department" includes "division" such as Personnel Division and Accounts Division, and "division" includes "section" such as Recruiting Section and Training Section.

In this case, "department" is treated as a first hierarchy, "division" as a second hierarchy, "section" as a third hierarchy, and employee as a fourth hierarchy. However, the employee is not always assigned to any of "section", but can be assigned directly to "department" or "division". In FIG. 2, Mr. TANAKA is an employee who directly belongs to Administration Department.

Then, Company A has the setup device 200 and the encryption device 400.

Further, each "department" has the decryption device 300 for department manager's use, each "division" has the decryption device 300 for division chief's use, and each "section" has the decryption device 300 for section chief's use.

Furthermore, each employee has the decryption device 300.

Further, "user identifier ID" is assigned to the department manager, the division chief, the section chief, and the employee (examples of the user, respectively) for identifying each.

Furthermore, "pattern P", which is data for encryption process, is previously defined for each individual (user) or each post (hierarchy).

FIG. 3 is a diagram showing an example of a user identifier ID of the hierarchical identity-based encryption system 100 according to the first embodiment.

The user identifier ID in Company A to which the hierarchical identity-based encryption system 100 is applied will be explained based on FIG. 3.

The user identifier ID is data including the same number of elements (identifiers) with the number of hierarchies.

That is, since the number of hierarchies of Company A is "4" (refer to FIG. 2), the user identifier ID used by Company A includes four elements.

In the figure, "$\phi$" is an element (a blank value) which means unnecessary hierarchy (hierarchy without corresponding information).

For instance, a user identifier $ID_1$ of Administration Department Manager is (Administration Department, $\phi$, $\phi$, $\phi$), a user identifier $ID_2$ of Personnel Division Chief is (Administration Department, Personnel Division, $\phi$, $\phi$).

Similarly, a user identifier $ID_5$ of Recruiting Section Chief is (Administration Department, Personnel Division, Recruiting Section, $\phi$), and a user identifier $ID_6$ of Mr. YAMADA is (Administration Department, Personnel Division, Recruiting Section, YAMADA).

Further, a user identifier $ID_8$ of Mr. TANAKA who is an employee belonging directly to Administration Department is (Administration Department, $\phi$, $\phi$, TANAKA).

The elements included in the user identifier ID can be decided freely from numerals, characters, signs or a combination of them.

For instance, the identifier "Administration Department" can be a character string, or a numeral which is made related to Administration Department (an integer value).

Hereinafter, the element included in the user identifier ID is referred to as "hierarchy identifier".

FIG. 4 is a diagram showing an example of the pattern P of the hierarchical identity-based encryption system 100 according to the first embodiment.

The pattern P of Company A to which the hierarchical identity-based encryption system 100 is applied will be explained based on FIG. 4.

The pattern P is data including the same number of elements (identifiers) with the number of hierarchies.

That is, since the number of hierarchies of Company A is "4" (refer to FIG. 2), the pattern P used by Company A includes four elements.

In the figure, "*" shows an element (a wildcard value) that means an arbitrary individual belonging to that post or hierarchy (all users).

For instance, a pattern $P_1$ for Mr. YAMADA is (Administration Department, Personnel Division, Recruiting Section, YAMADA), a pattern $P_4$ for Personnel Division Chief is (Administration Department, Personnel Division, $\phi$, $\phi$), and a pattern $P_8$ for Mr. TANAKA belonging directly to Administration Department is (Administration Department, $\phi$, $\phi$, TANAKA).

In this manner, the pattern P for the individual use is identical to the user identifier ID (refer to FIG. 3).

Further, a pattern $P_2$ for an employee belonging to Recruiting Section is (Administration Department, Personnel Division, Recruiting Section, *), a pattern $P_5$ for a division chief belonging to Administration Department is (Administration Department, *, $\phi$, $\phi$).

Furthermore, a pattern $P_6$ for a department manager or a division chief is (*, *, $\phi$, $\phi$), a pattern $P_7$ for a department manager, a division chief, a section chief, or an employee is (*, *, *, *).

In this manner, the pattern P for the post or hierarchy, not for the individual, includes "*".

Hereinafter, an element included in the pattern P is referred to as "pattern value".

Next, each device that forms the hierarchical identity-based encryption system 100 (refer to FIG. 1) will be explained.

Figure 5:
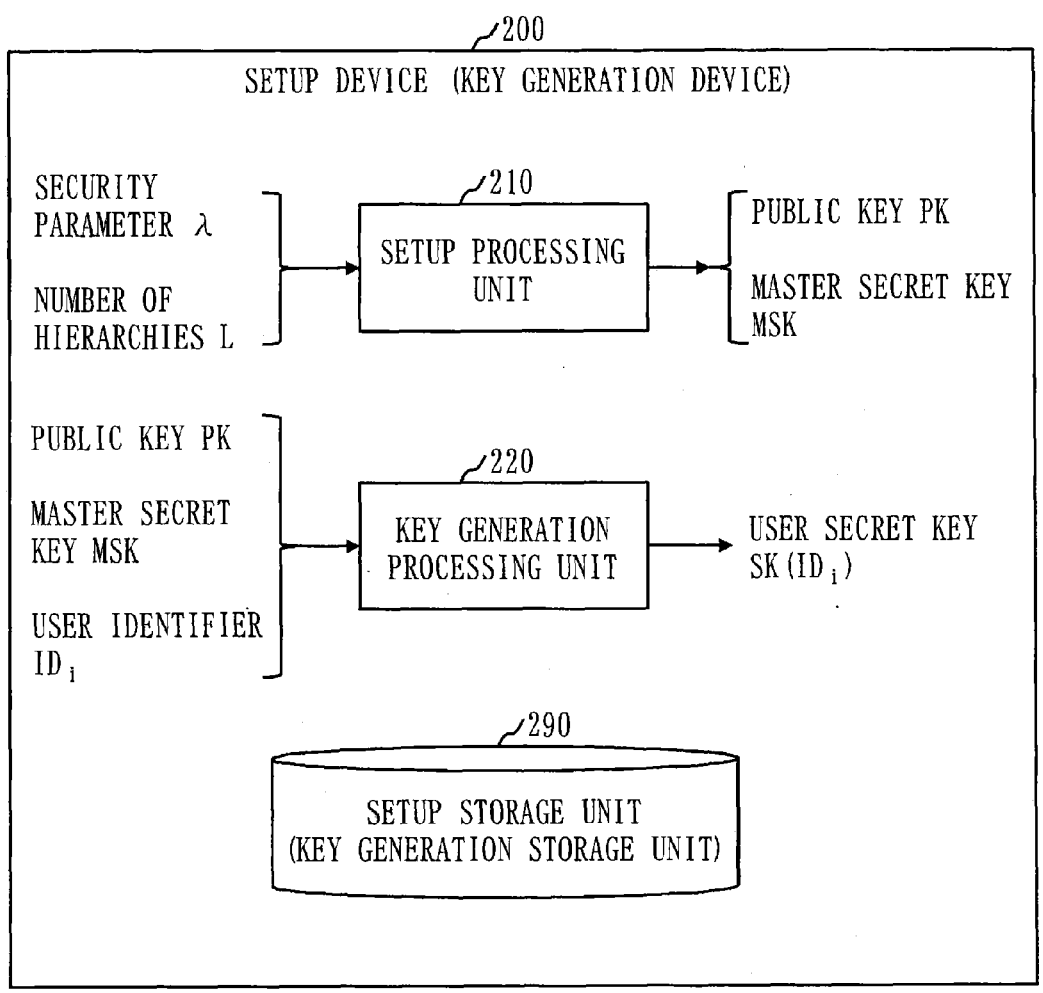
FIG. 5 is a schematic diagram of a setup device 200 according to the first embodiment.

FIG. 5 is a schematic diagram of the setup device 200 according to the first embodiment.

An outline of the setup device 200 according to the first embodiment will be explained based on FIG. 5.

The setup device 200 includes a setup processing unit 210, a key generation processing unit 220, and a setup storage unit 290 (an example of a key generation storage unit).

The setup processing unit 210 inputs a security parameter $\lambda$, the number of hierarchies L, generates a public key PK and a master secret key MSK, and outputs the generated public key PK and the generated master secret key MSK.

The key generation processing unit 220 inputs the public key PK, the master secret key MSK, and a user identifier $ID_i$ of a user i, generates a user secret key $SK(ID_i)$ of the user i, and outputs the generated user secret key $SK(ID_i)$ of the user i.

The setup storage unit 290 is a storage unit that stores data used by the setup device 200.

For instance, the security parameter $\lambda$, the number of hierarchies L, the public key PK, the master secret key MSK, the user identifier $ID_i$, and the user secret key $SK(ID_i)$ are examples of data stored in the setup storage unit 290.

Figure 6:
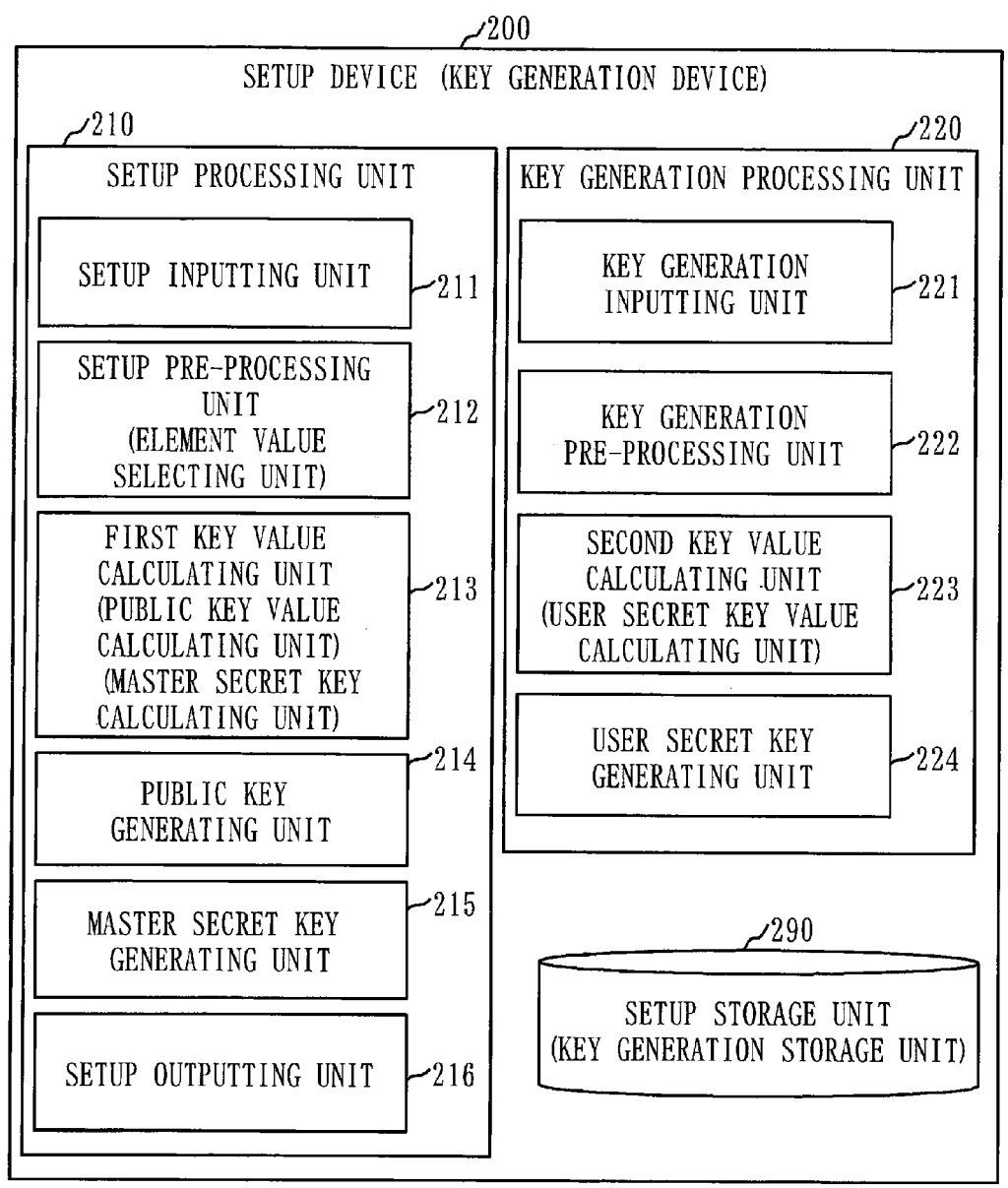
FIG. 6 is a functional configurational diagram of the setup device 200 according to the first embodiment.

FIG. 6 is a functional configurational diagram of the setup device 200 according to the first embodiment.

The functional configuration of the setup device 200 according to the first embodiment will be explained based on FIG. 6.

The setup device 200 (an example of a key generation device) includes, as discussed above, the setup processing unit 210, the key generation processing unit 220, and the setup storage unit 290 (an example of a key generation storage unit).

The setup processing unit 210 generates, for instance, a public key PK of a user who belongs to an organization having L number of hierarchies (L is a specific integer being equal to or greater than 2).

The setup processing unit 210 includes a setup inputting unit 211, a setup pre-processing unit 212, a public key value calculating unit 213, a public key generating unit 214, a master secret key generating unit 215, and a setup outputting unit 216.

The setup inputting unit 211 carries out a setup inputting process.

For instance, the setup inputting unit 211 inputs the security parameter λ and the number of hierarchies L.

The setup pre-processing unit 212 (an example of an element value selecting unit) carries out a setup pre-processing (including an element value selecting process).

For instance, the setup pre-processing unit 212 carries out the following process in the setup pre-processing.

The setup pre-processing unit 212 calculates a cyclic group G that is a cyclic group G of which an order is a product n of a prime number p and a prime number q and that includes n number of element values based on the security parameter λ.

The setup pre-processing unit 212 selects L number of element values from a subgroup $G_p$ that is a subgroup $G_p$ which forms a part of the calculated cyclic group G and of which an order is a prime number p by relating to L number of hierarchies as L number of key values h.

The setup pre-processing unit 212 selects L number of element values from the subgroup $G_p$ by relating to the L number of hierarchies as L number of key values h'.

The setup pre-processing unit 212 selects L number of element values from a subgroup $G_q$ that is a subgroup $G_q$ which forms a part of the calculated cyclic group G and of which an order is a prime number q by relating to the L number of hierarchies as L number of key values R.

The setup pre-processing unit 212 selects L number of element values from the subgroup $G_q$ by relating to L number of hierarchies as L number of key values R'.

The public key value calculating unit 213 carries out a public key value calculating process.

For instance, the public key value calculating unit 213 carries out the following process in the public key value calculating process.

The public key value calculating unit 213 carries out multiplication of L number of key values h and L number of key values R selected by the setup pre-processing unit 212 for each hierarchy to calculate L number of key values H which is made related to the L number of hierarchies as an H key value group.

The public key value calculating unit 213 carries out multiplication of L number of key values h' and L number of key values R' selected by the setup pre-processing unit 212 for each hierarchy, and calculates L number of key values H' which is made related to the L number of hierarchies as an H' key value group.

The public key generating unit 214 carries out a public key generating process.

For instance, the public key generating unit 214 carries out the following process in the public key generating process.

The public key generating unit 214 generates the public key PK including the H key value group and the H' key value group calculated by the public key value calculating unit 213.

The master secret key generating unit 215 carries out a master secret key generation process.

For instance, the master secret key generating unit 215 carries out the following process in the master secret key generating process.

The master secret key generating unit 215 generates a master secret key MSK including L number of key values h selected by the setup pre-processing unit 212 as an h key value group.

The setup outputting unit 216 carries out a setup outputting process.

For instance, the setup outputting unit 216 outputs the public key PK generated by the public key generating unit 214 and the master secret key MSK generated by the master secret key generating unit 215.

The key generation processing unit 220 generates, for instance, a user secret key SK of a specific user who belongs to a k-th hierarchy (k is a specific integer being equal to or greater than 2) in an organization having the hierarchical structure.

The key generation processing unit 220 includes a key generation inputting unit 221, a key generation pre-processing unit 222, a user secret key value calculating unit 223, and a user secret key generating unit 224.

The key generation inputting unit 221 carries out a key generation inputting process.

For instance, the key generation inputting unit 221 carries out the following process in the key generation inputting process.

The key generation inputting unit 221 inputs the user identifier ID including a user identifier of a particular user as the hierarchy identifier identifying the k-th hierarchy and as well including (k−1) number of hierarchy identifiers identifying hierarchies from the first hierarchy to the (k−1)-th hierarchy.

The key generation inputting unit 221 inputs a master secret key MSK which includes an h key value group including k number of key values h which are made related to k number of hierarchies and an h' key value group including k number of key values h' which are made related to the k number of hierarchies.

The key generation pre-processing unit 222 carries out a key generation pre-processing.

For instance, the key generation pre-processing unit 222, if the hierarchy identifier included in the user identifier ID is a character string, converts the hierarchy identifier from the character string to an integer value.

The user secret key value calculating unit 223 carries out a user secret key value calculation process.

For instance, the user secret key value calculating unit 223 carries out the following process in the user secret key value calculation process.

The user secret key value calculating unit 223 calculates a key value $a_0$ which is used for decrypting the ciphertext data CT using the user identifier ID and the master secret key MSK which have been inputted by the key generation inputting unit 221.

The user secret key generating unit 224 carries out a user secret key generating process.

For instance, the user secret key generating unit 224 carries out the following process in the user secret key generating process.

The user secret key generating unit 224 generates a user secret key SK including the key value $a_0$ calculated by the user secret key value calculating unit 223, and outputs the generated user secret key SK.

Figure 7:
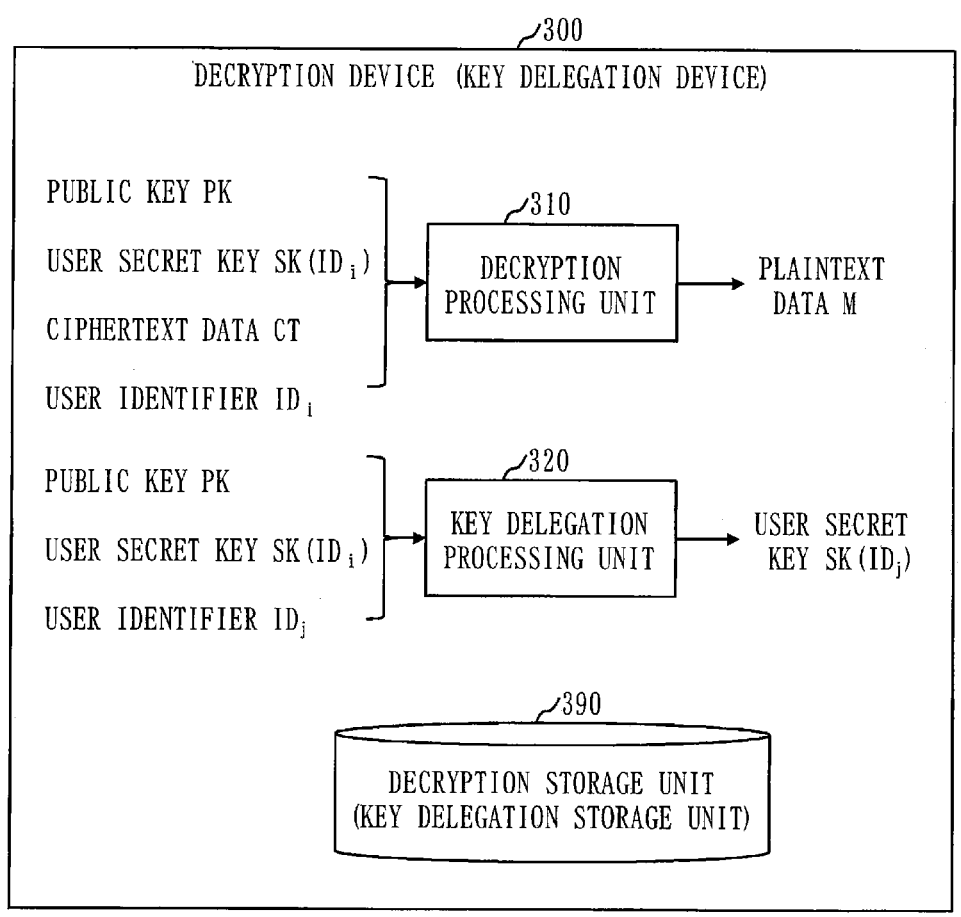
FIG. 7 is a schematic diagram of a decryption device 300 according to the first embodiment.

FIG. 7 is a schematic diagram of a decryption device 300 according to the first embodiment.

An outline of the decryption device 300 according to the first embodiment will be explained based on FIG. 7.

The decryption device 300 includes a decryption processing unit 310, a key delegation processing unit 320, and a decryption storage unit 390 (an example of a key delegation storage unit).

However, the decryption device 300 of the lowermost hierarchy (for instance, the decryption device 300 for the employee) does not need to include the key delegation processing unit 320.

The decryption processing unit 310 inputs a public key PK, a user secret key $SK(ID_i)$ of a user i, ciphertext data CT generated for the user i, and a user identifier $ID_i$ of the user i, decrypts the ciphertext data CT to generate plaintext data M, and outputs the generated plaintext data M.

The key delegation processing unit 320 inputs the public key PK, the user secret key $SK(ID_i)$ of the user i, and a user identifier $ID_j$ of a user j belonging to a hierarchy which is just below the hierarchy of the user i, generates a secret key $SK(ID_j)$ of the user j, and outputs the generated secret key $SK(ID_j)$ of the user j.

The decryption storage unit 390 is a storage unit storing data used by the decryption device 300.

For instance, the public key PK, the user secret key $SK(ID_x)$, the ciphertext data CT, the user identifier $ID_x$, and the plaintext data M are examples of the data stored in the decryption storage unit 390.

Figure 8:
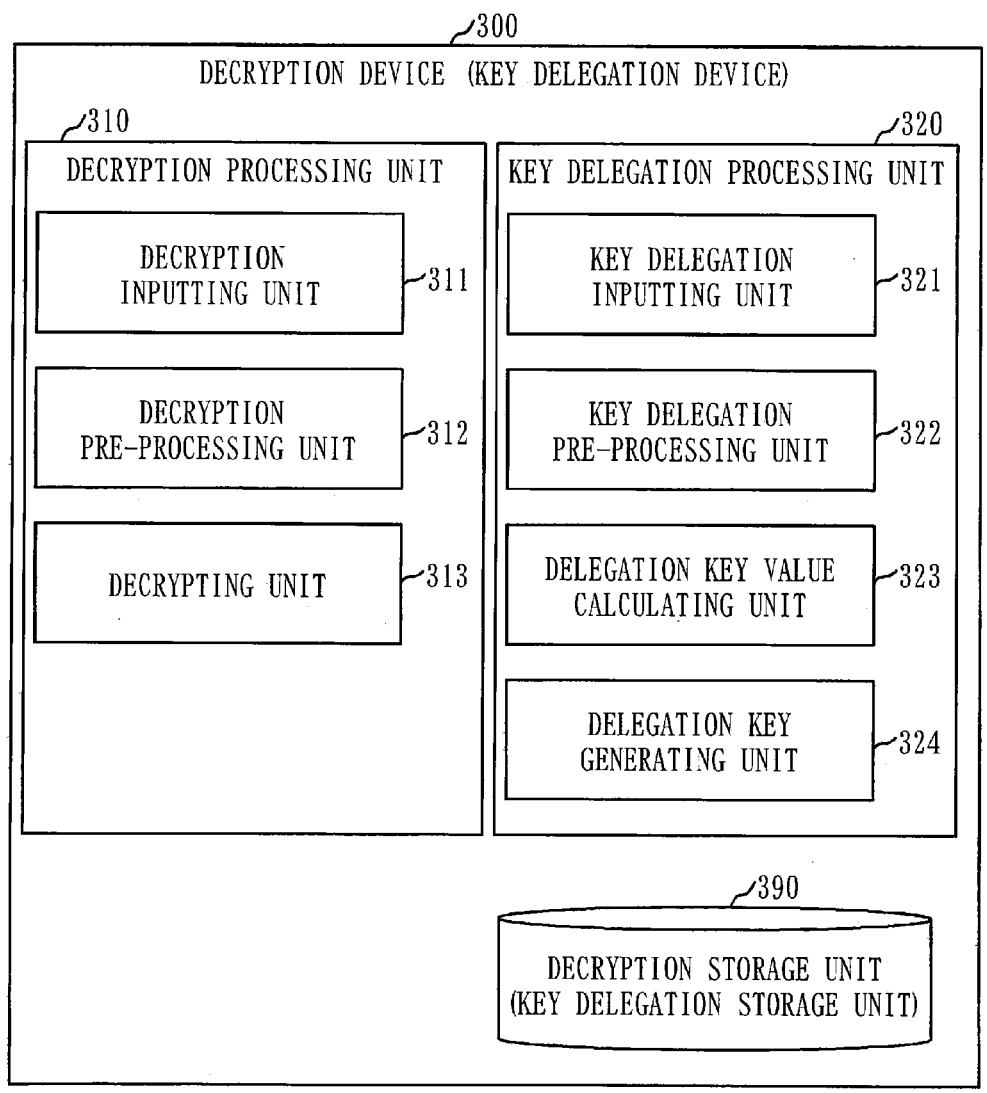
FIG. 8 is a functional configurational diagram of the decryption device 300 according to the first embodiment.

FIG. 8 is a functional configurational diagram of the decryption device 300 according to the first embodiment.

The functional configuration of the decryption device 300 according to the first embodiment will be explained based on FIG. 8.

The decryption device 300 (an example of a key delegation device) includes, as discussed above, the decryption processing unit 310, the key delegation processing unit 320, and the decryption storage unit 390 (an example of a key delegation storage unit).

The decryption processing unit 310 includes a decryption inputting unit 311, a decryption pre-processing unit 312, and a decrypting unit 313.

The decryption inputting unit 311 carries out a decryption inputting process.

For instance, the decryption inputting unit 311 carries out the following process in the decryption inputting process.

The decryption inputting unit 311 inputs the ciphertext data CT and the user identifier ID.

The ciphertext CT includes the plaintext cipher value $C_0$ encrypted from the plaintext data M, a specific wildcard cipher value $C_1$, a specific identifying cipher value $C_3$, and a wildcard hierarchical value W. The wildcard hierarchical value W shows a hierarchy where the pattern value included in the pattern P is the wildcard value.

The decryption pre-processing unit 312 carries out a decryption pre-processing.

For instance, the decryption pre-processing unit 312, if the hierarchy identifier included in the user identifier ID is a character string, converts the hierarchy identifier from the character string to the integer value.

The decrypting unit 313 carries out a decrypting process.

For instance, the decrypting unit 313 carries out the following process in the decrypting process.

The decrypting unit 313 extracts a hierarchy identifier of a hierarchy shown by the wildcard hierarchical value W as a wildcard identifier from the user identifier ID inputted by the decrypting unit 313 based on the ciphertext data CT inputted by the decryption inputting unit 311.

The decrypting unit 313 decrypts the plaintext cipher value $C_0$ included in the ciphertext data CT using the extracted wildcard identifier, the wildcard cipher value $C_1$ and the identifying cipher value $C_3$ included in the ciphertext data CT.

The decrypting unit 313 outputs the plaintext data M obtained by decrypting the plaintext cipher value $C_0$.

The key delegation processing unit 320 generates a user secret key $SK_j$ of a user j belonging to a k-th hierarchy (k is a specific integer being equal to or greater than 2) of an organization having a hierarchical structure.

The key delegation processing unit 320 includes a key delegation inputting unit 321, a key delegation pre-processing unit 322, a delegation key value calculating unit 323, and a delegation key generating unit 324.

The key delegation inputting unit 321 carries out a key delegation inputting process.

For instance, the key delegation inputting unit 321 carries out the following process in the key delegation inputting process.

The key delegation inputting unit 321 inputs the user identifier $ID_j$ including the user identifier of the user j as the hierarchy identifier identifying the k-th hierarchy and as well including (k−1) number of hierarchy identifiers identifying hierarchies from a first hierarchy to a (k−1)-th hierarchy.

The key delegation inputting unit 321 inputs the user secret key $SK_i$ of the user belonging to the (k−1)-th hierarchy, that is, the user secret key $SK_i$ including the key value $a_0$ used for decrypting the ciphertext data CT.

The key delegation pre-processing unit 322 carries out a key delegation pre-processing.

For instance, the key delegation pre-processing unit 322, if the hierarchy identifier included in the user identifier ID is a character string, converts the hierarchy identifier from the character string to an integer value.

The delegation key value calculating unit 323 carries out a delegation key value calculating process.

For instance, the delegation key value calculating unit 323 carries out the following process in the delegation key value calculating process.

The delegation key value calculating unit 323 calculates a key value $x_0$ used for decrypting the ciphertext data CT using the user identifier $ID_j$ and the user secret key $SK_i$ inputted by the key delegation inputting unit 321.

The delegation key generating unit 324 carries out a delegation key generating process.

For instance, the delegation key generating unit 324 carries out the following process in the delegation key generating process.

The delegation key generating unit 324 generates the user secret key $SK_j$ including the key value $x_0$ calculated by the delegation key value calculating unit 323 and outputs the generated user secret key $SK_j$.

Figure 9:
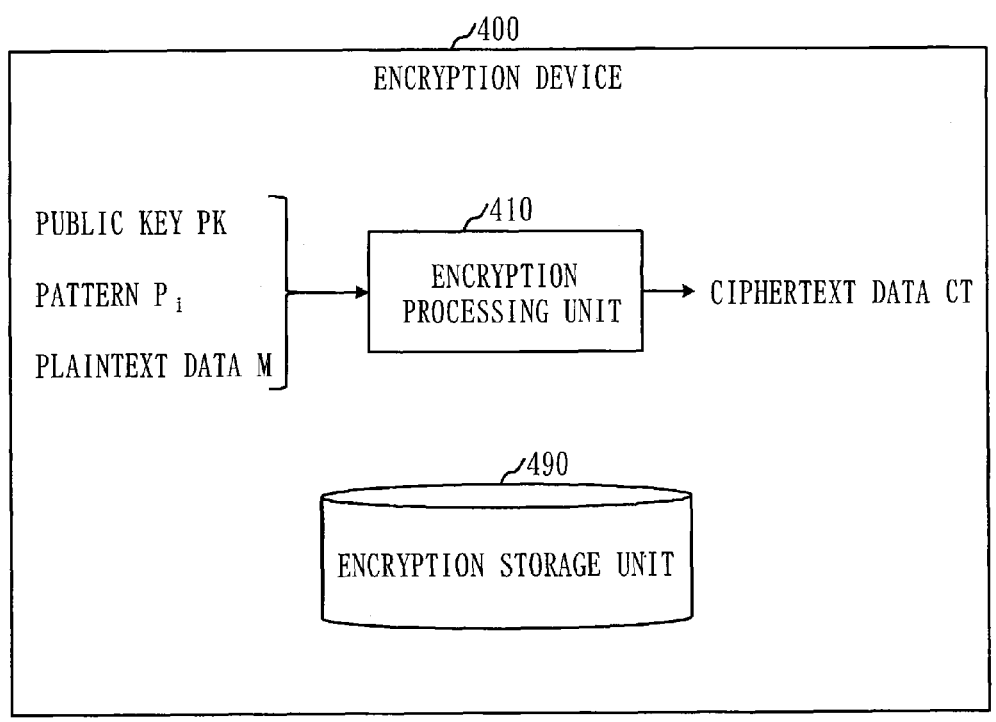
FIG. 9 is a schematic diagram of an encryption device 400 according to the first embodiment.

FIG. 9 is a schematic diagram of an encryption device 400 according to the first embodiment.

An outline of the encryption device 400 according to the first embodiment will be explained based on FIG. 9.

The encryption device 400 includes an encryption processing unit 410 and an encryption storage unit 490.

The encryption processing unit 410 inputs the public key PK, the pattern $P_i$ for the (individual or) hierarchy i, and the plaintext data M, encrypts the plaintext data M to generate the ciphertext data CT for the (individual or) hierarchy i, and outputs the generated ciphertext data CT.

The encryption storage unit 490 is a storage unit storing data used by the encryption device 400.

For instance, the public key PK, the pattern $P_i$, the plaintext data M, and the ciphertext data CT are examples of the data stored in the encryption storage unit 490.

Figure 10:
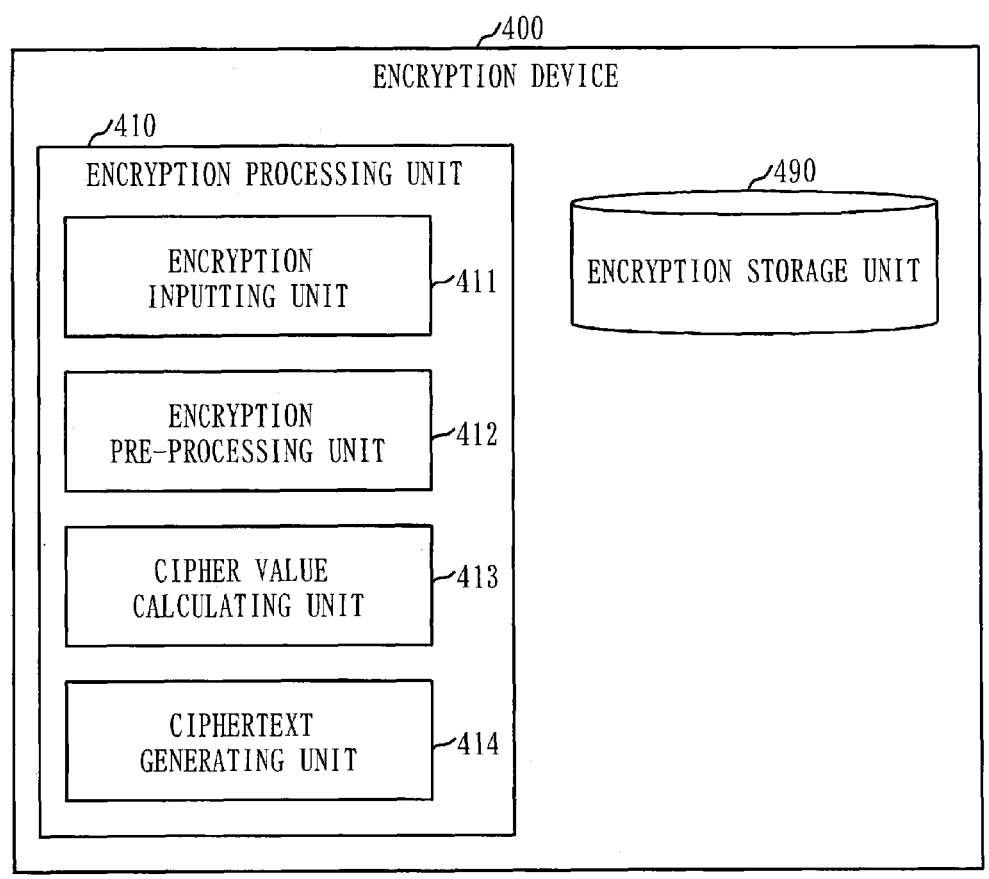
FIG. 10 is a functional configurational diagram of the encryption device 400 according to the first embodiment.

FIG. 10 is a functional configurational diagram of the encryption device 400 according to the first embodiment.

The functional configuration of the encryption device 400 according to the first embodiment will be explained based on FIG. 10.

The encryption device 400 includes, as discussed above, the encryption processing unit 410 and the encryption storage unit 490.

The encryption processing unit 410 includes an encryption inputting unit 411, an encryption pre-processing unit 412, a cipher value calculating unit 413, and a ciphertext generating unit 414.

The encryption inputting unit 411 carries out an encryption inputting process.

For instance, the encryption inputting unit 411 carries out the following process in the encryption inputting process.

The encryption inputting unit 411 inputs plaintext data M to be encrypted.

The encryption inputting unit 411 inputs the public key PK including the H key value group including k number of key values H which are made related to k number of hierarchies (k is a specific integer being equal to or greater than 2).

The encryption inputting unit 411 inputs the pattern P including either of the hierarchy identifier identifying a hierarchy, the wildcard value which means an arbitrary user, and the blank value which means an unnecessary hierarchy for each hierarchy as the pattern value.

The encryption pre-processing unit 412 carries out the encryption pre-processing.

For instance, the encryption pre-processing unit 412, if the pattern value (for instance, the hierarchy identifier) included in the pattern P is a character string, converts the pattern value from the character string into an integer value.

The cipher value calculating unit 413 carries out a cipher value calculating process.

For instance, the cipher value calculating unit 413 carries out the following process in the cipher value calculating process.

The cipher value calculating unit 413 encrypts the plaintext data M inputted by the encryption inputting unit 411 to calculate a plaintext cipher value $C_0$.

The cipher value calculating unit 413 discriminates the hierarchy whose pattern value is the wildcard value as a wildcard hierarchy based on the pattern P inputted by the encryption inputting unit 411.

The cipher value calculating unit 413 extracts the key value H which is made related to the wildcard hierarchy from the H key value group included in the public key PK inputted by the encryption inputting unit 411 as a wildcard key value.

The cipher value calculating unit 413 calculates a wildcard cipher value $C_1$ used for decrypting the plaintext cipher value $C_0$ using the extracted wildcard key value.

The cipher value calculating unit 413 discriminates a hierarchy whose pattern value is the hierarchy identifier as an identifying hierarchy based on the pattern P.

The cipher value calculating unit 413 extracts the key value H which is made related to the identifying hierarchy from the H key value group included in the public key PK as an identifying key value.

The cipher value calculating unit 413 calculates an identifying cipher value $C_3$ used for decrypting the plaintext cipher value $C_0$ using the extracted identifying key value.

The ciphertext generating unit 414 carries out a ciphertext generating process.

For instance, the ciphertext generating unit 414 carries out the following process in the ciphertext generating process.

The ciphertext generating unit 414 generates ciphertext data CT including the plaintext cipher value $C_0$, the wildcard cipher value $C_1$, and the identifying cipher value $C_3$ which have been calculated by the cipher value calculating unit 413 and as well including the wildcard hierarchical value W showing the wildcard hierarchy.

The ciphertext generating unit 414 outputs the generated ciphertext data CT.

Next, a processing method of each device that forms the hierarchical identity-based encryption system 100 (refer to FIG. 1) will be explained.

Figure 11:
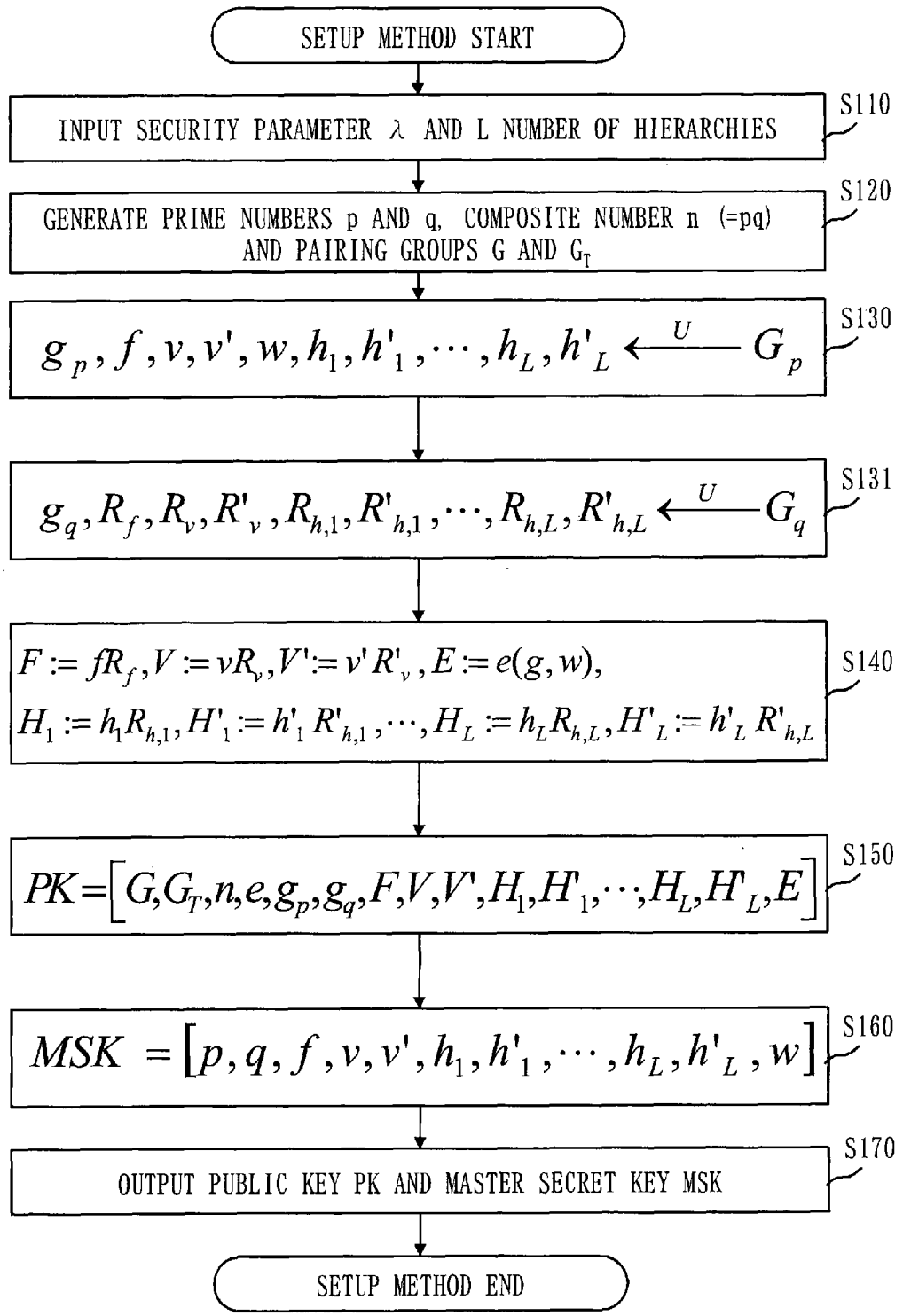
FIG. 11 is a flowchart showing a setup method by a setup device 200 according to the first embodiment.

FIG. 11 is a flowchart showing a setup method by the setup device 200 according to the first embodiment.

A processing flow of the setup method executed by the setup processing unit 210 of the setup device 200 will be explained based on FIG. 11.

At S110, the setup inputting unit 211 inputs a security parameter λ and the number of hierarchies L from the inputting device or the setup storage unit 290.

After S110, the processing proceeds to S120.

At S120, the setup pre-processing unit 212 generates (calculates) prime numbers p and q based on the security parameter λ, multiplies the generated prime number p and q to calculate a composite number n (=pq).

The setup pre-processing unit 212 generates groups G and $G_T$ based on the calculated composite number n, a predetermined mapping e, the security parameter λ and the number of hierarchies L which have been inputted at S110.

The groups G and $G_T$ are cyclic groups of which an order is the composite number n and which include n number of element values. The cyclic groups G and $G_T$ may be either of an additive group and a multiplicative group. Hereinafter, the explanation will be continued, assuming that the cyclic groups G and $G_T$ are the multiplicative groups.

The mapping e is a function to obtain one output value from two input values and satisfies the following properties (a) and (b).

Property (a): There exists g by which e(g,g) is a generator of $G_T$. Here, g is a generator of G.

Property (b): $e(u^a, v^b) = e(u,v)^{ab}$ with respect to $u, v \in G, a, b \in Z$. Here, Z is a set of integers. [Formula 1]

The mapping e satisfying the properties (a) and (b) is referred to as a pairing. The pairing e can be expressed as follows:

$e: G \times G \rightarrow G_T$ [Formula 2]

An operation of the pairing e is referred to as "pairing calculation".

The groups G and $G_T$ defined by the pairing e are referred to as "pairing groups".

For instance, as the pairing groups G and $G_T$, the group G consisting of rational points on an elliptic curve and the group $G_T$ on a finite field can be denoted.

The pairing of the group G and the group $G_T$ can be either of a symmetry pairing and an asymmetry pairing. Hereinafter, the explanation will be continued for a case of the symmetry pairing. As for a case of the asymmetry pairing, it is possible for those skilled in the art to easily understand from the following explanation.

The generating method of the prime numbers p and q is, for instance, disclosed in Non Patent Literature 4.

The generating method of the pairing groups G and $G_T$ is, for instance, disclosed in Non Patent Literature 3.

After S120, the process proceeds to S130.

At S130, the setup pre-processing unit 212 generates a subgroup $G_p$ which forms a part of the group G using the group G. The subgroup $G_p$ is an element value group of which an order is the prime number p and which includes p number of element values.

The setup pre-processing unit 212 selects, as shown in Expression [SU1], plural element values from the generated subgroup $G_p$ at random.

[Formula 3]

$$g_p, f, v, v', w, h_1, h'_1, \ldots, h_L, h'_L \xleftarrow{U} G_p \quad \text{Expression [SU1]}$$

Here, $$a_1, a_2, \ldots, a_m \xleftarrow{U} A$$

means to select m elements from A at random.

After S130, the process proceeds to S131.

At S131, the setup pre-processing unit 212 generates a subgroup $G_q$ which forms a part of the group G using the group G. The subgroup $G_q$ is an element value group of which an order is the prime number q and which includes q number of element values.

The setup pre-processing unit 212, as shown in Expression [SU2], selects plural element values from the generated subgroup $G_q$ at random.

[Formula 4]

$$g_q, R_f, R_v, R'_v, R_{h,1}, R'_{h,1}, \ldots, R_{h,L}, R'_{h,L} \xleftarrow{U} G_q \quad \text{Expression [SU2]}$$

After S131, the process proceeds to S140.

At S140, the public key value calculating unit 213 calculates plural public key values using the plural element values selected at S130 and the plural element values selected at S131.

Hereinafter, plural calculation expressions [SU3] for calculating the plural public key values will be shown.

[Formula 5]

$$F := fR_f, V := vR_v, V' := v'R'_v, E := e(g,w),$$

$$H_1 := h_1 R_{h,1}, H'_1 := h'_1 R'_{h,1}, \ldots, H_L := h_L R_{h,L}, H'_L := h'_L R'_{h,L} \quad \text{Expression [SU3]}$$

Here, a:=b means to assign a value "b" to a variable "a".

After S140, the process proceeds to S150.

At S150, the public key generating unit 214 generates a public key PK including plural public key values calculated at S140.

The following shows Expression [SU4] expressing the public key PK.

[Formula 6]

$$PK = [G, G_T, n, e, g_p, g_q, F, V, V', H_1, H'_1, \ldots, H_L, H'_L, E] \quad \text{Expression [SU4]}$$

After S150, the process proceeds to S160.

At S160, the master secret key generating unit 215 generates a master secret key MSK including plural element values selected at S130 as master secret key values.

The following shows Expression [SU5] expressing the master secret key MSK.

[Formula 7]

$$MSK = [p, q, f, v, v', h_1, h'_1, \ldots, h_L, h'_L, w] \quad \text{Expression [SU5]}$$

After S160, the process proceeds to S170.

At S170, the setup outputting unit 216 stores the public key PK generated at S150 and the master secret key MSK generated at S160 in the setup storage unit 290.

Further, the setup outputting unit 216 stores the public key PK in a common server (not shown) of the system so as to be available to a whole system. However, the setup outputting unit 216 can also send the public key PK to each of the decryption devices 300 and the encryption device 400.

By S170, the process of the setup method terminates.

Figure 12:
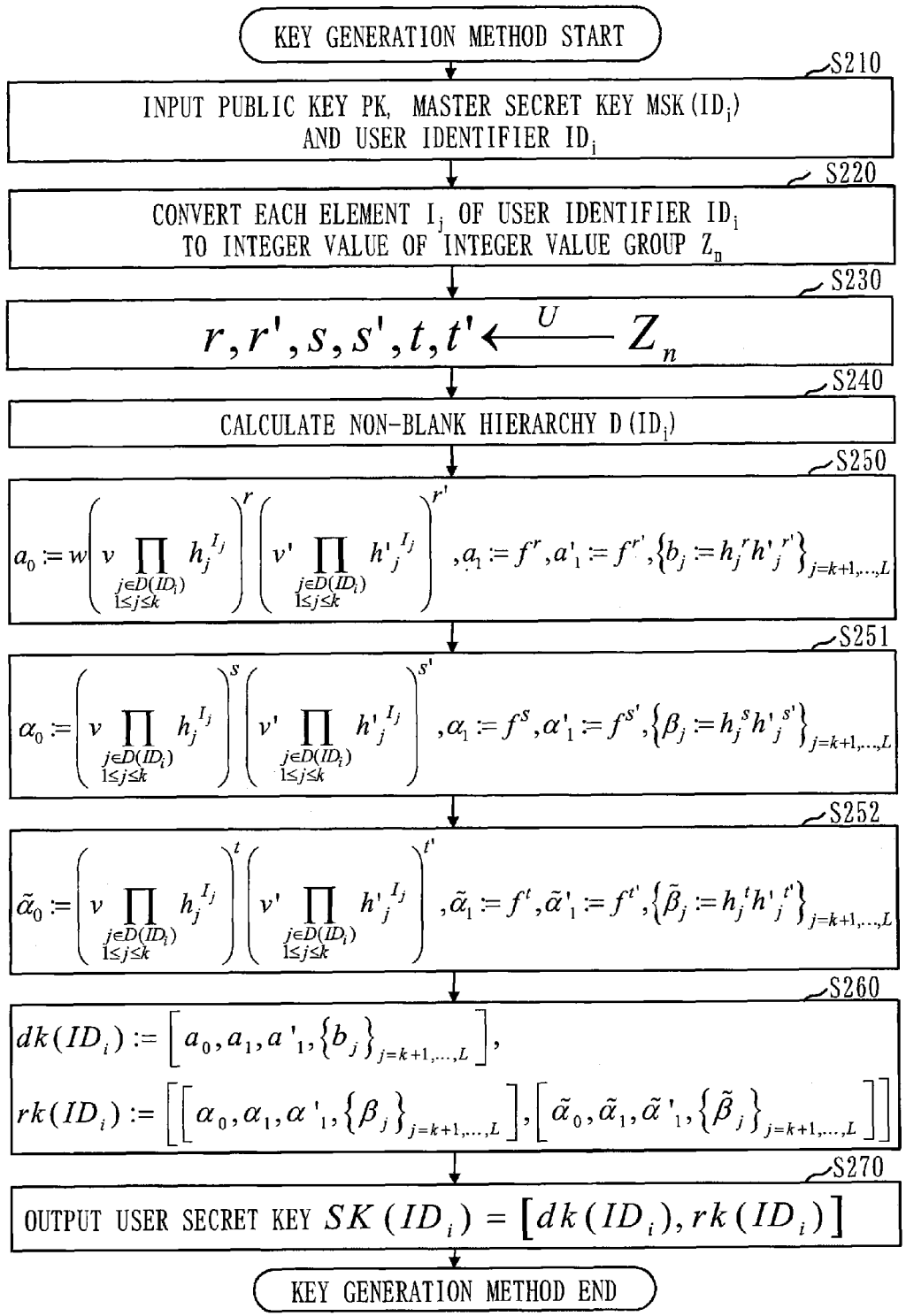
FIG. 12 is a flowchart showing a key generation method by the setup device 200 according to the first embodiment.

FIG. 12 is a flowchart showing a key generation method by the setup device 200 according to the first embodiment.

A processing flow of the key generation method implemented by the key generation processing unit 220 of the setup device 200 will be explained based on FIG. 12.

At S210, the key generation inputting unit 221 inputs the public key PK and the master secret key MSK which have been generated by the setup processing unit 210 from the setup storage unit 290.

The key generation inputting unit 221 inputs a user identifier $ID_i$ assigned to a specific user i from the inputting device or the setup storage unit 290.

After S210, the process proceeds to S220.

At S220, the key generation pre-processing unit 222 converts elements which form the user identifier $ID_i$ into any of integer values included in an integer value group $Z_n$. The integer value group $Z_n$ is a group consisting of integer values from 0 to n−1. As explained at S120 of FIG. 11, n is a product of the prime number p and the prime number q and is an order of the group G.

For instance, the key generation pre-processing unit 222 converts a binary number expressing elements to an integer value of decimal number. The key generation pre-processing unit 222 can implement remainder operation of the obtained integer value of decimal number with a modulus n and obtain a residue value as the integer value.

Further, the key generation pre-processing unit 222 can obtain the integer value by substituting elements to a hash function.

Further, a conversion table in which the elements and the integer values are made related can be stored previously in the setup storage unit 290, and the key generation pre-processing unit 222 can obtain the integer values corresponding to the elements from the setup storage unit 290.

However, if all the elements which form the user identifier $ID_i$ are integer values, S220 is unnecessary to perform. Further, S220 is unnecessary to perform for elements expressed by integer values out of plural elements which form the user identifier $ID_i$.

After S220, the process proceeds to S230.

At S230, the key generation pre-processing unit 222 selects, as shown in Expression [KG1], plural integer values from the integer value group $Z_n$ (integer values from 0 to n−1) at random.

However, if the conditional expression [KG1-1] is not satisfied, the key generation pre-processing unit 222 re-selects plural integer values.

[Formula 8]

$$r, r', s, s't, t' \xleftarrow{U} Z_n \quad \text{Expression [KG1]}$$

$$detA \neq 0 \bmod p \wedge detA \neq 0 \bmod q \quad \text{Expression [KG1-1]}$$

Here, $$A = \begin{pmatrix} s & t \\ s' & t' \end{pmatrix}.$$

After S230, the process proceeds to S240.

At S240, the key generation pre-processing unit 222 discriminates elements other than the blank value "ϕ" out of plural elements included in the user identifier $ID_i$.

Furthermore, the key generation pre-processing unit 222 discriminates the number of the hierarchy corresponding to the elements other than the blank value "ϕ" as "non-blank hierarchical value D". Hereinafter, the hierarchy corresponding to the element other than the blank value "ϕ" can be referred to as "non-blank hierarchy".

Further, the key generation pre-processing unit 222 discriminates the elements showing the blank value "ϕ" out of plural elements included in the user identifier $ID_i$, and discriminates the number of the hierarchy corresponding to the elements showing the blank value "ϕ" as "blank hierarchical value N". Hereinafter, a hierarchy corresponding to the elements expressing the blank value "ϕ" is referred to as "the blank hierarchy value".

The following shows Expression [KG2] showing the non-blank hierarchical value D and Expression [KG3] showing the blank hierarchical value N.

[Formula 9]

$$D(ID_i) = \{1 \leq j \leq L | p_j \neq \phi\} \quad \text{Expression [KG2]}$$

$$N(ID_i) = \{1 \leq j \leq L | p_j = \phi\} \quad \text{Expression [KG3]}$$

Here, $D(ID_i)$: non-blank hierarchical value D of the user identifier $ID_i$; and $N(ID_i)$: blank hierarchical value N of the user identifier $ID_i$.

For instance, in case of the user identifier $ID_3$ (Administration Department, Accounts Division, ϕ, ϕ) of Accounts Division Chief shown in FIG. 3, the non-blank hierarchical values D are "1" and "2", and the blank hierarchical values N are "3" and "4".

Further, in case of the user identifier $ID_8$ (Administration Department, ϕ, ϕ, TANAKA) of Mr. TANAKA, the non-blank hierarchical values D are "1" and "4", and the blank hierarchical values N are "2" and "3".

After S240, the process proceeds to S250.

At S250, the user secret key value calculating unit 223 calculates plural decrypting key values using the master secret key MSK, the user identifier $ID_i$, the non-blank hierarchical values D of the user identifier $ID_i$, and the integer values selected at S230.

Here, the number of the hierarchy to which the user i belongs is "K".

The following shows plural calculation expressions [KG4] for calculating plural decrypting key values.

[Formula 10]

$$a_0 := w\left(v \prod_{\substack{j \in D(ID_i) \\ 1 \leq j \leq k}} h_j^{l_j}\right)^r \left(v' \prod_{\substack{j \in D(ID_i) \\ 1 \leq j \leq k}} h_j'^{l_j}\right)^{r'}, \quad \text{Expression [KG4]}$$

$$a_1 := f^r,$$

$$a_1' := f^{r'}, \{b_j := h_j^r h_j'^{r'}\}_{j=k+1,\ldots,L}$$

Here, $a_0, a_1, a'_1, \{b_j\}$: decrypting key value.

After S250, the process proceeds to S251.

At S251, the user secret key value calculating unit 223 calculates plural randomizing key values (A) similarly to S250.

The following shows plural calculation expressions [KG5] for calculating plural randomizing key values (A).

[Formula 11]

$$\alpha_0 := \left(v \prod_{\substack{j \in D(ID_i) \\ 1 \leq j \leq k}} h_j^{l_j}\right)^s \left(v' \prod_{\substack{j \in D(ID_i) \\ 1 \leq j \leq k}} h_j'^{l_j}\right)^{s'}, \quad \text{Expression [KG5]}$$

$$\alpha_1 := f^s,$$

$$\alpha_1' := f^{s'}, \{\beta_j := h_j^s h_j'^{s'}\}_{j=k+1,\ldots,L}$$

Here, $\alpha_0, \alpha_1, \alpha'_1, \{\beta_j\}$: randomizing key value (A).

After S251, the process proceeds to S252.

At S252, the user secret key value calculating unit 223 calculates plural randomizing key values (B) similarly to S251.

The following shows plural calculation expressions [KG6] for calculating plural randomizing key values (B).

[Formula 12]

$$\tilde{\alpha}_0 := \left(v \prod_{\substack{j \in D(ID_i) \\ 1 \leq j \leq k}} h_j^{l_j}\right)^t \left(v' \prod_{\substack{j \in D(ID_i) \\ 1 \leq j \leq k}} h_j'^{l_j}\right)^{t'}, \quad \text{Expression [KG6]}$$

$$\tilde{\alpha}_1 := f^t,$$

$$\tilde{\alpha}_1' := f^{t'}, \{\tilde{\beta}_j := h_j^t h_j'^{t'}\}_{j=k+1,\ldots,L}$$

Here, $\tilde{\alpha}_0, \tilde{\alpha}_1, \tilde{\alpha}'_1, \{\tilde{\beta}_j\}$: randomizing key value (B).

After S252, the process proceeds to S260.

At S260, the user secret key generating unit 224 generates a decrypting key dk including the plural decrypting key values calculated at S250.

Furthermore, the user secret key generating unit 224 generates a randomizing key rk including the plural randomizing key values (A) calculated at S251 and the plural randomizing key values (B) calculated at S252.

The following shows Expression [KG7] expressing the decrypting key dk and Expression [KG8] expressing the randomizing key rk.

[Formula 13]

$$dk(ID_i) := [a_0, a_1, a'_1, \{b_j\}_{j=k+1,\ldots,L}], \quad \text{Expression [KG7]}$$

$$rk(ID_i) := [[\alpha_0, \alpha_1, \alpha'_1, \{\beta_j\}_{j=k+1,\ldots,L}], [\tilde{\alpha}_0, \tilde{\alpha}_1, \tilde{\alpha}'_1, \{\tilde{\beta}_j\}_{j=k+1,\ldots,L}]] \quad \text{Expression [KG8]}$$

Here, $dk(ID_i)$: decrypting key dk of the user i; and $rk(ID_i)$: randomizing key rk of the user i.

After S260, the process proceeds to S270.

At S270, the user secret key generating unit 224 generates a user secret key SK of the user i using the decrypting key dk and the randomizing key rk which have been generated at S260.

Then, the user secret key generating unit 224 outputs the generated user secret key SK. For instance, the user secret key generating unit 224 sends the generated user secret key SK to the decryption device 300 of the user i.

The following shows Expression [KG9] expressing the user secret key SK of the user i.

[Formula 14]

$$SK(ID_i) := [dk(ID_i), rk(ID_i)] \quad \text{Expression [KG9]}$$

Here, $SK(ID_i)$: user secret key SK of the user i.

By S270, the process of the key generation method terminates.

The decrypting key dk included in the user secret key SK is data used by the decryption device 300 for decrypting the ciphertext data CT, and the randomizing key rk included in the user secret key SK is data used by the decryption device 300 for the key delegation.

The key delegation is a process to generate a user secret key of a user belonging to the lower hierarchy by the decryption device 300 using the user secret key SK of its own device.

Figure 13:
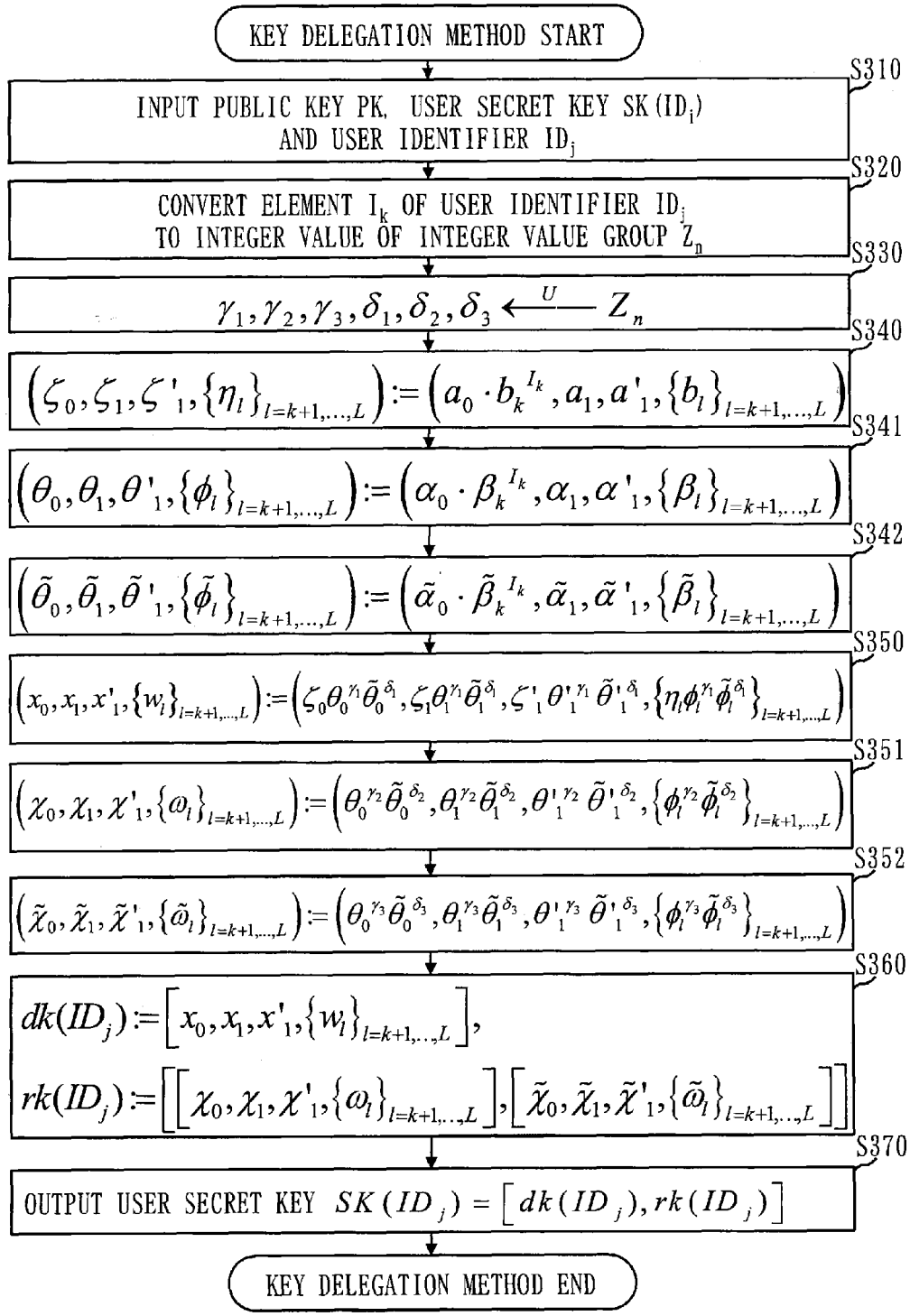
FIG. 13 is a flowchart showing a key delegation method by the decryption device 300 according to the first embodiment.

FIG. 13 is a flowchart showing a key delegation method by the decryption device 300 according to the first embodiment.

A processing flow of the key delegation method implemented by the key delegation processing unit 320 of the decryption device 300 will be explained based on FIG. 13.

At S310, the key delegation inputting unit 321 inputs the public key PK from the inputting device, the common server (not shown) or a decryption storage unit 390. The key delegation inputting unit 321 inputs the user secret key SK($ID_i$) of the user i from the inputting device or the decryption storage unit 390. The user i is, for instance, a user who uses the decryption device.

The key delegation inputting unit 321 inputs the user identifier $ID_j$ of the user j from the inputting device or the decryption storage unit 390. The user j is a user who belongs to the hierarchy which is one hierarchy lower than that of the user i and who is a delegatee of the user secret key.

Hereinafter, it is assumed that the number of the hierarchy to which the user j (the delegatee) belongs is "k", and the number of the hierarchy to which the user i belongs is "k−1".

After S310, the process proceeds to S320.

At S320, the key delegation pre-processing unit 322 converts the element $I_k$ included in the user identifier $ID_j$ into either of the integer values included in the integer value group $Z_n$ (integer values from 0 to n−1).

The element $I_k$ is the k-th element out of plural elements included in the user identifier $ID_j$, that is, the element corresponding to the k-th hierarchy to which the user j (the delegatee) belongs.

The conversion method is similar to S220 (refer to FIG. 12).

After S320, the process proceeds to S330.

At S330, the key delegation pre-processing unit 322 selects, as shown in Expression [KT1], plural integer values from the integer value groups $Z_n$ at random.

However, when the conditional expression [KT1-1] is not satisfied, the key delegation pre-processing unit 322 re-selects plural integer values.

[Formula 15]

$$\gamma_1, \gamma_2, \gamma_3, \delta_1, \delta_2, \delta_3 \xleftarrow{U} Z_n \quad \text{Expression [KT1]}$$

$$g_p^{detB} \neq 1 \wedge g_q^{detB} \neq 1 \quad \text{Expression [KT1-1]}$$

$$\text{Here, } B = \begin{pmatrix} \gamma_2 & \gamma_3 \\ \delta_2 & \delta_3 \end{pmatrix}.$$

After S330, the process proceeds to S340.

At S340, the delegation key value calculating unit 323 calculates plural working values (a) using the decrypting key dk($ID_i$) of the user i included in the user secret key SK($ID_i$) and the element $I_k$ included in the user identifier $ID_j$ of the user j.

The following shows the calculation expression [KT2] for calculating plural working values (a).

[Formula 16]

$$(\zeta_0, \zeta_1, \zeta'_1, \{\eta_l\}_{l=k+1,\ldots,L}) := (a_0 \cdot b_k^{I_k}, a_1, a'_1, \{b_l\}_{l=k+1,\ldots,L}) \quad \text{Expression [KT2]}$$

Here, $\zeta_0, \zeta_1, \zeta'_1, \{\eta_l\}$: working value (a).

After S340, the process proceeds to S341.

At S341, the delegation key value calculating unit 323 calculates plural working values (b) using the randomizing key rk($ID_i$) of the user i included in the user secret key SK($ID_i$) and the element $I_k$ included in the user identifier $ID_j$ of the user j.

The following shows calculation expression [KT3] for calculating plural working values (b).

[Formula 17]

$$(\theta_0, \theta_1, \theta'_1, \{\phi_l\}_{l=k+1,\ldots,L}) := (\alpha_0 \cdot \beta_k^{I_k}, \alpha_1, \alpha'_1, \{\beta_l\}_{l=k+1,\ldots,L}) \quad \text{Expression [KT3]}$$

Here, $\theta_0, \theta_1, \theta'_1, \{\phi_l\}$: working value (b).

After S341, the process proceeds to S342.

At S342, the delegation key value calculating unit 323 calculates plural working values (c) similarly to S341.

The following shows calculation expression [KT4] for calculating plural working values (c).

[Formula 18]

$$(\tilde{\theta}_0, \tilde{\theta}_1, \tilde{\theta}'_1, \{\tilde{\phi}_l\}_{l=k+1,\ldots,L}) := (\tilde{\alpha}_0 \cdot \tilde{\beta}_k^{I_k}, \tilde{\alpha}_1, \tilde{\alpha}'_1, \{\tilde{\beta}_l\}_{l=k+1,\ldots,L}) \quad \text{Expression [KT4]}$$

Here, $\tilde{\theta}_0, \tilde{\theta}_1, \tilde{\theta}'_1, \{\tilde{\phi}_l\}$: working value (c).

After S342, the process proceeds to S350.

At S350, the delegation key value calculating unit 323 calculates plural decrypting key values using the working values (a) to (c) calculated at steps from S340 to S342 and the integer values selected at S330.

The following shows calculation expression [KT5] for calculating the plural decrypting key values.

[Formula 19]

$$(x_0, x_1, x'_1, \{w_l\}_{l=k+1,\ldots,L}) := (\zeta_0 \theta_0^{\gamma_1} \tilde{\theta}_0^{\delta_1}, \zeta_1 \theta_1^{\gamma_1} \tilde{\theta}_1^{\delta_1}, \zeta'_1 \theta'^{\gamma_1}_1 \tilde{\theta}'^{\delta_1}_1, \{\eta_l \phi_l^{\gamma_1} \tilde{\phi}_l^{\delta_1}\}_{l=k+1,\ldots,L}) \quad \text{Expression [KT5]}$$

Here, $x_0, x_1, x'_1, \{w_l\}$: decrypting key value.

After S350, the process proceeds to S351.

At S351, the delegation key value calculating unit 323 calculates plural randomizing key values (A) using the working value (b) calculated at S341, the working value (c) calculated at S342, and the integer values selected at S330.

The following shows calculation expression [KT6] for calculating plural randomizing key values (A).

[Formula 20]

$$(\chi_0, \chi_1, \chi'_1, \{\omega_l\}_{l=k+1,\ldots,L}) := (\theta_0^{\gamma_2} \tilde{\theta}_0^{\delta_2}, \theta_1^{\gamma_2} \tilde{\theta}_1^{\delta_2}, \theta'^{\gamma_2}_1 \tilde{\theta}'^{\delta_2}_1, \{\phi_l^{\gamma_2} \tilde{\phi}_l^{\delta_2}\}_{l=k+1,\ldots,L}) \quad \text{Expression [KT6]}$$

Here, $\chi_0, \chi_1, \chi'_1, \{\omega_l\}$: randomizing key value (A).

After S351, the process proceeds to S352.

At S352, the delegation key value calculating unit 323 calculates plural randomizing key values (B) similarly to S351.

The following shows calculation expression [KT7] for calculating plural randomizing key values (B).

[Formula 21]

$$(\tilde{\chi}_0, \tilde{\chi}_1, \tilde{\chi}'_1, \{\tilde{\omega}_l\}_{l=k+1,\ldots,L}) := (\theta_0^{\gamma_3} \tilde{\theta}_0^{\delta_3}, \theta_1^{\gamma_3} \tilde{\theta}_1^{\delta_3}, \theta'^{\gamma_3}_1 \tilde{\theta}'^{\delta_3}_1, \{\phi_l^{\gamma_3} \tilde{\phi}_l^{\delta_3}\}_{l=k+1,\ldots,L}) \quad \text{Expression [KT7]}$$

Here, $\tilde{\chi}_0, \tilde{\chi}_1, \tilde{\chi}'_1, \{\tilde{\omega}_l\}$: randomizing key value (B).

After S352, the process proceeds to S360.

At S360, the delegation key generating unit 324 generates a decrypting key dk(ID$_j$) of the user j using the plural decrypting key values calculated at S350.

Furthermore, the delegation key generating unit 324 generates a randomizing key rk(ID$_j$) using the plural randomizing key values (A) calculated at S351 and the plural randomizing key values (B) calculated at S352.

The following shows Expression [KT8] expressing the decrypting key dk(ID$_j$) of the user j and Expression [KT9] expressing the randomizing key rk(ID$_j$) of the user j.

[Formula 22]

$$dk(\mathrm{ID}_j) := [x_0, x_1, x'_1, \{w_l\}_{l=k+1,\ldots,L}], \quad \text{Expression [KT8]}$$

$$rk(\mathrm{ID}_j) := [[\chi_0, \chi_1, \chi'_1, \{\omega_l\}_{l=k+1,\ldots,L}], [\tilde{\chi}_0, \tilde{\chi}_1, \tilde{\chi}'_1, \{\tilde{\omega}_l\}_{l=k+1,\ldots,L}]] \quad \text{Expression [KT9]}$$

Here, dk(ID$_j$): decrypting key dk of the user j; and rk(ID$_j$): randomizing key rk of the user j.

After S360, the process proceeds to S370.

At S370, the delegation key generating unit 324 generates the user secret key SK(ID$_j$) of the user j using the decrypting key dk(ID$_j$) and the randomizing key rk(ID$_j$) generated at S360, and stores the generated user secret key SK(ID$_j$) in the decryption storage unit 390.

Further, the delegation key generating unit 324 outputs the generated user secret key SK(ID$_j$). For instance, the delegation key generating unit 324 sends the generated user secret key SK(ID$_j$) to the decryption device 300 of the user j.

The following shows Expression [KT10] expressing the user secret key SK(ID$_j$) of the user j.

[Formula 23]

$$SK(\mathrm{ID}_j) := [dk(\mathrm{ID}_j), rk(\mathrm{ID}_j)] \quad \text{Expression [KT10]}$$

Here, SK(ID$_j$): user secret key SK of the user j.

By S370, the process of the key delegation method terminates.

However, when the user secret key SK(ID$_{j2}$) of the user j2 who belongs to a hierarchy which is one hierarchy lower than that of the user j is to be generated, the processes of the key delegation method (S310 to S370) are repeated by replacing the user i with the user j and replacing the user j with the user j2.

Although the process of the key generation method explained in FIG. 12 apparently differs from the key delegation method explained in FIG. 13, both of the key generation method and the key delegation method can generate the same user secret keys SK for the same user.

Therefore, either of the key generation method and the key delegation method is used, thereby generating the user secret key SK of the specific user.

Figure 14:
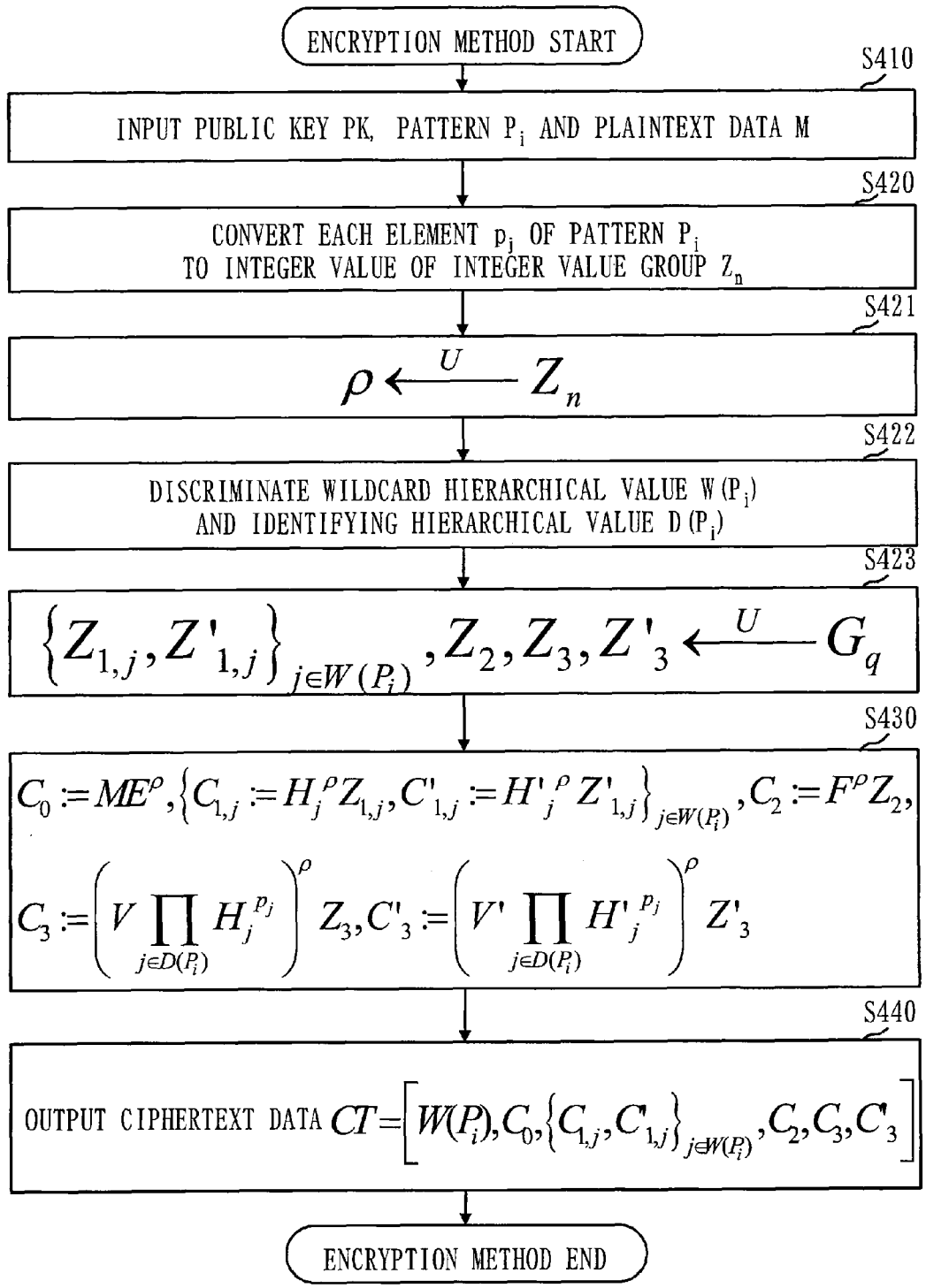
FIG. 14 is a flowchart showing an encryption method by the encryption device 400 according to the first embodiment.

FIG. 14 is a flowchart showing an encryption method by the encryption device 400 according to the first embodiment.

A processing flow of the encryption method implemented by the encryption processing unit 410 of the encryption device 400 will be explained based on FIG. 14.

At S410, the encryption inputting unit 411 inputs the public key PK from the inputting device, the common server (not shown) or the encryption storage unit 490.

The encryption inputting unit 411 inputs the pattern P$_i$ for the user i from the inputting device, the common server, or the encryption storage unit 490. The user i means one user or plural users who can decrypt the ciphertext data CT.

The encryption inputting unit 411 inputs the plaintext data M from the inputting device or the encryption storage unit 490.

After S410, the process proceeds to S420.

At S420, the encryption pre-processing unit 412 converts the elements included in the pattern P$_i$ into any of the integer values included in the integer value group Z$_n$ (integer values from 0 to n−1).

The conversion method is similar to S220 (refer to FIG. 12).

After S420, the process proceeds to S421.

At S421, the encryption pre-processing unit 412 selects an integer value ρ from the integer value group Z$_n$ at random as shown in Expression [EN1].

[Formula 24]

$$\rho \xleftarrow{U} Z_n \quad \text{Expression [EN1]}$$

After S421, the process proceeds to S422.

At S422, the encryption pre-processing unit 412 discriminates the element showing the wildcard value "*" out of plural elements included in the pattern P$_i$.

Furthermore, the encryption pre-processing unit 412 discriminates the number of the hierarchy corresponding to the element showing the wildcard value "*" as "wildcard hierarchical value W". Hereinafter, a hierarchy corresponding to the element showing the wildcard value "*" is referred to as "wildcard hierarchy".

Further, the encryption pre-processing unit 412 discriminates the element showing the blank value "ϕ" out of plural elements included in the pattern P$_i$, and discriminates the number of the hierarchy corresponding to the element showing the blank value "ϕ" as "blank hierarchical value N". Hereinafter, a hierarchy corresponding to the elements showing the blank value "ϕ" is referred to as "blank hierarchy".

Further, the encryption pre-processing unit 412 discriminates elements other than the wildcard value "*" and the blank value "ϕ" out of plural elements included in the pattern P$_i$, and discriminates the number of the hierarchy corresponding to the elements other than the wildcard value "*" and the blank value "ϕ" as "identifying hierarchical value D". Hereinafter, the hierarchies corresponding to the elements other than the wildcard value "*" and the blank value "ϕ" are referred to as "identifying hierarchies".

The following shows Expression [EN2] expressing the wildcard hierarchical value W, Expression [EN3] expressing the blank hierarchical value N, and Expression [EN4] expressing the identifying hierarchical value D.

[Formula 25]

$$W(P_i) = \{1 \le j \le L | p_j = * \} \quad \text{Expression [EN2]}$$

$$N(P_i) = \{1 \le j \le L | p_j = \phi \} \quad \text{Expression [EN3]}$$

$$D(P_i) = \{1 \le j \le L | p_j \ne * \wedge p_j \ne \phi \} \quad \text{Expression [EN4]}$$

Here,

W(P$_i$): wildcard hierarchical value W of pattern P$_i$;

N(P$_i$): blank hierarchical value N of pattern P$_i$;

D(P$_i$): identifying hierarchical value D of pattern P$_i$; and p$_j$: j-th element of pattern p$_i$.

For instance, in case of the pattern P$_5$ (Administration Department, *, ϕ, ϕ) shown in FIG. 4, the wildcard hierarchical value W is "2", the blank hierarchical values N are "3" and "4", and the identifying hierarchical value D is "1".

Further, in case of the pattern P$_8$ (Administration Department, ϕ, ϕ, TANAKA), there is no the wildcard hierarchical value W, the blank hierarchical values N are "2" and "3", and the identifying hierarchical values D are "1" and "4".

After S422, the process proceeds to S423.

At S423, the encryption pre-processing unit 412 selects plural integer values from the integer value group $Z_n$ at random based on the wildcard hierarchical value W, and raises an integer value to the public key value $g_q$ included in the public key PK for each of the selected integer values.

This process equals to selecting plural element values from the group $G_q$ in which the prime number q is set to an order at random as shown in Expression [EN5].

[Formula 26]

$$\{Z_{1,j}, Z'_{1,j}\}_{j \in W(P_i)}, Z_2, Z_3, Z'_3 \xleftarrow{U} G_q \qquad \text{Expression [EN5]}$$

After S423, the process proceeds to S430.

At S430, the cipher value calculating unit 413 calculates plural cipher values using the public key PK, the pattern $P_i$, the plaintext data M, the integer value ρ selected at S421, and the plural integer values calculated at S423.

The following shows plural calculation expressions [EN6] for calculating plural cipher values.

[Formula 27]

$$C_0 := ME^\rho, \{C_{1,j} := H_i^\rho Z_{1,j}, C'_{1,j} := H_i'^\rho Z'_{1,j}\}_{j \in W(P_i)}, \quad \text{Expression [EN6]}$$
$$C_2 := F^\rho Z_2,$$
$$C_3 := \left(V \prod_{j \in D(P_i)} H_j^{P_j}\right)^\rho Z_3, \; C'_3 := \left(V' \prod_{j \in D(P_i)} H_j'^{P_j}\right)^\rho Z'_3$$

Here, $C_0$, $\{C_{1,j}, C'_{1,j}\}$, $C_2$, $C_3$, $C'_3$: cipher value.

After S430, the process proceeds to S440.

At S440, the ciphertext generating unit 414 generates the ciphertext data. CT for the user i using the wildcard hierarchical value W discriminated at S422 and plural cipher values calculated at S430, and stores the generated ciphertext data CT in the encryption storage unit 490.

The following shows Expression [EN7] expressing the ciphertext CT.

[Formula 28]

$$CT = [W(P_i), C_0, \{C_{1,j}, C'_{1,j}\}_{j \in W(P_i)}, C_2, C_3, C'_3] \qquad \text{Expression [EN7]}$$

Here, CT: ciphertext data for the user i.

Further, the ciphertext generating unit 414 outputs the generated ciphertext data CT. For instance, the ciphertext generating unit 414 stores the ciphertext data CT in the common server (not shown).

By S440, the process of the encryption method terminates.

In the above encryption method, it is assumed that the plaintext data M is the element of the pairing group $G_T$ (refer to S120 of FIG. 11).

However, if the plaintext data M is not the element of the pairing group $G_T$, a hybrid encryption system can be used. In the hybrid encryption system, the plaintext data M is encrypted by Common key crypto system using the session key. Then, the plaintext data M is replaced with the session key, and the process of the above encryption method is carried out.

Figure 15:
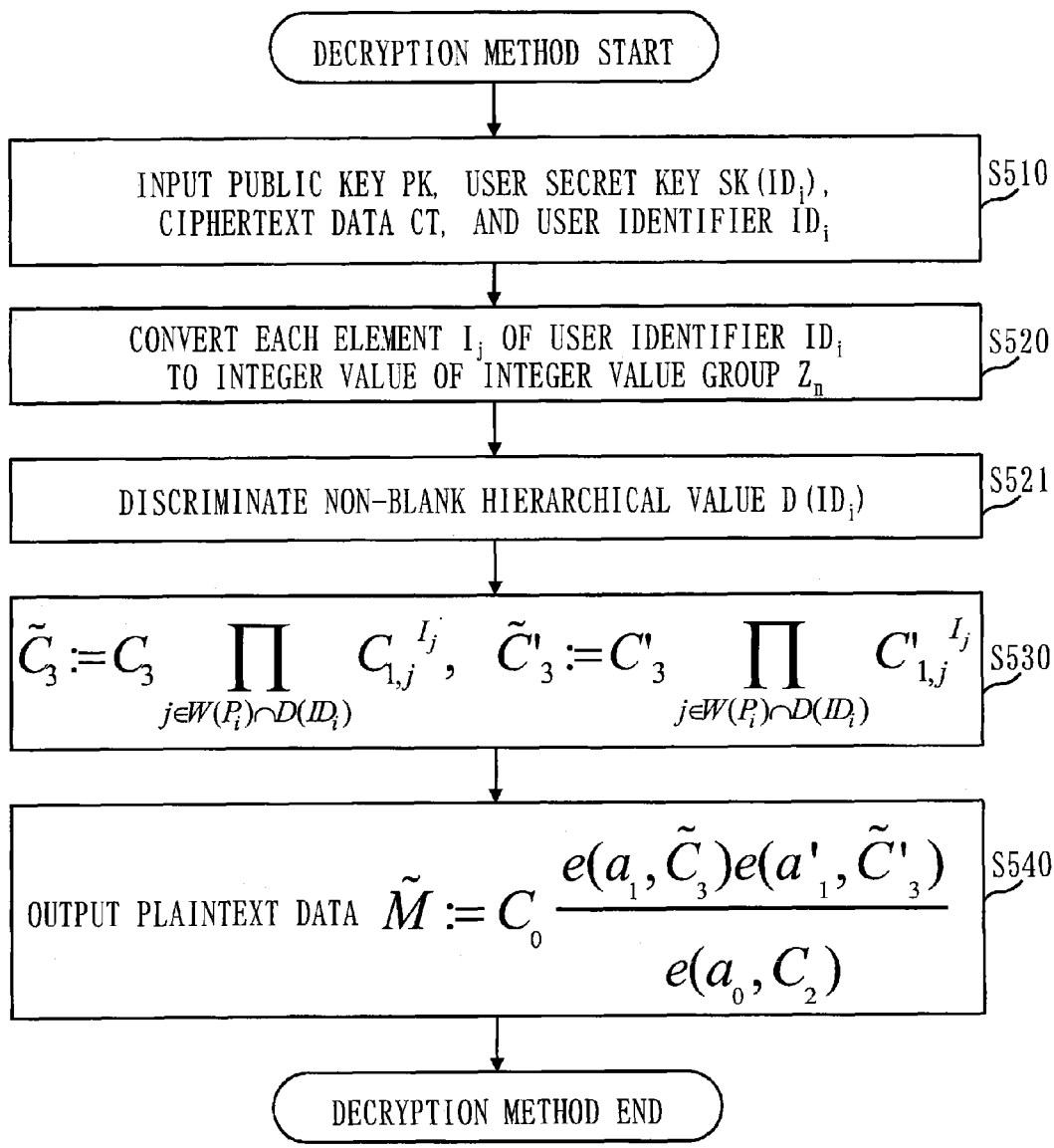
FIG. 15 is a flowchart showing a decryption method by the decryption device 300 according to the first embodiment.

FIG. 15 is a flowchart showing a decryption method by the decryption device 300 according to the first embodiment.

A processing flow of the decryption method implemented by the decryption processing unit 310 of the decryption device 300 will be explained based on FIG. 15.

At S510, the decryption inputting unit 311 inputs the public key PK and the ciphertext data CT from the inputting device, the common server (not shown), or the decryption storage unit 390.

The decryption inputting unit 311 inputs the user secret key $SK(ID_i)$ and the user identifier $ID_i$ of the user i from the inputting device or the decryption storage unit 390. The user i is a user who decrypts the ciphertext data CT and uses the decryption device 300.

After S510, the process proceeds to S520.

At S520, the decryption pre-processing unit 312 converts the elements included in the user identifier $ID_i$ into any of the integer values included in the integer value group $Z_n$ (integer values from 0 to n−1).

The conversion method is similar to S220 (refer to FIG. 12).

After S520, the process proceeds to S521.

At S521, the decryption pre-processing unit 312 discriminates the non-blank hierarchical value D based on the user identifier $ID_i$.

The discriminating method is similar to S240 (refer to FIG. 12).

After S521, the process proceeds to S530.

At S530, the decrypting unit 313 calculates plural working values using the ciphertext data CT, the user identifier $ID_i$, and the non-blank hierarchical value D discriminated at S521.

The following shows plural calculation expressions [DE1] for calculating plural working values.

[Formula 29]

$$\tilde{C}_3 := C_3 \prod_{j \in W(P_i) \cap D(ID_i)} C_{1,j}^{I_j}, \qquad \text{Expression [DE1]}$$

$$\tilde{C}'_3 := C'_3 \prod_{j \in W(P_i) \cap D(ID_i)} C'^{I_j}_{1,j}$$

Here, $\tilde{C}_3$, $\tilde{C}'_3$: working values.

After S530, the process proceeds to S540.

At S540, the decrypting unit 313 calculates the plaintext data M using the ciphertext data CT, the user secret key $SK(ID_i)$, a function e of the mapping included in the public key PK, and plural working values calculated at S530.

The following shows calculation expression [DE2] for calculating the plaintext data M.

[Formula 30]

$$\tilde{M} := C_0 \frac{e(a_1, \tilde{C}_3) e(a'_1, \tilde{C}'_3)}{e(a_0, C_2)} \qquad \text{Expression [DE2]}$$

Here, $\tilde{M}$: decrypted plaintext data M.

The decrypting unit 313 outputs the calculated plaintext data M. For instance, the decrypting unit 313 displays the plaintext data M on a display device.

By S540, the decryption method terminates.

In the hierarchical identity-based encryption system 100, if a user is the valid user corresponding to the pattern P which has been used for encrypting the plaintext data M, the user can decrypt the ciphertext data CT using the user secret key SK and the user identifier ID of the user's own.

This is because, out of the plural elements p included in the pattern P, the element $p_j$ corresponding to the non-blank hierarchy ($\neq \phi$) of the user identifier ID is the element $I_j$ of the user identifier ID or the wildcard value "*", and the wildcard value "*" is "rehashed" by the element $I_j$ of the user identifier ID at the decrypting process (S530 of FIG. 15).

On the other hand, an invalid user other than the user corresponding to the pattern P cannot decrypt the ciphertext data CT using the user secret key SK and the user identifier ID of the user's own.

This is because, at the decrypting process, the wildcard value "*" is "rehashed" by the element $I_j$ of the invalid user identifier ID.

The following shows the relational expression showing the plaintext data M obtained by decrypting the ciphertext data CT and the plaintext data M before encrypting.

[Formula 31]

$$\tilde{M} := C_0 \frac{e(a_1, \tilde{C}_3) e(a'_1, \tilde{C}'_3)}{e(a_0, C_2)}$$

$$= ME^\rho \frac{e\left(g^r, \left(V \prod_{j \in D(ID)} H_j^{I_j}\right)^\rho Z_3\right) \cdot e\left(g^{r'}, \left(V' \prod_{j \in D(ID)} H_j'^{I_j}\right)^\rho Z'_3\right)}{e\left(w\left(v \prod_{j \in D(ID)} h_j^{I_j}\right)^r \left(v' \prod_{j \in D(ID)} h_j'^{I_j}\right)^{r'}, G^\rho Z_2\right)}$$

$$= Me(g, w)^\rho \frac{e\left(g^r, \left(v \prod_{j \in D(ID)} h_j^{I_j}\right)^\rho\right) \cdot e\left(g^{r'}, \left(v' \prod_{j \in D(ID)} h_j'^{I_j}\right)^\rho\right)}{e\left(w\left(v \prod_{j \in D(ID)} h_j^{I_j}\right)^r \left(v' \prod_{j \in D(ID)} h_j'^{I_j}\right)^{r'}, g^\rho\right)}$$

$$= Me(g, w)^\rho \frac{e\left(g^r, \left(v \prod_{j \in D(ID)} h_j^{I_j}\right)^\rho\right) \cdot e\left(g^{r'}, \left(v' \prod_{j \in D(ID)} h_j'^{I_j}\right)^\rho\right)}{e(w, g^\rho) \cdot e\left(\left(v \prod_{j \in D(ID)} h_j^{I_j}\right)^r, g^\rho\right) \cdot e\left(\left(v' \prod_{j \in D(ID)} h_j'^{I_j}\right)^{r'}, g^\rho\right)}$$

$$= M$$

The expression of the first line is the above Expression [DE2] (refer to S540 of FIG. 15).

The expression of the second line is an expression obtained by developing the right hand side of the first line based on the above Expression "[DE1]" (refer to S530 of FIG. 15).

The expression of the third line is an expression obtained by developing the expression of the second line based on property (1) of the pairing group which will be discussed below.

The expression of the fourth line is an expression obtained by breaking down the denominator of the expression of the third line.

Then, common factors are cancelled from the numerator and denominator of the expression of the fourth line, thereby obtaining the plaintext data M.

The following shows the property (1) of the pairing group.

Property (1): $e(x_p, y_q) = 1$ with respect to arbitrary $x_p \in G_p, y_q \in G_q$. [Formula 32]

The hierarchical identity-based encryption system 100 can secure the anonymity of the ciphertext. Here, the anonymity means the safety such as defined by ANON-sID of Non Patent Literature 5. In other words, it is a property which does not leak the elements $p_j$ obtained by excluding the wildcard portion from the ciphertext, that is, the information related to the user identifier.

Further, the confidentiality of the ciphertext can be also secured. Here, the confidentiality means the safety such as defined by IND-sID of Non Patent Literature 5. In other words, it is a property which does not leak the information related to the plaintext from the ciphertext.

The above anonymity and confidentiality are shown by simulation based safety proof, which is popularly used in the cryptography field. The number-theoretic hypothesis at that time is the same as the hypothesis described in Non Patent Literature 5. It is considered that those skilled in the art can understand the safety and reproduce the safety proof if necessary.

In the present embodiment, the method using the symmetry pairing has been explained, however, it is easily understood by those skilled in the art that the method is extended to a configuration using the asymmetry pairing.

According to the present embodiment, the Wildcard-applicable anonymous hierarchical identity-based encryption system can be implemented. Namely, it is unnecessary to generate ciphertext for each user of all the users belonging to a certain layer of the hierarchy, but it is sufficient to generate one ciphertext.

This enables to reduce the size (the number) of the ciphertext.

Furthermore, in the decrypting operation (refer to S540 of FIG. 15), the number of operations of the pairing e can be made a fixed number of times (three times, specifically) instead of a number being proportional to the number of hierarchies.

This is because, among the configurational elements of the ciphertext, the element which is proportional to the number of hierarchies is deleted.

Because of this, in an organization having a large hierarchal structure such as large corporations or public agencies, the high-speed decrypting operation can be implemented.

Furthermore, it is possible to put a blank "$\phi$" to the user identifier by making related to the intermediate hierarchy.

Because of this, it is possible to adapt flexibly to a user who is outside of the normal hierarchical structure such as Mr. TANAKA shown in FIG. 2.

That is, it is possible to flexibly adapt to a unique hierarchical structure.

In the embodiment, the setup device 200 can be split into the setup device (the setup processing unit 210) and the key generation device (the key generation processing unit 220).

Further, the decryption device 300 can be split into the decryption device (the decryption processing unit 310) and the key delegation device (the key delegation processing unit 320).

Figure 16:
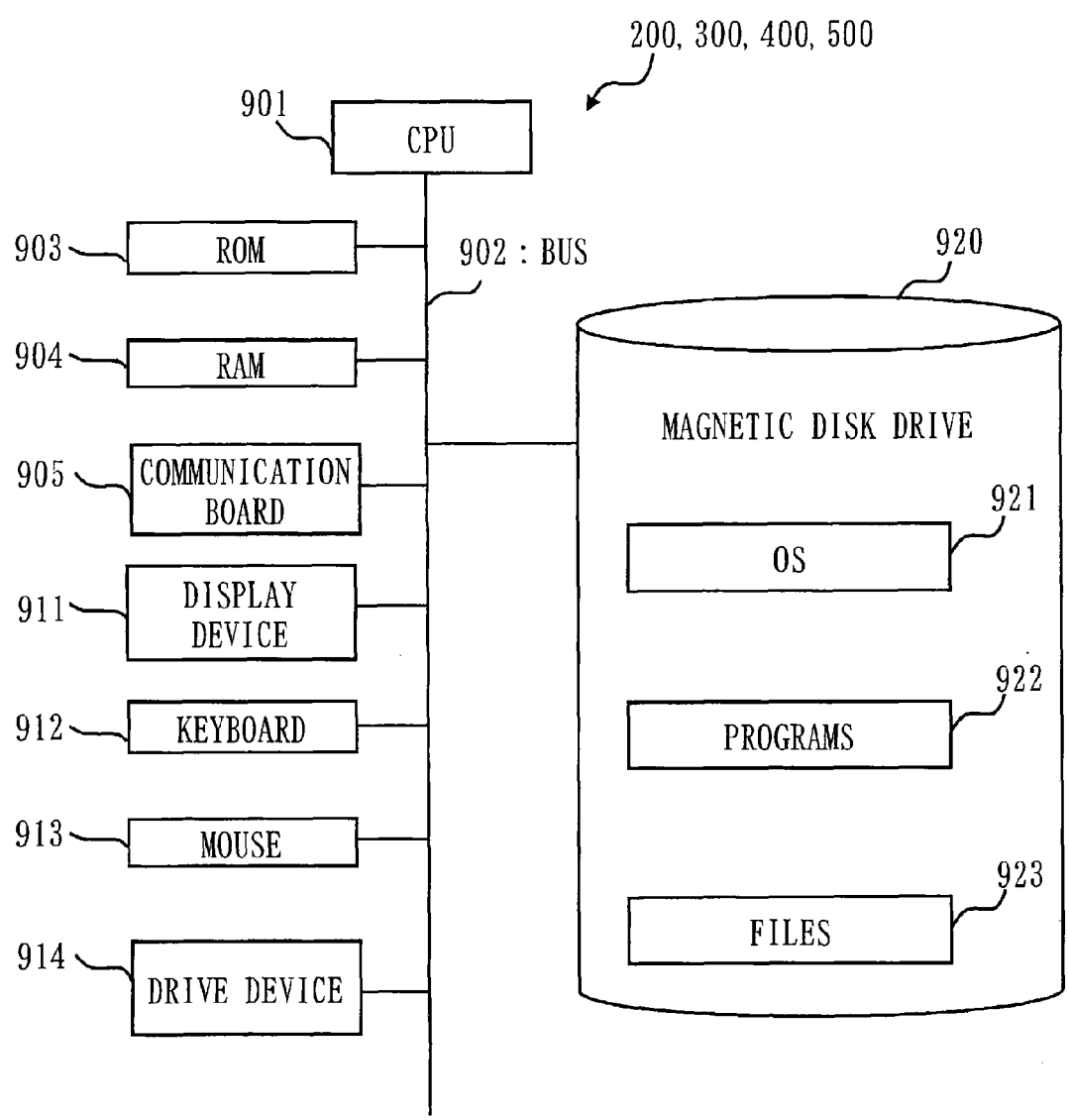
FIG. 16 is a diagram showing an example of hardware resource of the hierarchical identity-based encryption system 100 according to embodiments.

FIG. 16 is a diagram showing an example of hardware resource of the hierarchical identity-based encryption system 100 according to the embodiment.

In FIG. 16, the setup device 200, the decryption device 300, the encryption device 400, and a search device 500 (refer to Embodiment 3) include a CPU 901 (Central Processing Unit). The CPU 901 is connected to a ROM 903, a RAM 904, a communication board 905, a display device 911, a keyboard 912, a mouse 913, a drive device 914, and a magnetic disk drive 920 through a bus 902, thereby controlling these hardware devices. The drive device 914 is a device to read from and write on storage medium such as a FD (Flexible Disk Drive), a CD (Compact Disc), and a DVD (Digital Versatile Disc).

The communication board 905 is connected to a communication network such as LAN (Local Area Network), the Internet, and telephone lines through wire or wirelessly.

The magnetic disk drive 920 stores an OS 921 (Operating System), programs 922, and files 923.

The programs 922 include programs that execute the functions described as a "unit" in the embodiments. The programs are read and executed by the CPU 901. That is, the programs have the computer function as "unit", and have the computer execute a procedure or a method of "unit".

The files 923 include various data (input, output, discriminated result, calculated result, processed result, and the like) used by "unit" described in the embodiment.

In the embodiment, the arrows in the configurational diagram and the flowcharts mainly represent input/output of data and signals.

A "unit" in the explanation of the embodiment may be a "circuit", "device", "equipment"; or a "step", "procedure", or "process". That is, a "unit" may be implemented by firmware, software, hardware or a combination of these.

Embodiment 2

Another embodiment will be explained, where a direct product of a pairing group of which an order is a prime number p is used instead of using the pairing group of which the order is the composite number n (=pq).

Hereinafter, items being different from those of the first embodiment will be mainly explained. As for items whose explanation is omitted are similar to the first embodiment.

Hereinafter, the pairing group of which the order is the composite number is referred to as "pairing group of the composite number order", and the pairing group of which the order is the prime number as "pairing group of the prime number order".

The direct product group composed of the direct product of the pairing group of the prime number order p (the asymmetry pairing group) is defined by Expression (2-1).

[Formula 33]

$$G\hat{} = G\_1 \times G\_1, H\hat{} = G\_2 \times G\_2, G_T\hat{} = G\_t \qquad \text{Expression (2-1)}$$

Here, $G\_1$, $G\_2$, and $G\_t$ are asymmetric pairing group of prime number order p;

e: $G\_1 \times G\_2 \to G\_t$ is asymmetric pairing defined on $G\_1$, $G\_2$, and $G\_t$; and $G\hat{}$, $H\hat{}$, and $G_T\hat{}$ are direct product groups.

A subgroup forming a part of the direct product group is defined by Expression (2-2).

[Formula 34]

$$G_1\hat{} = \langle (g_1, g_1^x) \rangle, G_2\hat{} = \langle (g_2, g_2^y) \rangle,$$
$$H_1\hat{} = \langle (h_1^{-y}, h_1) \rangle, H_2\hat{} = \langle (h_2^{-x}, h_2) \rangle \qquad \text{Expression (2-2)}$$

Here, $G_1\hat{}$, $G_2\hat{}$, $H_1\hat{}$, $H_2\hat{}$: sub group;

$$g_1, g_2 \xleftarrow{U} G\_1, h_1, h_2 \xleftarrow{U} G\_2;$$
$$x, y \xleftarrow{U} Z_p;$$

$x-y \neq 0$; and $\langle g \rangle$: group generated by g.

The pairing e is defined by Expression (2-3).

[Formula 35]

$$e\hat{}((g,g'),(h,h')) = e(g,h)e(g',h') \qquad \text{Expression (2-3)}$$

Here, g and g' are arbitrary elements of the group $G\_1$, and h and h' are arbitrary elements of the group $G\_2$.

In the above definition, the property (2) is satisfied.

Property (2): $e\hat{}(x_1, y_2) = 1$ with respect to arbitrary $x_1 \in G_1\hat{}$, and $y_2 \in H_2\hat{}$; and $e\hat{}(x_2, y_1) = 1$ with respect to arbitrary $x_2 \in G_2\hat{}$, and $y_1 \in H_1\hat{}$. [Formula 36]

The property (2) can be verified in the following.

The following is true since $x_1 = (g_1^a, g_1^{ax})$, $y_2 = (h_2^{-xb}, h_2^b)$ when a and b are certain integers:

$$e\hat{}(x_1, y_2) = e\hat{}((g_1^a, g_1^{ax}), (h_2^{-xb}, h_2^b))$$
$$= e(g_1^a, h_2^{-xb})e(g_1^{ax}, h_2^b)$$
$$= 1$$

The property (2) is a property being similar to the property (1) that has been explained in the first embodiment.

Therefore, the hierarchical identity-based encryption system 100 can be configured by using the direct product of the pairing group of the prime number order p.

That is, each group explained in the first embodiment is replaced by each group of the above as will be discussed below, and thereby the hierarchical identity-based encryption system 100 can be configured.

Group $G \to$ Group $G\hat{}, H\hat{}$;

Group $G_p \to$ Group $G_1\hat{}, H_1\hat{}$;

Group $G_q \to$ Group $G_2\hat{}, H_2\hat{}$;

Group $G_T \to$ Group $G_T\hat{}$, pairing $e \to$ pairing $e\hat{}$ [Formula 38]

Here, an example of using the direct product of the pairing group of the prime number order is shown.

However, a conversion method to convert the pairing group of the composite number order into the pairing group of the prime number order can be used. The conversion method like the above is disclosed in, for instance, Non Patent Literature 6.

According to the present embodiment, the Wildcard-applicable anonymous hierarchical identity-based encryption system can be implemented using the pairing group of the prime number order instead of the pairing group of the composite number order.

Normally, the pairing group of the prime number order can realize the safety of the same level with a smaller bit size than the pairing group of the composite number order.

Therefore, the size of the ciphertext or the secret key can be reduced than the first embodiment.

Further, the smaller the bit size is, the shorter the time required by the group operation is. That is, the operation speed can be improved than the first embodiment.

Further, similarly to the first embodiment, it is possible to make the number of pairing operations carried out in the decrypting operation a fixed number of times instead of the number which is proportional to the number of hierarchies.

Embodiment 3

"Group-oriented public key secret search system" will be explained by applying "Wildcard-applicable anonymous hierarchical identity-based encryption system" that has been explained in the first and second embodiments.

Hereinafter, items being different from the first and second embodiments will be mainly explained. The items of which explanation is omitted are the same as those in the first and second embodiments.

Figure 17:
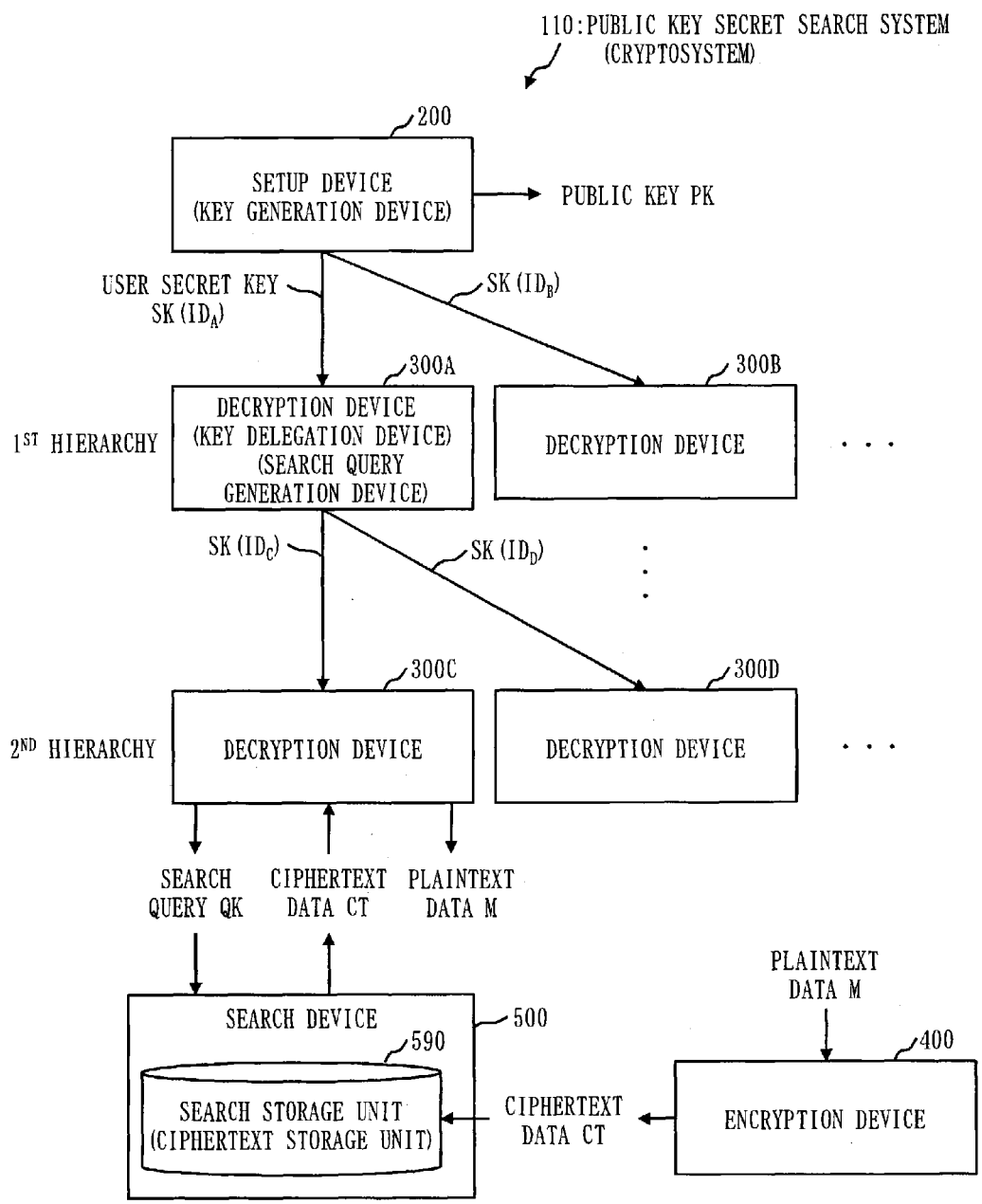
FIG. 17 is a configurational diagram of a public key secret search system 110 according to a third embodiment.

FIG. 17 is a configurational diagram of a public key secret search system 110 according to the third embodiment.

The configuration of the public key secret search system 110 according to the third embodiment will be explained based on FIG. 17.

The public key secret search system 110 includes, in addition to the configuration of the hierarchical identity-based encryption system 100 (refer to FIG. 1) explained in the first embodiment, a search device 500.

The search device 500 includes a search storage unit 590 (an example of a ciphertext storage unit) storing plural pieces of ciphertext data CT generated by the encryption device 400.

The search device 500 inputs a search query QK, searches the search storage unit 590 using the inputted search query QK, and outputs the ciphertext data CT corresponding to the search query QK.

The decryption device 300 decrypts the ciphertext data CT searched by the search device 500, and outputs the plaintext data M.

Figure 18:
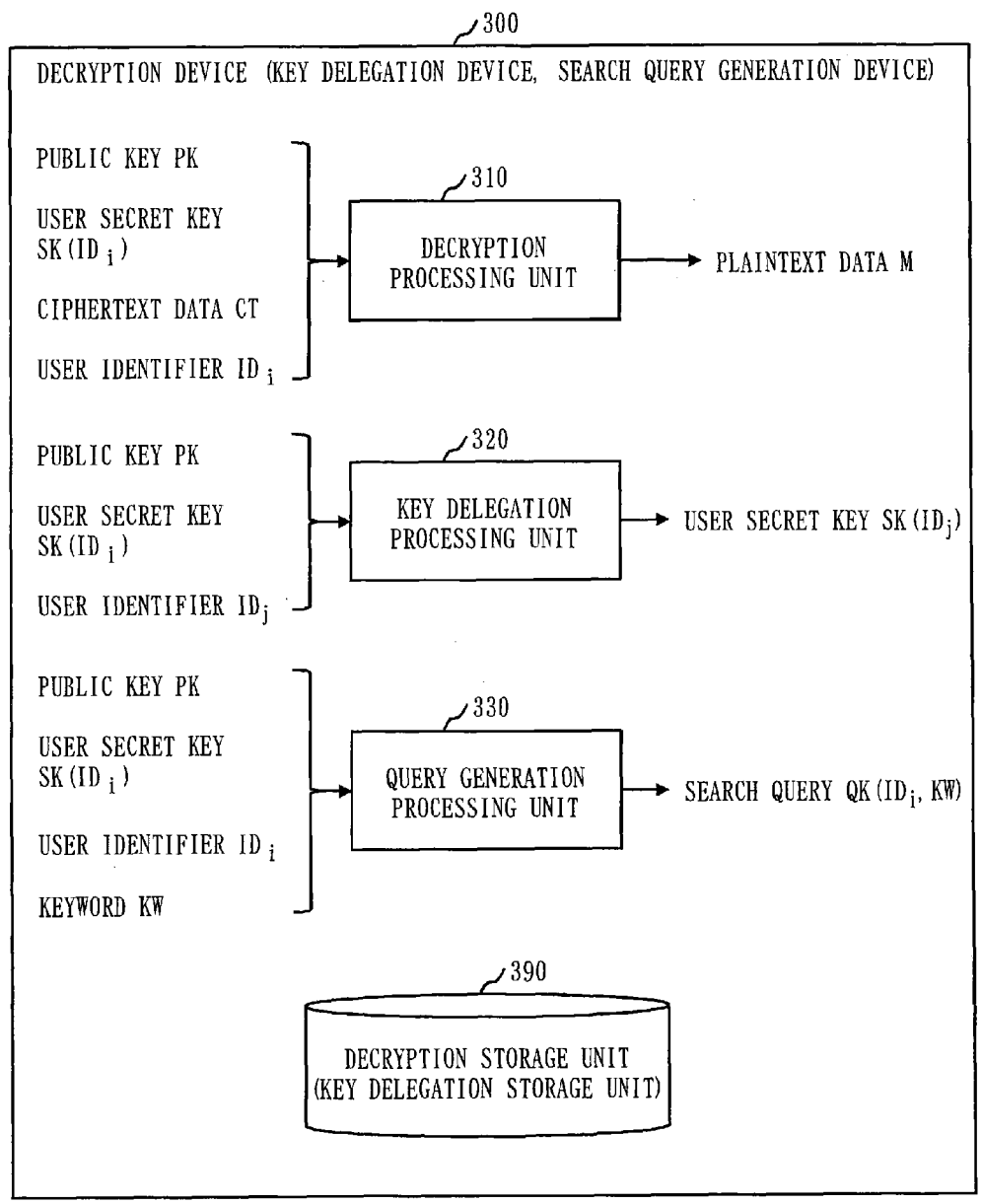
FIG. 18 is a schematic diagram of the decryption device 300 according to the third embodiment.

FIG. 18 is a schematic diagram of the decryption device 300 according to the third embodiment.

An outline of the decryption device 300 according to the third embodiment will be explained based on FIG. 18.

The decryption device 300 includes, in addition to the configuration explained in the first embodiment (refer to FIG. 7), a query generation processing unit 330.

The query generation processing unit 330 includes a query generation inputting unit, a query generation pre-processing unit, a query key value calculating unit, and a query generating unit (not shown).

The query generation processing unit 330 inputs the public key PK, the user secret key $SK(ID_i)$ of the user i, the user identifier $ID_i$ of the user i, and the keyword KW, and outputs a search query $QK(ID_i, KW)$.

Figure 19:
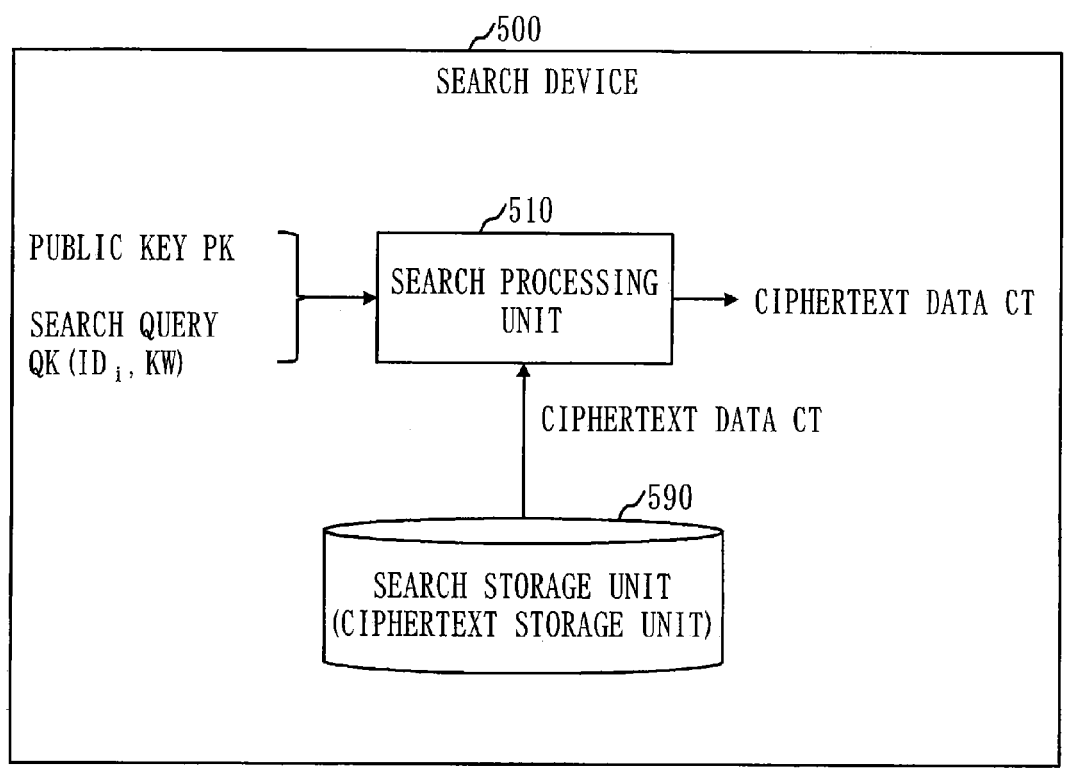
FIG. 19 is a schematic diagram of a search device 500 according to the third embodiment.

FIG. 19 is a schematic diagram of a search device 500 according to the third embodiment.

An outline of the search device 500 according to the third embodiment will be explained based on FIG. 19.

The search device 500 includes a search processing unit 510 and a search storage unit 590.

The search processing unit 510 inputs the public key PK and the search query $QK(ID_i, KW)$, searches for the ciphertext data CT stored in the search storage unit 590, and outputs the ciphertext data CT corresponding to the search query $QK(ID_i, KW)$.

The search storage unit 590 is a storage unit storing data used by the search device 500.

The public key PK, the search query $QK(ID_i, KW)$, and the ciphertext data CT are examples of data stored in the search storage unit 590.

Figure 20:
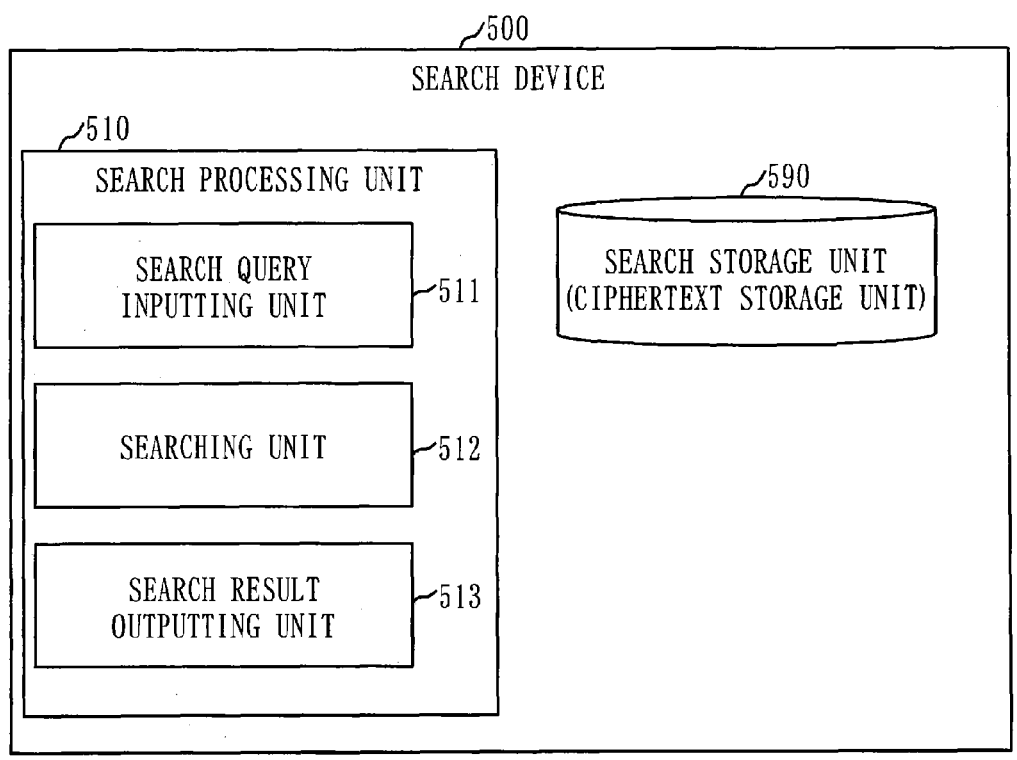
FIG. 20 is a functional configurational diagram of the search device 500 according to the third embodiment.

FIG. 20 is a functional configurational diagram of the search device 500 according to the third embodiment.

The functional configuration of the search device 500 according to the third embodiment will be explained based on FIG. 20.

The search device 500 includes, as discussed above, the search processing unit 510 and the search storage unit 590.

The search storage unit 590 stores previously plural pieces of ciphertext data CT and plural pieces of ciphertext data CTW.

The ciphertext data CTW is generated by the encryption device 400 (refer to FIG. 10) like the following.

The cipher value calculating unit 413 encrypts specific plaintext data MW to calculate a plaintext cipher value $CW_0$.

The encryption inputting unit 411 inputs a keyword KW used for searching the ciphertext data CT.

The cipher value calculating unit 413 calculates a wildcard cipher value $CW_1$ and an identifying cipher value $CW_3$ using the pattern PW which includes the pattern P and as well the keyword KW as the hierarchy identifier to identify the (K+1) hierarchy.

The ciphertext generating unit 414 generates the ciphertext data CTW including the plaintext cipher value $CW_0$, the wildcard cipher value $CW_1$, and the identifying cipher value $CW_3$ which have been calculated and outputs the generated ciphertext data CTW with making related to the ciphertext data CT.

Returning to FIG. 20, the explanation of the search device 500 will be continued.

The search processing unit 510 includes a search query inputting unit 511, a searching unit 512, and a search result outputting unit 513.

The search query inputting unit 511 carries out a search query inputting process.

For instance, the search query inputting unit 511 inputs the search query QK and the wildcard hierarchical value W.

The search query QK is generated by the decryption device 300 (refer to FIG. 18) like the following.

The query generation inputting unit (not shown) of the query generation processing unit 330 inputs the user identifier ID and the keyword KW (query generation inputting process).

The query key value calculating unit (not shown) of the query generation processing unit 330 calculates a key value $aW_0$ used for decrypting the plaintext cipher value $CW_0$ using the user identifier ID and the keyword KW which have been inputted (query key value calculating process).

The query generating unit (not shown) of the query generation processing unit 330 generates a search query QK including the calculated key value $aW_0$ and the user identifier ID, and outputs the generated search query QK (search query generating process).

Returning to FIG. 20, the explanation of the search device 500 will be continued.

The searching unit 512 selects the ciphertext data CTW from the search storage unit 590.

The searching unit 512 extracts a hierarchy identifier of the wildcard hierarchy as a wildcard identifier from the user identifier ID included in the search query QK inputted based on the inputted wildcard hierarchical value W.

The searching unit 512 decrypts the plaintext cipher value $CW_0$ included in the selected ciphertext data CTW using the extracted wildcard identifier, the wildcard cipher value $CW_1$ and the identifying cipher value $CW_3$ included in the selected ciphertext data CTW, and the key value $aW_0$ included in the inputted search query QK.

The searching unit 512 discriminates whether or not the decrypted data obtained by decrypting the plaintext cipher value $CW_0$ matches the plaintext data MW.

When the decrypted data matches the plaintext data MW, the searching unit 512 obtains the ciphertext data CT corresponding to the selected ciphertext data CTW from the search storage unit 590.

The search result outputting unit 513 outputs the obtained ciphertext data CT as the search result in response to the inputted search query QK.

Figure 21:
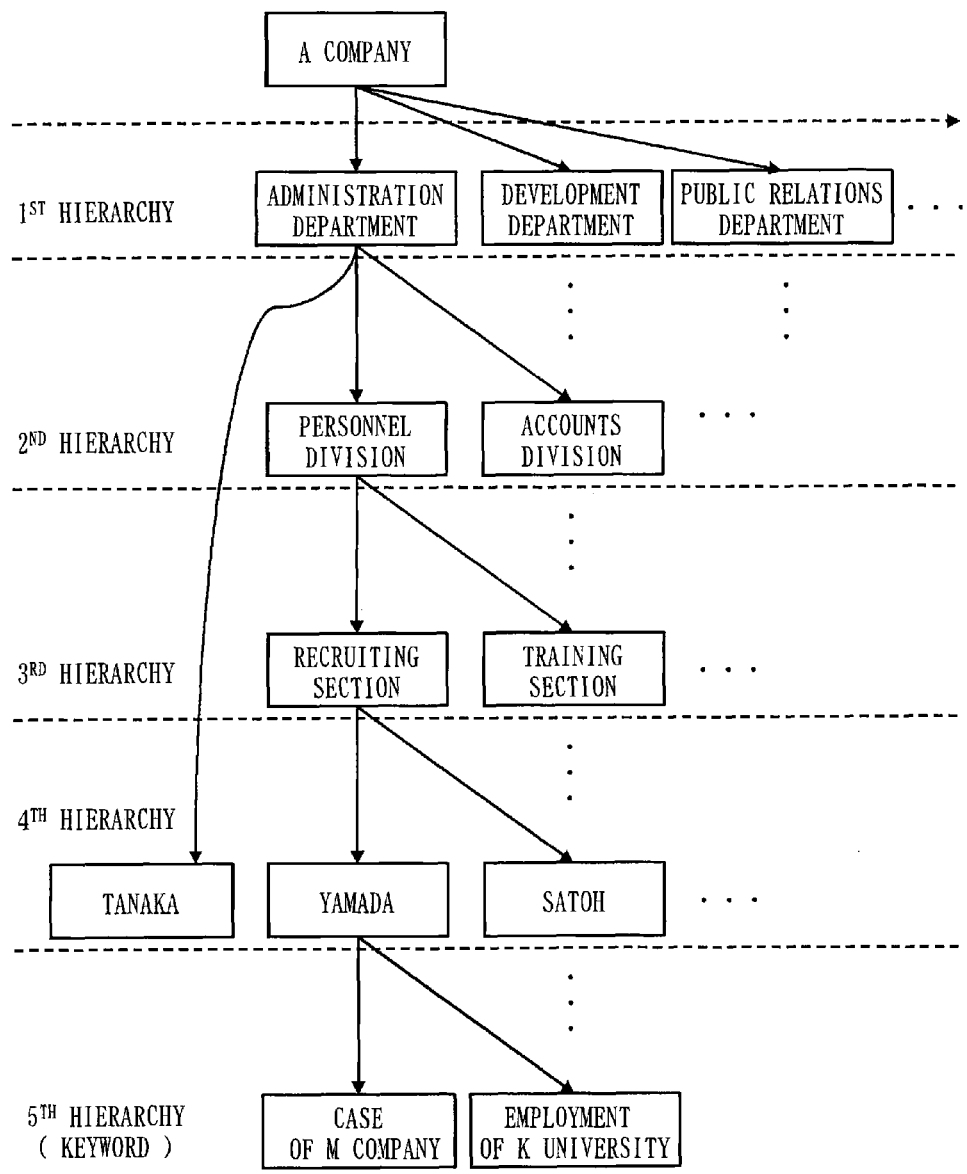
FIG. 21 is a diagram showing an example of a hierarchical structure of the hierarchical identity-based encryption system 100 according to the third embodiment.

FIG. 21 is a diagram showing an example of a hierarchical structure of the hierarchical identity-based encryption system 100 according to the third embodiment.

FIG. 22 is a diagram showing an example of a pattern PW of the hierarchical identity-based encryption system 100 according to the third embodiment.

The hierarchical structure includes a hierarchy for a keyword (a fifth hierarchy) as shown in FIG. 21, and the pattern PW includes the pattern P and the keyword KW for searching for the ciphertext data CT as shown in FIG. 22.

Figure 23:
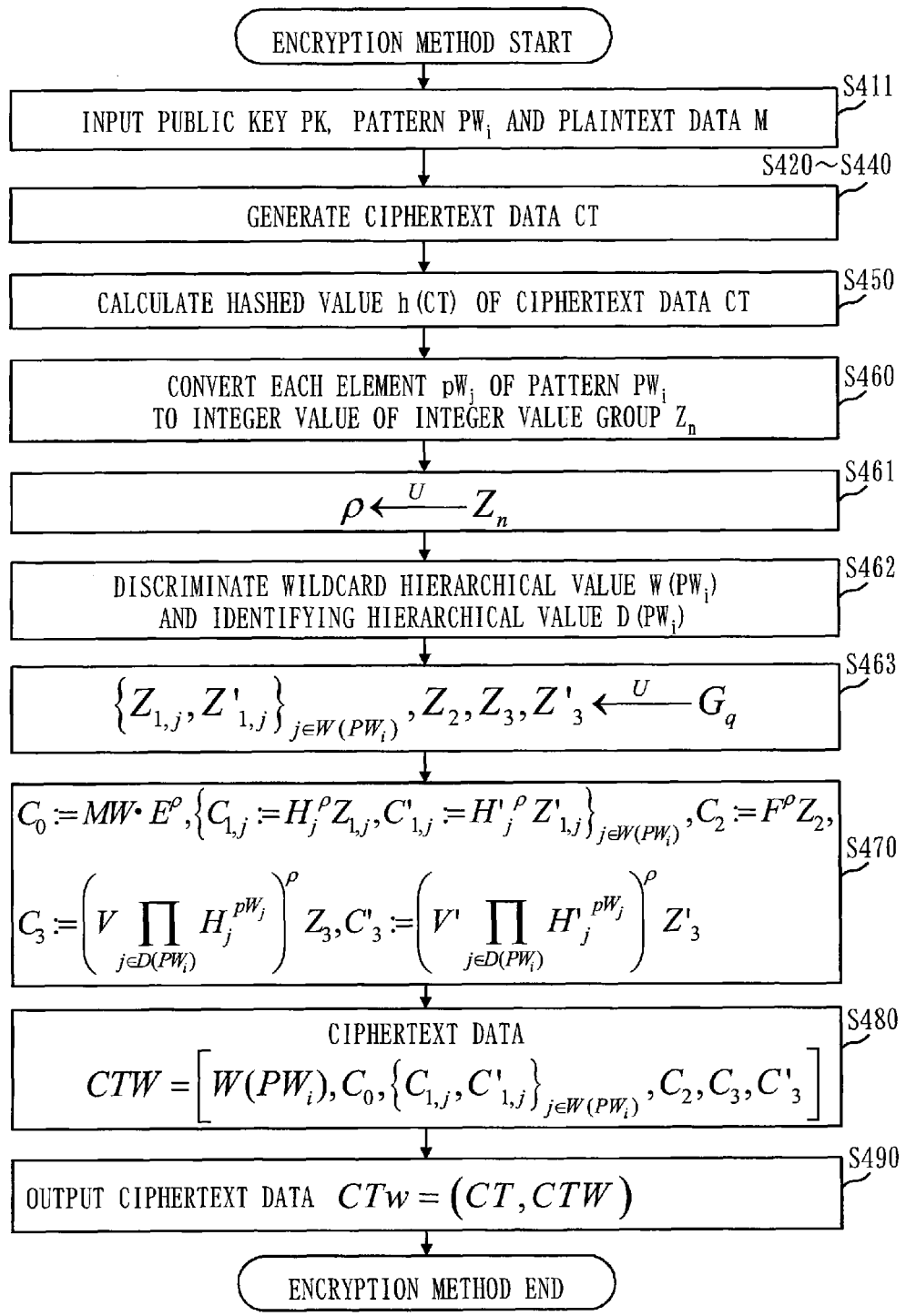
FIG. 23 is a flowchart showing an encryption method by the encryption device 400 according to the third embodiment.

FIG. 23 is a flowchart showing the encryption method by the encryption device 400 according to the third embodiment.

A processing flow of the encryption method according to the third embodiment will be explained based on FIG. 23.

At S411, the encryption inputting unit 411 inputs, similarly to S410 (refer to FIG. 14), the public key PK, the pattern $PW_i$ for the user i, and the plaintext data M.

After S411, the process proceeds to S420.

At steps S420 to S440, the encryption processing unit 410 generates the ciphertext data CT for the user i using the pattern $P_i$ included in the pattern $PW_i$ (refer to FIG. 14).

After S440, the process proceeds to S450.

At S450, the encryption pre-processing unit 412 inputs the ciphertext data CT to compute a predetermined hash function h, and calculates a hashed value h(CT) of the ciphertext data CT.

The hashed value h(CT) is a value obtained by transcribing the ciphertext data CT to the element of the group $G_T$. For instance, the hashed value h(CT) is an output value of a hash function SHA-1 when the ciphertext data CT is inputted as a bit string.

After S450, the process proceeds to S460.

At steps S460 to S480, the encryption processing unit 410 treats the hashed value h(CT) calculated at S450 as the plaintext data MW, and generates the ciphertext data CTW for the user i using the pattern $PW_i$ similarly to steps S420 to S440. At this time, a hierarchy corresponding to the keyword KW is treated as "identifying hierarchy".

After S480, the process proceeds to S490.

At S490, the ciphertext generating unit 414 generates ciphertext data $CT_W$ including the ciphertext data CT generated at S440 and the ciphertext data CTW generated at S480, and outputs the generated ciphertext data $CT_W$.

By S490, the process of the encryption method terminates.

Figure 24:
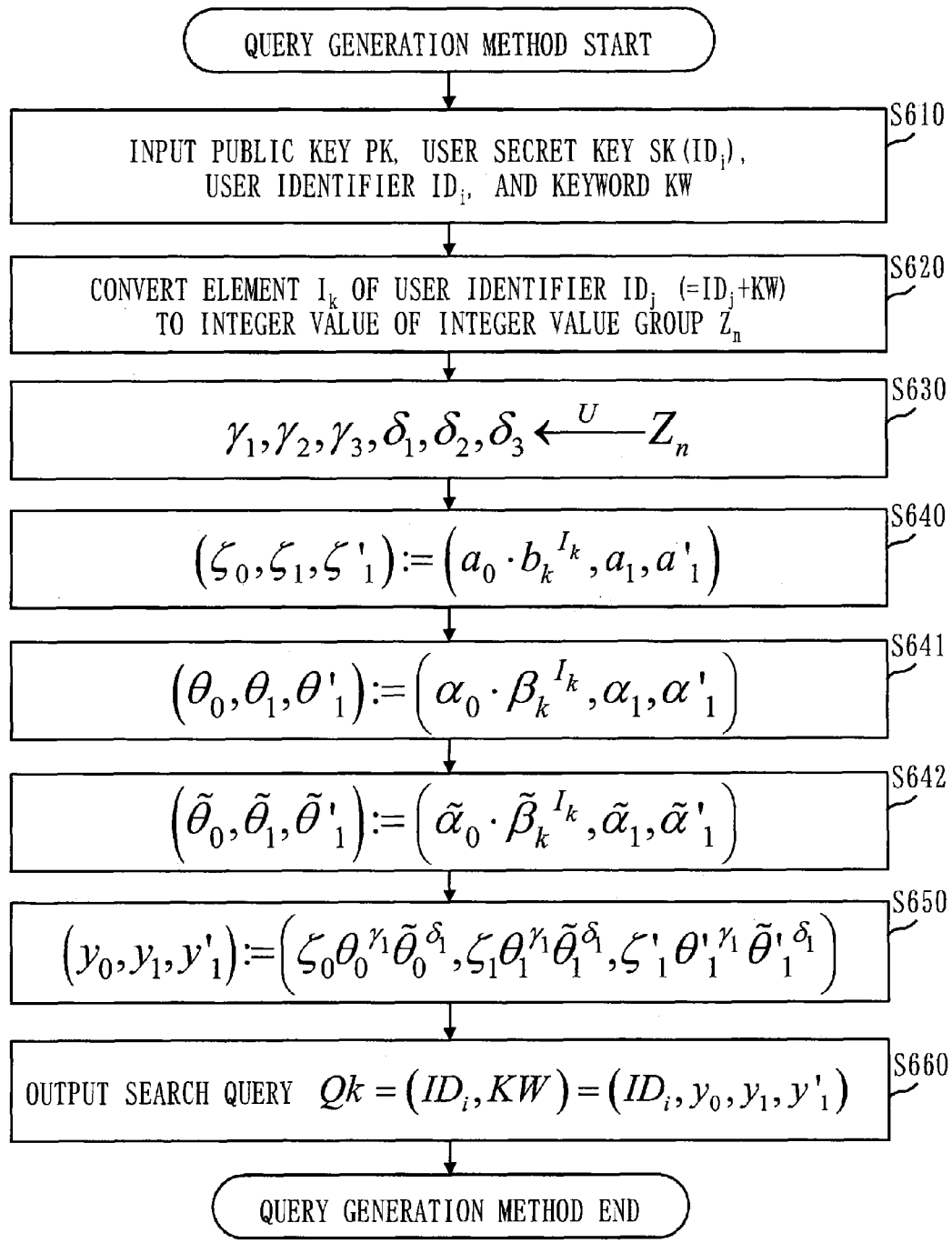
FIG. 24 is a flowchart showing a query generation method by the decryption device 300 according to the third embodiment.

FIG. 24 is a flowchart showing a query generation method by the decryption device 300 according to the third embodiment.

A processing flow of a query generation method carried out by the query generation processing unit 330 of the decryption device 300 will be explained based on FIG. 24.

At S610, the query generation processing unit 330 inputs the public key PK, the user secret key $SK(ID_i)$ of the user i, the user identifier $ID_i$ of the user i, and the keyword KW.

After S610, the process proceeds to S620.

At steps S620 to S650, the query generation processing unit 330 treats data obtained by adding the keyword KW to the user identifier $ID_i$ as the user identifier $ID_j$ of the user j, and calculates plural decrypting key values similarly to the key delegation processing unit 320 (refer to S320 to S350 of FIG. 13).

After S650, the process proceeds to S660.

At S660, the query generation processing unit 330 generates a search query QK including the user identifier $ID_i$ of the user i and plural decrypting key values calculated at S650 and outputs the generated search query QK.

By S660, the process of the query generation method terminates.

Figure 25:
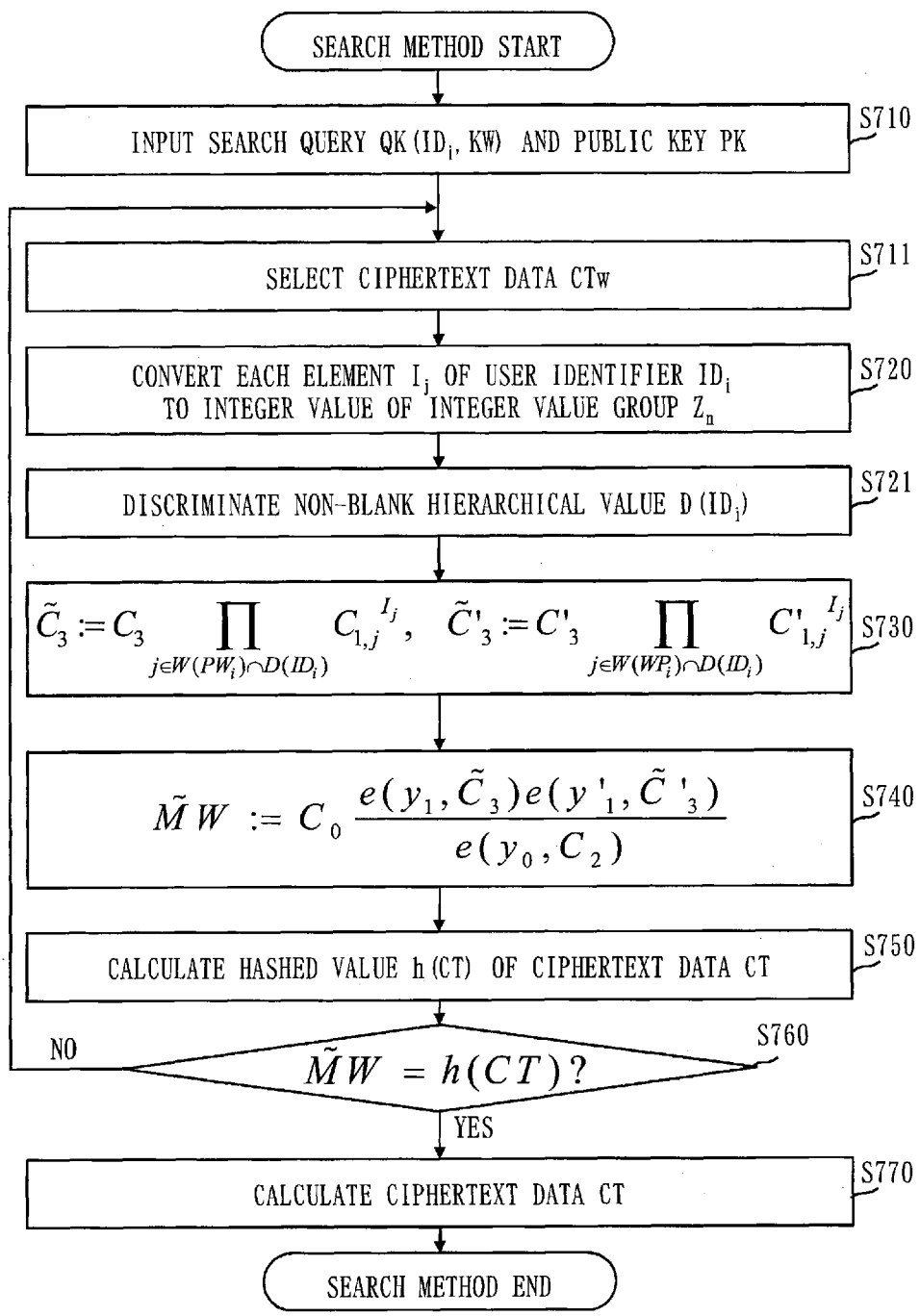
FIG. 25 is a flowchart showing a search method by a search device 500 according to the third embodiment.

FIG. 25 is a flowchart showing a search method by a search device 500 according to the third embodiment.

A processing flow of the search method carried out by the search processing unit 510 of the search device 500 will be explained based on FIG. 25.

At S710, the search query inputting unit 511 inputs the search query QK and the public key PK.

After S710, the process proceeds to S711.

At S711, the search query inputting unit 511 selects one piece of unprocessed ciphertext data $CT_W$ sequentially or at random from the search storage unit 590.

After S712, the process proceeds to S720.

At S720 to S740, the searching unit 512 calculates plaintext data MW using the public key PK, the decrypting key value included in the search query QK, the user identifier $ID_i$ included in the search query QK, and the ciphertext data CTW included in the ciphertext data $CT_W$.

A method for calculating the plaintext data MW is the same as the decryption method (refer to S520 to S540 of FIG. 15).

After S740, the process proceeds to S750.

At S750, the searching unit 512 calculates a hashed value h(CT) of the ciphertext data CT included in the ciphertext data CTW.

The method for calculating the hashed value h(CT) is the same as S450 (refer to FIG. 23).

After S750, the process proceeds to S760.

At S760, the searching unit 512 compares the plaintext data MW calculated at S740 with the hashed value h(CT) calculated at S750.

If the plaintext data MW matches the hashed value h(CT) (YES), the process proceeds to S770.

If the plaintext data MW does not match the hashed value h(CT) (NO), the process returns to S711.

At S770, the searching unit 512 outputs the ciphertext data CT included in the ciphertext data CTW.

By S770, the process of the search method terminates.

The ciphertext data CT outputted at S770 is decrypted by the decryption method (refer to FIG. 15) that has been explained in the first embodiment.

The public key secret search system 110 can carry out the keyword search, while keeping the keyword secret. This is because, since the ciphertext to be searched possesses, in addition to the confidentiality, the anonymity, no information related to the keyword can be obtained by looking at the ciphertext.

Further, since the embodiment can be applied to the case using the wildcard, the ciphertext can be shared within a group, similarly to the first embodiment.

It is possible to set plural search keywords. That is, it is possible to set plural hierarchies corresponding to the keyword.

In this case, the ciphertext data $CT_W$ includes the same number of pieces of the ciphertext data CTW with the number of search keywords, discriminates as a hit when at least one hashed value h(CT) of the ciphertext data CTW matches, and outputs the ciphertext data CT. However, it can be also discriminated as a hit when the hashed value h(CT) of all the ciphertext data CTW matches. Furthermore, it can be also discriminated as a hit when a sequence of the ciphertext data CTW, that is, a sequence of hierarchies of the search keywords matches.

In the encryption process (refer to FIG. 23) and the search method (refer to FIG. 25), instead of the hashed value h(CT), a search constant (for instance, a constant 0) can be treated as the plaintext data MW. That is, it is discriminated as a hit when the value decrypted at the time of search matches the search constant.

Because of this, there is no need to hold the ciphertext data CT and the ciphertext data CTW (encryption keyword)

together, but they can be separately managed. Therefore, the flexibility of data management can be improved.

The present embodiment is configured to include a user identifier of a search user in the search query. This is because, at the time of search, the element corresponding to the wildcard in the ciphertext is "rehashed" by the user identifier of the search user.

However, when "rehash" is not required (namely, when only the ciphertext destined to the user himself is searched), the configuration does not need to include the user identifier in the search query.

Such a configuration enables the search user to ask the search device to search, while hiding the user identifier of the user himself.

In the present embodiment, the pairing group of the composite number order can be used as well as the first embodiment, and the direct product of the pairing group of the prime number order can be also used as well as the second embodiment.

Further, more in general, "Group-oriented public key secret search system" can be implemented using "Delegatable hidden vector encryption".

"Delegatable hidden vector encryption" discussed here means so-called "Predicate encryption" or "Functional encryption" such as Identity-based encryption or Attribute-based encryption.

However, it is assumed that "Delegatable hidden vector encryption" includes the function of the key delegation, and further includes the function corresponding to the wildcard as an ID or attribute for encryption. Furthermore, it is also assumed that "Delegatable hidden vector encryption" includes the anonymity, by which the information of the ID or attribute does not leak from the ciphertext.

As a specific implementing system, for instance, there are "Delegatable HVE" described in Non Patent Literature 7, and "Hierarchical predicate encryption" described in Non Patent Literature 8.

Specific algorithm, parameter, or number-theoretic hypothesis used as a basis varies for each encryption system. However, in either encryption system, the configuration basically includes setup means, key generation means, key delegation means, encryption means, and decryption means, or the like similarly to the first embodiment. Because of this, "Group-oriented public key secret search" can be implemented similarly to the present embodiment by employing the configuration equivalent to the configuration disclosed in the present embodiment. This can be easily understood by those skilled in the art.

According to the present embodiment, it is possible to implement the Group-oriented public key secret search.

Furthermore, the number of pairing operations in the search operation and the decrypting operation (the operation for decrypting the ciphertext that is hit by the search) can be made a fixed number of times (three times, specifically) instead of the number being proportional to the number of hierarchies.

Because of this, it is possible to implement a high-speed search and decryption even in an organization having a large hierarchal structure such as large corporations or public agencies.

Furthermore, similarly to the first embodiment, it is possible to set a blank column in the intermediate hierarchy when specifying the user identifier in the process of generation or delegation of the user secret key or in the process of encryption.

By this feature, the embodiment can be flexibly applied to the user whose position is outside of the usual hierarchical structure such as Mr. TANAKA shown in FIG. 21. That is, the embodiment can be flexibly applied to a unique hierarchical structure.

Furthermore, more generally, "Group-oriented public key secret search" can be implemented by using "Delegatable hidden vector encryption". This enables to provide a more general method to implement the Group-oriented public key secret search system.

Embodiment 4

Another embodiment which adds or deletes authorized users will be explained.

Hereinafter, items being different from the third embodiment will be mainly explained. The items of which explanation is omitted are the same as those in the third embodiment.

First, an embodiment which adds authorized users will be explained.

In order to add the authorized users, user identifier IDs should be assigned to the users to be added.

FIG. 26 is a diagram showing examples of the user identifier IDs according to a fourth embodiment.

For instance, when Mr. TAKAHASHI is newly assigned to Recruiting Section, a user identifier $ID_9$ is generated for Mr. TAKAHASHI as shown in FIG. 26.

Recruiting Section Chief delegates a user secret key SK to Mr. TAKAHASHI by the key delegation method explained in the first embodiment, and Mr. TAKAHASHI generates a search query QK using the delegated user secret key SK by the query generation method explained in the third embodiment.

Further, when Assessing Section is newly provided in Personnel Division, a user identifier $ID_{10}$ of Assessing Section (Assessing Section Chief) is generated as shown in FIG. 26.

Personnel Division Manager delegates the user secret key SK to Assessing Section Chief, and Assessing Section Chief generates the search query using the delegated user secret key SK. Further, Assessing Section Chief delegates the user secret key SK to each employee of Assessing Section using the delegated user secret key SK.

Next, an embodiment to delete an authorized user will be explained.

In order to delete the authorized user, a list of unauthorized users (a deleted user list) should be generated.

Figure 27:
FIG. 27 is a diagram showing an example of a deleted user list according to the fourth embodiment.

FIG. 27 is a diagram showing an example of a deleted user list according to the fourth embodiment.

For instance, the deleted user list as shown in FIG. 27 is stored in the search storage unit 590 (an example of a search identifier storage unit) of the search device 500.

The deleted user list shows an enumeration of user identifier IDs (unauthorized identifiers) of unauthorized users (users who is not authorized to search).

For instance, when Mr. YAMADA of Recruiting Section is moved to another post, Recruiting Section Chief inputs a user identifier $ID_{13}$ of Mr. YAMADA to the search device 500 to ask for the registration of Mr. YAMADA in the deleted user list. A user managing unit (not shown) of the search device 500 adds the inputted user identifier $ID_{13}$ to the deleted user list as shown in FIG. 27, thereby registering Mr. YAMADA in the deleted user list.

When Training Section of Personnel Division is abolished, similarly, Personnel Division Manager asks for the registration of Training Section in the deleted user list, and the user managing unit of the search device 500 adds the user identifier $ID_{37}$ of Training Section to the deleted user list as shown in FIG. 27.

Further, when Mr. YAMADA is assigned to Recruiting Section again, Recruiting Section Chief inputs the user identifier $ID_{13}$ of Mr. YAMADA to the search device 500 to ask for the erasure from the deleted user list. The user managing unit of the search device 500 erases the inputted user identifier $ID_{13}$ from the deleted user list.

When Training Section of Personnel Division is revived, similarly, Personnel Division Chief asks for the erasure from the deleted user list, and the user managing unit of the search device 500 erases the user identifier $ID_{37}$ of Training Section from the deleted user list.

At this time, in order to avoid a false request from a stranger, an input of a digital signature of a requester can be required. The user managing unit of the search device 500 verifies the inputted digital signature by a conventional signature verification method, and only if the digital signature is verified to be proper, the request is accepted.

FIG. 28 is a flowchart showing a search method of the search device 500 according to the fourth embodiment.

The search method by the search device 500 according to the fourth embodiment will be explained based on FIG. 28.

The fourth embodiment carries out, in addition to the process explained in the third embodiment (refer to FIG. 25), steps S712 and S713.

At S712, the search query inputting unit 511 discriminates whether or not the user identifier ID included in the search query QK is included in the deleted user list. That is, it is discriminated whether or not the user identifier ID included in the search query QK matches the user identifier ID included in the deleted user list.

When the user identifier ID is included in the deleted user list (YES), the process of the search method terminates.

When the user identifier ID is not included in the deleted user list (NO), the process proceeds to S713.

For instance, when the user identifier $ID_{13}$ of Mr. YAMADA is included in the search query QK, the deleted user list of FIG. 27 includes the user identifier $ID_{13}$ of Mr. YAMADA, and thus the process of the search method terminates.

In this case, Mr. YAMADA is unable to search using the search device 500.

At S713, the search query inputting unit 511 discriminates whether or not the user identifier ID belonging to the upper hierarchy than the user identifier ID included in the search query QK is included in the deleted user list. That is, it is discriminated whether or not the user identifier ID included in the search query QK includes the user identifier ID of the deleted user list.

If the user identifier belonging to the upper hierarchy than the user identifier ID is included in the deleted user list (YES), the process of the search method terminates.

If the user identifier belonging to the upper hierarchy than the user identifier ID is not included in the deleted user list (NO), the process proceeds to S711.

For instance, when a user identifier ID of an employee of Training Section is included in a search query QK, since the deleted user list of FIG. 27 includes the user identifier $ID_{37}$ of Training Section, the process of the search method terminates.

In this case, the employee of Training Section is unable to carry out search using the search device 500.

Now, when Mr. YAMADA included in the deleted user list sends a search query to the search device 500, there is possibility that Mr. YAMADA requests for search using a false name of an undeleted user.

However, even in such a case, Mr. YAMADA is unable to search the ciphertext addressed to Recruiting Section (or addressed to a broader range such as Personnel Division, Administration Department, or all the employees, inclusive).

For instance, when Mr. YAMADA requests for search using the name of Mr. SATOH (the user identifier), the column of the employee name (the fourth hierarchy) of the pattern $PW_2$ of Recruiting Section to which Mr. YAMADA belongs has to be a wildcard as shown in FIG. 22.

Therefore, in the search procedure, "rehash" of the element corresponding to the wildcard is carried out among elements of the ciphertext. Since Mr. YAMADA uses the name of Mr. SATOH, the wildcard of the ciphertext is rehashed by the name of Mr. SATOH.

On the other hand, since a decrypting key dk included in the search query sent by Mr. YAMADA is a key delegated using the name of Mr. YAMADA, a part corresponding to the name includes the name of Mr. YAMADA.

In this manner, the name (SATOH) used for the rehash is different from the name (YAMADA) included in the decrypting key, and thus even if the keyword matches, a hit would not occur in the search.

Here, the case where the column of the employee name is set to a wildcard has been explained; the same can be said if other column is set to a wildcard.

Therefore, even if the search is requested using the name of another user who is not deleted, the ciphertext cannot be searched.

Here, if this function is used inversely, it is possible to search for the ciphertext addressed to Mr. YAMADA even when the deleted user list includes Mr. YAMADA.

This is because the pattern (the pattern $PW_1$ of FIG. 22) for Mr. YAMADA does not include the wildcard. Therefore, "rehash" of the ciphertext would not occur, and the decrypting key dk of Mr. YAMADA functions validly.

In order to do this, the search query of Mr. YAMADA should be configured not to include the user identifier ID as described in the third embodiment.

The present embodiment can be implemented in any system if the system is "Delegatable hidden vector encryption" similarly to the third embodiment.

According to the present embodiment, it is possible to newly add a user or a lower group to a group (hierarchy) and make the user or the lower group which is newly added carry out the keyword search.

Further, the user or the lower group is deleted from the group and the keyword search related to the group is made impossible.

Therefore, the embodiment can be flexibly adapted to accession or secession of the user or the group.

Embodiment 5

Another embodiment will be explained, in which a user included in the deleted user list cannot search for the ciphertext addressed to the individual. Hereinafter, items being different from the fourth embodiment will be mainly explained. The items of which the explanation is omitted are the same as those of the fourth embodiment.

FIG. 29 is a diagram showing an example of user identifier IDs according to a fifth embodiment.

As shown in FIG. 29, the fifth embodiment is provided with plural hierarchies to which an employee (an example of a user) is made related.

For instance, a user identifier $ID_6$ of Mr. YAMADA includes "YAMADA" in two hierarchies of the fourth hierarchy and the fifth hierarchy. That is, the employee hierarchy is duplicated.

FIG. 30 is a diagram showing an example of a pattern P according to the fifth embodiment.

As shown in FIG. 30, a wildcard value "*" is set to at least one hierarchy among the plural hierarchies to which the employees are made related in the fifth embodiment.

For instance, a pattern $P_1$ for Mr. YAMADA includes the wildcard value "*" as an element of the fourth hierarchy.

By this feature, a user can be invalidated. This is because the ciphertext which can be searched by the user always includes the wildcard, and the user identifier is always included in the search query. Further, as described in the fourth embodiment, this is also because the search query cannot be issued using a name of another user.

Therefore, once a name is listed in the deleted user list, the user is made unable to carry out search. That is, authority to search of the user is invalidated.

In the present embodiment, in order to invalidate the hierarchy being upper than the employee hierarchy, the hierarchy should be multiplexed. Further, all the hierarchies can be previously multiplexed.

According to the present embodiment, a user or a group can be invalidated, and thus a keyword search can be prohibited.

Therefore, the present embodiment can be flexibly adapted to invalidation of a user or a group.

REFERENCE SIGNS LIST

100: hierarchical identity-based encryption system; 110: public key secret search system; 200: setup device; 210: setup processing unit; 211: setup inputting unit; 212: setup pre-processing unit; 213: public key value calculating unit; 214: public key generating unit; 215: master secret key generating unit; 216: setup outputting unit; 220: key generation processing unit; 221: key generation inputting unit; 222: key generation pre-processing unit; 223: user secret key value calculating unit; 224: user secret key generating unit; 290: setup storage unit; 300: decryption device; 310: decryption processing unit; 311: decryption inputting unit; 312: decryption pre-processing unit; 313: decrypting unit; 320: key delegation processing unit; 321: key delegation inputting unit; 322: key delegation pre-processing unit; 323: delegation key value calculating unit; 324: delegation key generating unit; 330: query generation processing unit; 390: decryption storage unit; 400: encryption device; 410: encryption processing unit; 411: encryption inputting unit; 412: encryption pre-processing unit; 413: cipher value calculating unit; 414: ciphertext generating unit; 490: encryption storage unit; 500: search device; 510: search processing unit; 511: search query inputting unit; 512: searching unit; 513: search result outputting unit; 590: search storage unit; 901: CPU; 902: bus; 903: ROM; 904: RAM; 905: communication board; 911: display device; 912: keyboard; 913: mouse; 914: drive device; 920: magnetic disk drive; 921: OS; 922: programs; and 923: files.

The invention claimed is:

1. An encryption system using a user identifier ID including a hierarchy identifier of a user who belongs to a k-th hierarchy in an organization having a hierarchical structure with k hierarchies, the user identifier ID including (k−1) number of hierarchy identifiers identifying the user's membership in hierarchies from a first hierarchy to a (k−1)-th hierarchy, where k is a specific integer equal to or greater than 2, the encryption system comprising:

an encryption device
 inputting plaintext data M to be encrypted,
 encrypting the inputted plaintext data M to calculate a plaintext cipher value $C_0$,
 inputting a pattern P including a value for each of the k hierarchies, the value for each of the k hierarchies indicating one of
  the hierarchy identifier identifying the user's membership in the respective hierarchy,
  a wildcard value which indicates the user is an arbitrary user, and
  a blank value which indicates the respective hierarchy is an unnecessary hierarchy for the user,
 discriminating a hierarchy as a wildcard hierarchy in a case where the inputted value is the wildcard value,
 inputting a public key PK including a first key value group including k number of key values which relates to k number of hierarchies,
 extracting a first key value which relates to the wildcard hierarchy from the first key value group included in the inputted public key PK as a wildcard key value,
 calculating a wildcard cipher value $C_1$ used for decrypting the plaintext cipher value $C_0$ using the extracted wildcard key value,
 discriminating a hierarchy as an identifying hierarchy in a case where the inputted value is the hierarchy identifier,
 extracting a second key value which relates to the identifying hierarchy from the first key value group included in the inputted public key PK as an identifying key value,
 calculating an identifying cipher value $C_3$ used for decrypting the plaintext cipher value $C_0$ using the extracted identifying key value,
 generating ciphertext data CT including the plaintext cipher value $C_0$, the wildcard cipher value $C_1$, and the identifying cipher value $C_3$ and including a wildcard hierarchical value W which indicates the wildcard hierarchy, and
 outputting the generated ciphertext data CT; and
a decryption device
 inputting the ciphertext data CT and the user identifier ID,
 extracting the hierarchy identifier of the wildcard hierarchy from the inputted user identifier ID as a wildcard identifier based on the wildcard hierarchical value W included in the inputted ciphertext data CT,
 decrypting the plaintext cipher value $C_0$ included in the inputted ciphertext data CT using the extracted wildcard identifier, the wildcard cipher value $C_1$ and the identifying cipher value $C_3$ which are included in the inputted ciphertext data CT, and
 outputting the plaintext data M obtained by decrypting the plaintext cipher value $C_0$.

2. The encryption system according to claim 1, wherein
the public key PK includes a second key value group including k number of key values which relates to k number of hierarchies,
the encryption device extracts a third key value which relates to the wildcard hierarchy from the second key value group included in the inputted public key PK as a second wildcard key value, calculates a wildcard cipher value $C_1'$ used for decrypting the plaintext cipher value $C_0$ using the extracted second wildcard key value, extracts a fourth key value which relates to the identifying hierarchy from the second key value group included in the inputted public key PK as a second identifying key value, calculates an identifying cipher value $C_3'$ used for decrypting the plaintext cipher value $C_0$ using the extracted second identifying key value, and outputs the ciphertext data CT including the wildcard cipher value $C_1'$ and the identifying cipher value $C_3'$, and the decryption device decrypts the plaintext cipher value $C_0$ included in the inputted ciphertext data CT using the extracted wildcard identifier, the wildcard cipher value $C_1$, the identifying cipher value $C_3$, the wildcard cipher value $C_1'$, and the identifying cipher value $C_3'$ which are included in the inputted ciphertext data CT.

3. The encryption system according to claim 1, wherein
the encryption device further encrypts specific plaintext data MW to calculate a plaintext cipher value $CW_0$, inputs a keyword KW used for searching for the ciphertext data CT, calculates a wildcard cipher value $CW_1$ and an identifying cipher value $CW_3$ using a pattern PW including the pattern P and as well including the keyword KW as a hierarchy identifier identifying a (k+1)-th hierarchy, and outputs ciphertext data CTW including the plaintext cipher value $CW_0$, the wildcard cipher value $CW_1$, and the identifying cipher value $CW_3$ which have been calculated with relating to the ciphertext data CT, the encryption system further comprising:

a search query generation device inputting the user identifier ID and the keyword KW, calculating a key value $y_0$ used for decrypting the plaintext cipher value $CW_0$ using the user identifier ID and the keyword KW which have been inputted, generating a search query QK including the calculated key value $y_0$ and the user identifier ID, and outputting the generated search query QK; and a search device having a ciphertext storage unit storing a plurality of pieces of ciphertext data CT and a plurality of pieces of ciphertext data CTW with relating to each other, wherein the search device inputs the search query QK and the wildcard hierarchical value W, selects a piece of ciphertext data CTW from the ciphertext storage unit, extracts a hierarchy identifier of the wildcard hierarchy from the user identifier ID included in the inputted search query QK as a wildcard identifier based on the inputted wildcard hierarchical value W, decrypts the plaintext cipher value $CW_0$ included in the selected piece of ciphertext data CTW using the extracted wildcard identifier, the wildcard cipher value $CW_1$ and the identifying cipher value $CW_3$ which are included in the selected piece of ciphertext data CTW, and the key value $y_0$ included in the inputted search query QK, discriminates whether or not decrypted data obtained by decrypting the plaintext cipher value $CW_0$ matches the plaintext data MW, when the decrypted data matches the plaintext data MW, obtains a piece of ciphertext data CT corresponding to the selected piece of ciphertext data CTW from the ciphertext storage unit, and outputs the obtained piece of ciphertext data CT as a search result in response to the inputted search query QK.

4. The encryption system according to claim 3, wherein
the encryption device calculates a hashed value of the piece of ciphertext data CT as the plaintext data MW, and encrypts the calculated plaintext data MW to calculate the plaintext cipher value $CW_0$, and the search device calculates a hashed value of the ciphertext data CT corresponding to the selected piece of ciphertext data CTW as the plaintext data MW, and discriminates whether or not the decrypted data matches the calculated plaintext data MW.

5. The encryption system according to claim 3, wherein
the encryption device previously stores a predetermined search constant as the plaintext data MW, and encrypts the previously stored search constant to calculate the plaintext cipher value $CW_0$, and the search device previously stores the search constant as the plaintext data MW, and discriminates whether or not the decrypted data matches the search constant.

6. The encryption system according to claim 3, wherein
the search device comprises an unauthorized identifier storage unit storing a user identifier ID of a user who is not authorized to search as an unauthorized identifier, and the search device discriminates whether or not the user identifier ID included in the inputted search query QK matches the unauthorized identifier stored in the unauthorized identifier storage unit, and does not output the search result when the user identifier ID matches the unauthorized identifier.

7. The encryption system according to claim 3, wherein
the search device comprises an unauthorized identifier storage unit storing a hierarchy identifier of a hierarchy which is upper than a hierarchy to which a user who is not authorized to search belongs as an unauthorized identifier, and the search device discriminates whether or not the user identifier ID included in the inputted search query QK includes the unauthorized identifier stored in the unauthorized identifier storage unit, and does not output the search result when the user identifier ID includes the unauthorized identifier.

8. The encryption system according to claim 3, wherein
the user identifier ID includes a first user identifier of the specific user as the hierarchy identifier for the k-th hierarchy and as well includes a second user identifier of the specific user as a hierarchy identifier for a (k+1)-th hierarchy wherein the user belongs to the kth hierarchy, the first key value group included in the public key PK is modified to include (k+1) number of key values which relates to (k+1) number of hierarchies, and the pattern P is modified to include the wildcard value as the value of at least one of the k-th hierarchy and the (k+1)-th hierarchy.

9. An encryption processing method of an encryption system using a user identifier ID including a hierarchy identifier of a user who belongs to a k-th hierarchy in an organization having a hierarchical structure with k hierarchies, the user identifier ID including (k−1) number of hierarchy identifiers identifying the user's membership in hierarchies from a first hierarchy to a (k−1)-th hierarchy, where k is a specific integer equal to or greater than 2, the encryption processing method comprising:

performing, by an encryption device,
inputting plaintext data M to be encrypted,
encrypting the inputted plaintext data M to calculate a plaintext cipher value $C_0$,
inputting a pattern P including either a value for each of the k hierarchies, the value for each of the k hierarchies indicating one of
the hierarchy identifier identifying the user's membership in the respective hierarchy,
a wildcard value which indicates the user is an arbitrary user, and
a blank value which indicates the respective hierarchy is an unnecessary hierarchy for the user,
discriminating a hierarchy as a wildcard hierarchy in a case where the inputted value is the wildcard value, inputting a public key PK including a first key value group including k number of key values which relates to k number of hierarchies, extracting a first key value which relates to the wildcard hierarchy from the first key value group included in the inputted public key PK as a wildcard key value, calculating a wildcard cipher value $C_1$ used for decrypting the plaintext cipher value $C_0$ using the extracted wildcard key value, discriminating a hierarchy as an identifying hierarchy in a case where the inputted value is the hierarchy identifier, extracting a second key value which relates to the identifying hierarchy from the first key value group included in the inputted public key PK as an identifying key value, calculating an identifying cipher value $C_3$ used for decrypting the plaintext cipher value $C_0$ using the extracted identifying key value, and outputting ciphertext data CT including the plaintext cipher value $C_0$, the wildcard cipher value $C_1$, and the identifying cipher value $C_3$ and including a wildcard hierarchical value W which indicates the wildcard hierarchy; and performing, by a decryption device, inputting the ciphertext data CT and the user identifier ID, extracting the hierarchy identifier of the wildcard hierarchy from the inputted user identifier ID as a wildcard identifier based on the wildcard hierarchical value W included in the inputted ciphertext data CT, decrypting the plaintext cipher value $C_0$ included in the inputted ciphertext data CT using the extracted wildcard identifier, the wildcard cipher value $C_1$ and the identifying cipher value $C_3$ which are included in the inputted ciphertext data CT, and outputting the plaintext data M obtained by decrypting the plaintext cipher value $C_0$.

10. The encryption processing method of the encryption system according to claim 9, the encryption processing method further comprising:

by the encryption device, further encrypting specific plaintext data MW to calculate a plaintext cipher value $CW_0$, inputting a keyword KW used for searching the ciphertext data CT, calculating a wildcard cipher value $CW_1$ and an identifying cipher value $CW_3$ using a pattern PW including the pattern P and as well including the keyword KW as a hierarchy identifier identifying a (k+1)-th hierarchy, and outputting ciphertext data CTW including the plaintext cipher value $CW_0$, the wildcard cipher value $CW_1$, and the identifying cipher value $CW_3$ which have been calculated with relating to the ciphertext data CT;

by a search query generation device, inputting the user identifier ID and the keyword KW, calculating a key value $y_0$ used for decrypting the plaintext cipher value $CW_0$ using the user identifier ID and the keyword KW which have been inputted, and outputting a search query QK including the calculated key value $y_0$ and the user identifier ID;

by a search device, having a ciphertext storage unit storing a plurality of pieces of ciphertext data CT and a plurality of pieces of ciphertext data CTW with relating to each other; and by the search device, inputting the search query QK and the wildcard hierarchical value W, selecting the ciphertext data CTW from the ciphertext storage unit, extracting the hierarchy identifier of the wildcard hierarchy from the user identifier ID included in the inputted search query QK as the wildcard identifier based on the inputted wildcard hierarchical value W, decrypting the plaintext cipher value $CW_0$ included in the selected ciphertext data CTW using the extracted wildcard identifier, the wildcard cipher value $CW_1$ and the identifying cipher value $CW_3$ which are included in the selected ciphertext data CTW, and the key value $y_0$ included in the inputted search query QK, discriminating whether or not decrypted data obtained by decrypting the plaintext cipher value $CW_0$ matches the plaintext data MW, when the decrypted data matches the plaintext data MW, obtaining ciphertext data CT corresponding to the selected ciphertext data CTW from the ciphertext storage unit, and outputting the obtained ciphertext data CT as a search result in response to the inputted search query QK.

11. An encryption device comprising:

an encryption inputting unit inputting plaintext data M to be encrypted, inputting a public key PK including a first key value group including k number of key values that relates to k number of hierarchies, where k is a specific integer equal to or greater than 2, and inputting a pattern P including a value for each of the k hierarchies, the value for each of the k hierarchies indicating one of a hierarchy identifier identifying a user's membership in a respective hierarchy, a wildcard value which indicates the user is an arbitrary user, and a blank value which indicates the respective hierarchy is an unnecessary hierarchy for the user;

a cipher value calculating unit encrypting the plaintext data M inputted by the encryption inputting unit to calculate a plaintext cipher value $C_0$, discriminate a hierarchy as a wildcard hierarchy, in a case where the inputted value is the wildcard identifier, extract a first key value which relates to the wildcard hierarchy from the first key value group included in the public key PK inputted by the encryption inputting unit as a wildcard key value, calculate a wildcard cipher value $C_1$ used for decrypting the plaintext cipher value $C_0$ using the extracted wildcard key value, discriminate a hierarchy as an identifying hierarchy in a case where the inputted value is the hierarchy identifier, extract a second key value which relates to the identifying hierarchy from the first key value group included in the public key PK as an identifying key value, and calculate an identifying cipher value $C_3$ used for decrypting the plaintext cipher value $C_0$ using the extracted identifying key value; and a ciphertext outputting unit generating ciphertext data CT including the plaintext cipher value $C_0$, the wildcard cipher value $C_1$, and the identifying cipher value $C_3$ and including a wildcard hierarchical value W which indicates the wildcard hierarchy, and outputting the generated ciphertext data CT.

12. A decryption device using a user identifier ID including a hierarchy identifier of a user who belongs to a k-th hierarchy in an organization having a hierarchical structure with k hierarchies, the user identifier ID including (k−1) number of hierarchy identifiers identifying the user's membership in hierarchies from a first hierarchy to a (k−1)-th hierarchy, where k is a specific integer equal to or greater than 2, the decryption device comprising:
- a decryption inputting unit inputting ciphertext data CT which is ciphertext data CT generated using a pattern P including a value for each of the k hierarchies, the value for each of the k hierarchies including one of
- the hierarchy identifier identifying the user's membership in the respective hierarchy,
- a wildcard value that indicates the user is an arbitrary user, and
- a blank value that indicates the respective kth hierarchy is an unnecessary hierarchy for the user, the ciphertext data CT further including a plaintext cipher value $C_0$ obtained by encrypting plaintext data M, a specific wildcard cipher value $C_1$, and a specific identifying cipher value $C_3$ and as well includes a wildcard hierarchical value W which indicates a hierarchy whose value included in the pattern P is the wildcard value, and inputting the user identifier ID; and
- a decrypting unit extracting a hierarchy identifier of a hierarchy indicated by the wildcard hierarchical value W from the user identifier ID inputted by the decryption inputting unit as a wildcard identifier based on the ciphertext data CT inputted by the decryption inputting unit, decrypting the plaintext cipher value $C_0$ included in the ciphertext data CT using the extracted wildcard identifier, the wildcard cipher value $C_1$ and the identifying cipher value $C_3$ which are included in the ciphertext data CT, and outputting the plaintext data M obtained by decrypting the plaintext cipher value $C_0$.

* * * * *